United States Patent [19]

Maeno et al.

[11] Patent Number: 5,432,651
[45] Date of Patent: Jul. 11, 1995

[54] DATA CONVERSION DEVICE AND RECORDING/REPRODUCTION APPARATUS

[75] Inventors: Kenji Maeno; Kihei Ido; Masako Yamada, all of Nagaokakyo, Japan

[73] Assignee: Mitsubishi Denki Kabushiki Kaisha, Tokyo, Japan

[21] Appl. No.: 73,322

[22] Filed: Jun. 8, 1993

[30] Foreign Application Priority Data

Jun. 9, 1992 [JP] Japan .................................. 4-149347
Sep. 1, 1992 [JP] Japan .................................. 4-233472
Dec. 16, 1992 [JP] Japan .................................. 4-355125

[51] Int. Cl.$^6$ ................................................. G11B 5/09
[52] U.S. Cl. ........................................... 360/41; 360/40
[58] Field of Search ...................... 360/32, 18, 27, 40, 360/42, 48; 77/15, 13, 4

[56] References Cited

U.S. PATENT DOCUMENTS

| | | | |
|---|---|---|---|
| 4,392,159 | 7/1983 | Lemoine et al. | 360/32 X |
| 4,853,809 | 8/1989 | Nemoto | 360/77.14 X |
| 5,126,892 | 6/1992 | Nagarawa | 360/77.15 X |
| 5,142,421 | 8/1992 | Kalhman et al. | 360/40 |
| 5,229,891 | 7/1993 | Yoshimura et al. | 360/77.15 X |
| 5,233,488 | 8/1993 | Yanagihara | 360/77.15 |
| 5,253,130 | 10/1993 | Kaaden et al. | 360/77.14 X |
| 5,258,879 | 11/1993 | Shimotashiro et al. | 360/77.15 X |
| 5,267,261 | 11/1993 | Blakeney, II et al. | 375/1 |

FOREIGN PATENT DOCUMENTS

| | | | |
|---|---|---|---|
| 1317280 | 12/1989 | Japan | 360/32 |
| 4268258 | 9/1992 | Japan | 360/32 |
| 5327515 | 12/1993 | Japan | 360/40 |

Primary Examiner—Donald Hajec
Assistant Examiner—Thien Minh Le
Attorney, Agent, or Firm—Birch, Stewart, Kolasch & Birch

[57] ABSTRACT

M sets of digital data obtained by adding a control bit to an n-bit data string are collected to generate $2^m$ kinds of m(n+1)-bit data strings, with I-NRZI modulation being applied to these data strings to generate m kinds of I-NRZI modulated data strings and the I-NRZI modulated data strings are subject to spectrum analysis for the desired frequency components, in order to supply one of the I-NRZI modulated data strings as a recording signal based on the result of the spectrum analysis.

14 Claims, 51 Drawing Sheets

Fig. 1
Prior Art

|  | C1 CDS | C2 CDS | C3 CDS |
|---|---|---|---|
| i=1  0 |  |  | +2 |
| 19 |  |  |  |
| 20 | +2 | -2 |  |
| 179 |  |  |  |
| 180 |  |  | 0 |
| 192 |  |  |  |
| 193 | 4 | -4 |  |
| i=256  255 |  |  |  |

Fig. 13(a)
  $h(nT-rT) \cdot COS(\omega rT)$
Fig. 13(b)
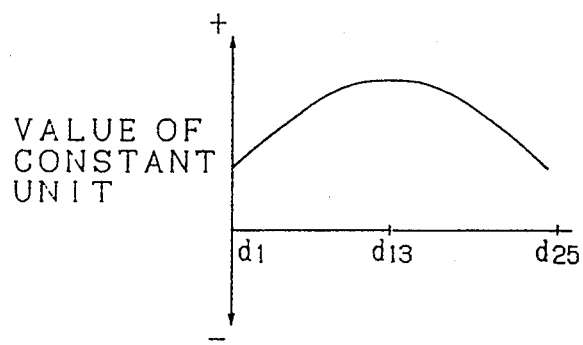
Fig. 13(c)
  $h(nT-rT) \cdot SIN(\omega rT)$
Fig. 13(d)
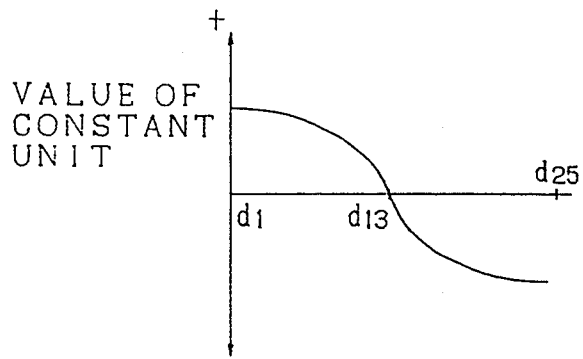

Fig. 23

| OBTAINABLE CDS VALUE FOR 10BIT | ONE EXAMPLE OF TYPICAL DATA | | | | | | | | | |
|---|---|---|---|---|---|---|---|---|---|---|
| | D9 | D8 | D7 | D6 | D5 | D4 | D3 | D2 | D1 | D0 |
| 0 | 1 | 0 | 1 | 0 | 1 | 0 | 1 | 0 | 1 | 0 |
| +2 | 1 | 0 | 1 | 0 | 1 | 1 | 0 | 1 | 0 | 1 |
| +4 | 1 | 1 | 0 | 1 | 0 | 1 | 1 | 0 | 1 | 1 |
| +6 | 1 | 1 | 1 | 0 | 1 | 1 | 1 | 0 | 1 | 1 |
| +8 | 1 | 1 | 1 | 1 | 1 | 0 | 1 | 1 | 1 | 1 |
| +10 | 1 | 1 | 1 | 1 | 1 | 1 | 1 | 1 | 1 | 1 |
| −2 | 0 | 1 | 0 | 1 | 0 | 0 | 1 | 0 | 1 | 0 |
| −4 | 0 | 0 | 1 | 0 | 1 | 0 | 0 | 1 | 0 | 0 |
| −6 | 0 | 0 | 0 | 1 | 0 | 0 | 0 | 1 | 0 | 0 |
| −8 | 0 | 0 | 0 | 0 | 0 | 1 | 0 | 0 | 0 | 0 |
| −10 | 0 | 0 | 0 | 0 | 0 | 0 | 0 | 0 | 0 | 0 |

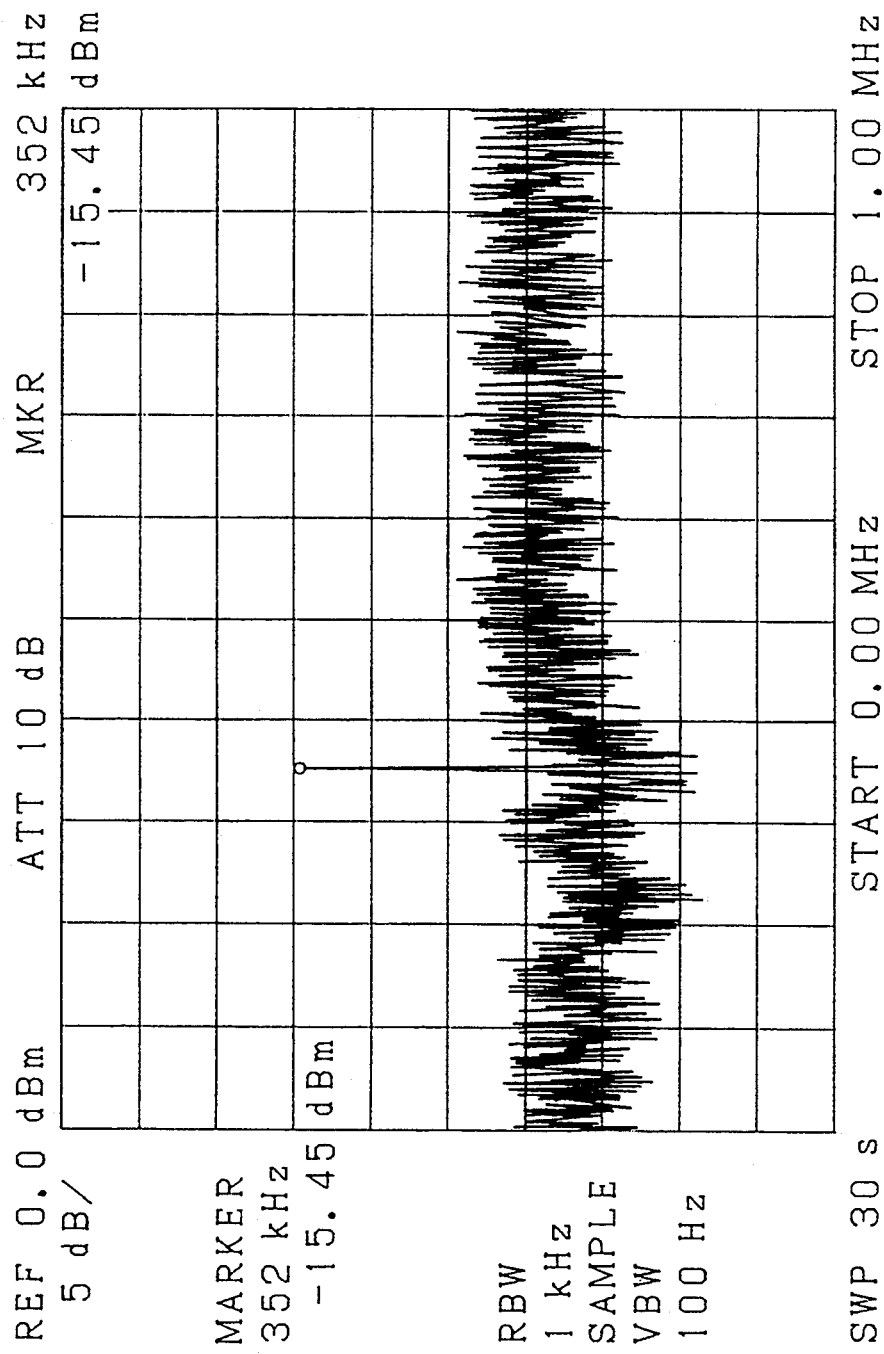

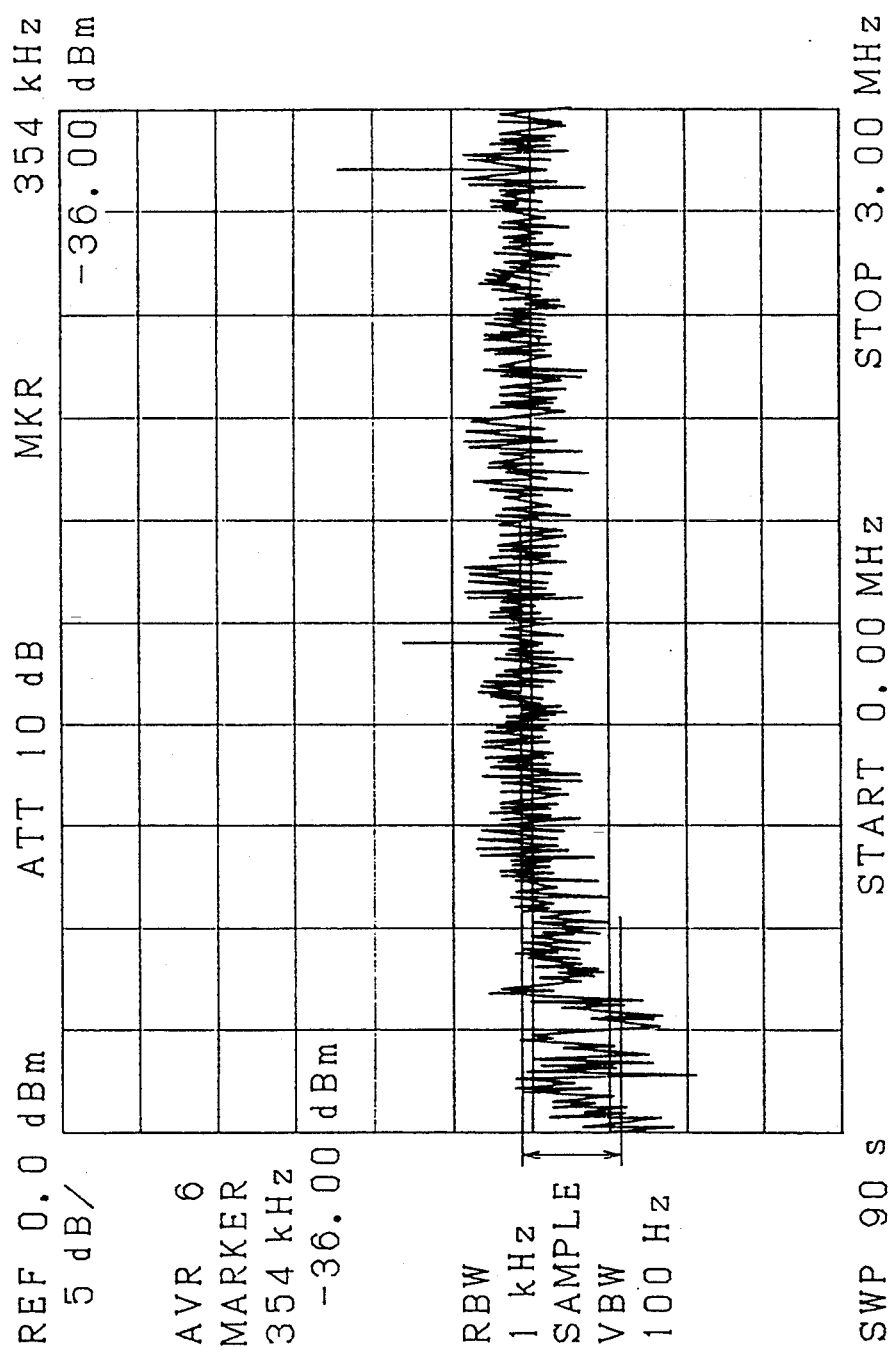

DATA CONVERSION DEVICE AND RECORDING/REPRODUCTION APPARATUS

BACKGROUND OF THE INVENTION

1. Field of the Invention

The present invention relates to a data conversion device and a recording/reproduction apparatus which records and reproduces digital data by means of the data conversion device.

1. Description of the Prior Art

Prior art of data conversion processes includes the 8-10 conversion, and a data conversion device based thereon is disclosed, for example, in Japanese Patent Application Laid-Open No. H-1-317280. This conversion device converts given continuous data words (applied data words) in the form of digital signals into channel words in the form of selected channel codes prior to recording the digital data on the information track of a recording medium, with the channel codes having CDS (Codeword Digital Sum) different from each other. FIG. 1 diagrammatically shows a table having a string of three channel words (C1, C2, C3). One string is assigned with 256 ($=2^8$) data words which represent numbers from 0 to 255 in decimal notation. For each data word I(i), each string includes a channel word Cj(i) where j=1, 2 or 3. These data words include different values of CDS from each other. Therefore, three channel words can be utilized for one data word I(i).

The 8-10 conversion includes second signals having carrier wave of a relatively low frequency related to the recorded information. These are pilot signals which serve as tracking signals giving information on the relative position of the read-out element related to the information track, namely on the track crossing position.

FIG. 2 is a drawing explanatory of ATF (Automatic Track Finding) servo of the conventional 2-frequency pilot system which controls tracking by using the pilot signals. In FIG. 2, numeral 201 denotes a magnetic tape, numeral 202 denotes A track which has plus azimuth with the pilot signal f1 being recorded thereon, numeral 203 denotes B track which has minus azimuth, numeral 204 denotes A track which has plus azimuth with pilot signal f2 being recorded thereon and numeral 205 denotes B head which has minus azimuth.

The B head 205 is a little wider than the B track 203. Signals reproduced with the B head 205 are signals from the B track 203 and cross-talk signals from the A tracks 202, 204 on both sides. When tracking is correctly performed, the cross-talk signals have the same reproduction levels. By using this fact, the ATF servo performs tracking control by passing the reproduced signal through a BPF with pass bandwidth of f1 and a BPF with pass bandwidth of f2, thereby extracting the pilot signals of f1 and f2, and integrating them to adjust the tracking so that the reproduction levels through f1 and f2 become the same.

In 8-10 conversion, in order to insert the pilot signals of f1 and f2 in the data stream of channel words, control signal corresponding to the pilot signal is generated and channel words are selected from the table of FIG. 1 so the mean value of the recorded digital signals changes approximately corresponding to the change of the pilot signals of relatively low frequency.

8-10 conversion of the conventional information conversion apparatus is arranged as described above. The 8-10 conversion has a conversion efficiency of 80%. Although achieving a higher recording density requires forming pilot signals necessary for narrow track recording and increasing the conversion efficiency further, it is difficult to achieve. The circuit for this purpose should also be as small as possible.

Also in the ATF servo, the signals reproduced from the B head 205 include the signals recorded on the B track 203, which become noise components when extracting the pilot signals with the BPF, thereby resulting in deteriorated S/N ratio of the pilot signals.

SUMMARY OF THE INVENTION

One object of the invention is to provide a data conversion device of a small scale circuit and a high conversion efficiency.

Another object of the invention is to provide a data conversion device which is capable of adding pilot signals synchronized with the applied data string without superimposing the pilot signals on the applied data string.

Further another object of the invention is to provide a recording/reproduction apparatus which is capable of extracting pilot signals as tracking signals stably with a simple circuit construction.

Further another object of the invention is to provide a recording/reproduction apparatus which is capable of constituting a system having a good S/N ratio of the pilot signals with a small scale of circuit at a low cost.

Further another object of the invention is to provide a recording/reproduction apparatus which is capable of increasing or decreasing particular frequency components in the frequency spectrum of the recorded data during recording.

Further another object of the invention is to provide a recording/reproduction apparatus which has a recording modulation system capable of adding one control bit to n-bit data, so as to suppress the low-frequency components and add pilot signals synchronized with the digital data, and is suitable for high-density recording with narrower tracks.

The above and further objects and features of the invention will more fully be apparent from the following detailed description with accompanying drawings.

BRIEF DESCRIPTION OF THE DRAWINGS

FIG. 1 is a diagrammatical drawing showing a table having a string of three channel words (C1, C2, C3).

FIG. 13(a) is a drawing illustrative of output of the real term from a constant unit of the short time spectrum analyzer of the data conversion device of embodiment 5.

FIG. 13(b) is a drawing illustrative of control method of the real term from a constant unit of the short time spectrum analyzer of the data conversion device of embodiment 5.

FIG. 13(c) is a drawing illustrative of output of the imaginary term from a constant unit of the short time spectrum analyzer of the data conversion device of embodiment 5.

FIG. 13(d) is a drawing illustrative of control method of the imaginary term from a constant unit of the short time spectrum analyzer of the data conversion device of embodiment 5.

FIG. 23 is a drawing illustrative of representative data of each CDS value which 10-bit digital data can have.

FIG. 32(b) is a drawing illustrative of the frequency spectrum of the record signals resulting from a simulation of embodiment 12.

FIG. 41(a) is a drawing illustrative of the frequency spectrum of the record signals obtained by simulating the calculation of 100-bit CDS in embodiment 15.

DESCRIPTION OF THE PREFERRED EMBODIMENTS

The present invention will now be described with reference to the accompanying drawings.

Embodiment 1

Figure 3:
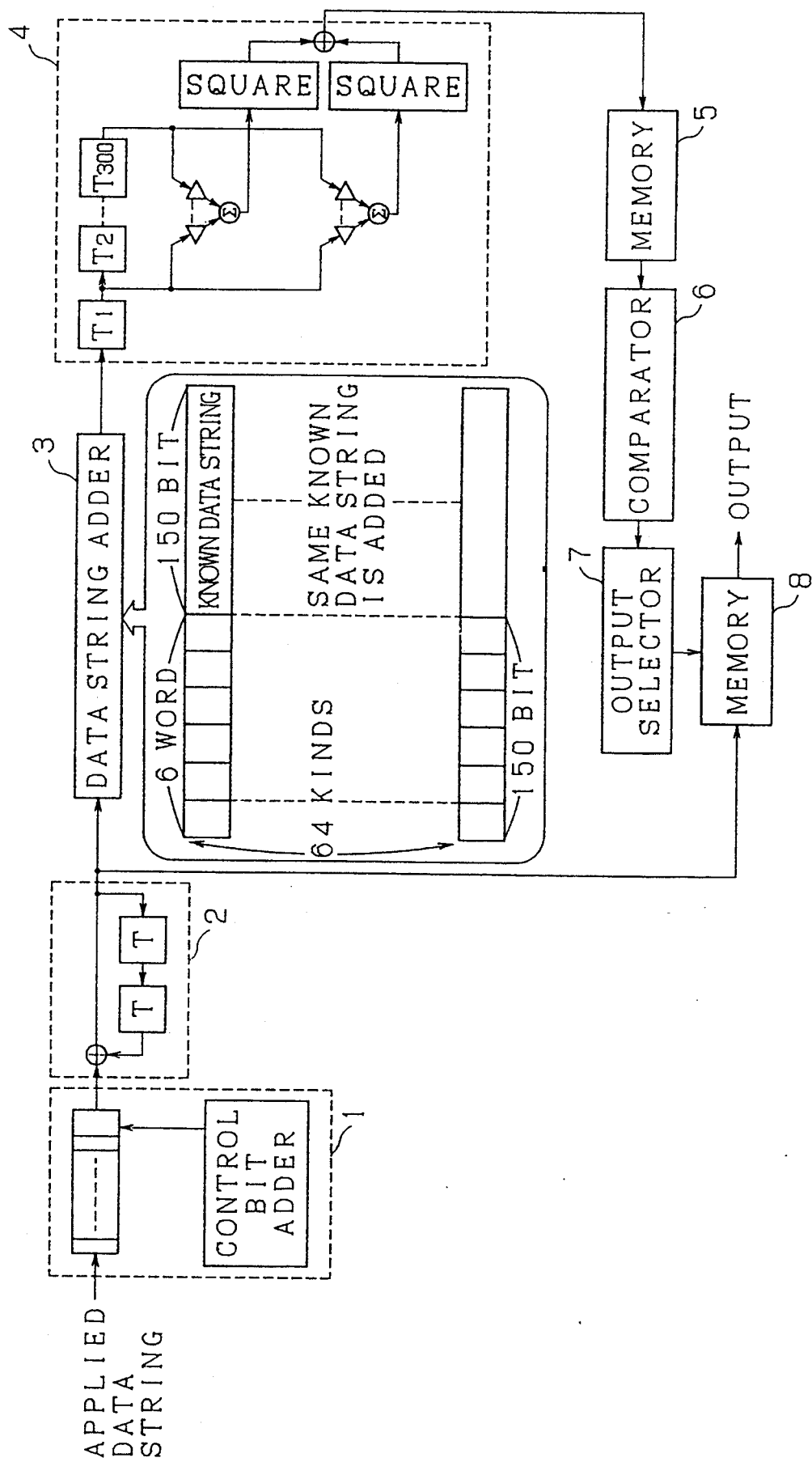
FIG. 3 is a block circuit diagram of the data conversion device of embodiment 1.

Embodiment 1 of the invention will first be described. FIG. 3 is a block circuit diagram of a data conversion device of embodiment 1. Numeral 1 denotes a control bit adder which adds a control bit, 0 or 1, to an applied data string. Numeral 2 denotes an I-NRZI modulator which performs I-NRZI (Interleaved non-return-to-zero inverse) modulation. Numeral 3 denotes a data string adder which adds a known data string having frequency spectrum of the pilot signals to I-NRZI modulated data strings having a plurality of words. Numeral 4 denotes a short time spectrum analyzer (STSA) used in the spectrum analysis of data string which is output from the data string adder 3. Numeral 5 denotes a memory used in temporary storage of the result of frequency analysis obtained from the STSA 4. Numeral 6 denotes a comparator which compares the results of frequency analysis. Numeral 7 denotes an output selector which selects the output based on the result of comparison by the comparator 6. Numeral 8 denotes a memory which stores a plurality of I-NRZI modulated data strings.

The operation will now be described below. An applied data string includes binary digital data, 0 or 1. Let the applied data string described above be divided into 24-bit groups, for example, although the embodiment is not restricted to this scheme. One word of 25 bits is formed by adding 1 bit as the control bit to the above data string. This process is called 24–25 conversion. Conversion efficiency of this process is 96%, higher than 80% in the case of 8–10 conversion.

The 24–25 conversion which is capable of adding pilot signals synchronized with the digital data will be described below. Let the bit transmission frequency (Fch) be 35.4 MHz and the frequency of the pilot signals to be added (Fp) be 1/150 times the Fch (236 kHz), as an example.

An applied data string is given a control signal, 0 or 1, being added to every 24 bits by the control bit adder 1. This data string is input to the I-NRZI modulator 2 to obtain an output of I-NRZI modulated data string at a frequency Fch wherein one word has 25 bits.

On the other hand, the desired pilot frequency to be generated is 1/150 times the Fch, which corresponds to 6 words each being formed of 25 bits by adding a control bit to the applied data string (150/25=6). Namely, while controlling the control bit (MSB) for 6 words, generating a frequency spectrum of Fch/150 becomes necessary. For this reason, in embodiment 1, a spectrum of Fch/150 is obtained for all $2^6$ (64) combinations of 0 and 1 of the control bits (6 bits) added to one period of the pilot signal, and the spectrum is stored in the memory 8. Then among the above 64 combinations, a modulated data string of 6 words having the greatest power of Fch/150 is obtained and applied to the output, thereby generating pilot signals which are synchronized with the digital data.

Figure 4:
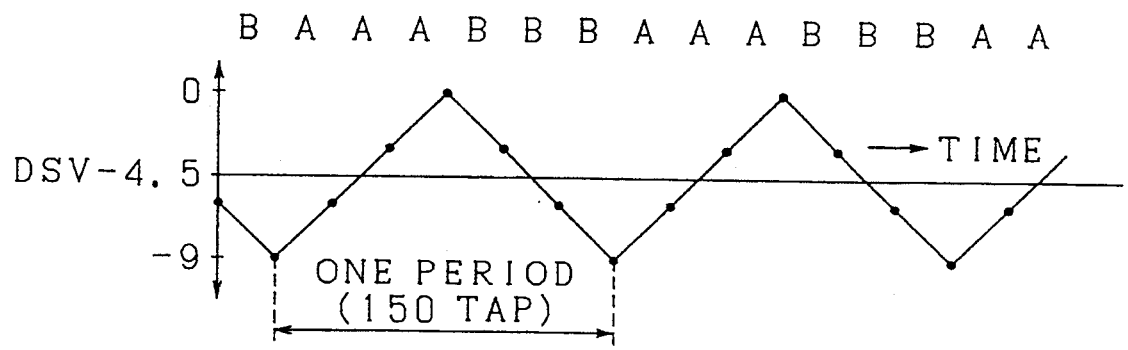
FIG. 4 is a drawing illustrative of a known data string having frequency spectrum of the pilot signals.

Obtaining the power of Fch/150 will be described in detail below. The data string adder 3 accumulates a group of $2^6$ (64) 6-word modulated data strings, from the 1st modulated data string of 150 bits modulated by the I-NRZI modulator 2 after setting all control bits for 6 words to 0 in the control bit adder 1 to 64th modulated data string of 150 bits I-NRZI modulated after setting all control bits for 6 words to 1. Further, in the data string adder 3, a 150-bit known data string having the frequency spectrum of the Fch/150 pilot signal is added to the modulated data string in the unit of 6 words which is subjected to I-NRZI modulation as described above. For the known data string mentioned above, signals with the variation period of DSV (Digital Sum Variation) being controlled to the period of pilot signals, for example, may be used. FIG. 4 shows an example of known data string to be added.

300 bits (modulated data string of 6 words + 150 bits of known data string) of the 64 combinations generated in this way are input to the STSA 4 successively, to analyze the frequency spectrum of the pilot signals. In order to extract the pilot signal frequency components of 35.4 MHz/150 from the data string of 35.4 Mbps with the FIR filter, at least 150 taps are required and, in order to extract with a narrower bandwidth, several times the number of taps as 150 taps are further required. Therefore number of taps of the STSA 4 is set to 300 taps corresponding to 2 periods of the pilot signals in this embodiment.

Short time frequency analysis is defined by equation (1) below;

$$X(\omega k, nT) = \sum_{r=-\infty}^{n} x(rT)h(nT - rT) e^{-j\omega rT} \quad (1)$$

where x is the input data (applied data string), and h denotes the impulse response of the FIR filter. Frequency of analysis is determined by the phase term $e^{-j\omega rT}$ which can be expanded as follows according to Euler's formula.

$$e^{-j\omega rT} = \cos(\omega rT) - j\sin(\omega rT)$$

Assuming that the pilot frequency is constant, the real term $h(nT-rT)\cos(\omega\ rT)$ and the imaginary term $h(nT-rT)\sin(\omega\ rT)$ are constants at each tap when analyzing the pilot frequency. The power of the frequency spectrum is given by the square root of the sum of squared real term and squared imaginary term. In the circuit of this embodiment, a square root circuit is omitted since only the energy is compared.

As 64 kinds of frequency spectrum of the pilot signals calculated by the STSA 4 based on the FIR filter of 300 taps are output, they are stored in the memory 5. All of these results are input to the comparator 6, and the data string having the greatest energy spectrum is selected from the 64 modulated data strings which are stored in the memory 8 by the output selector 7 and is added to the output.

Figure 5:
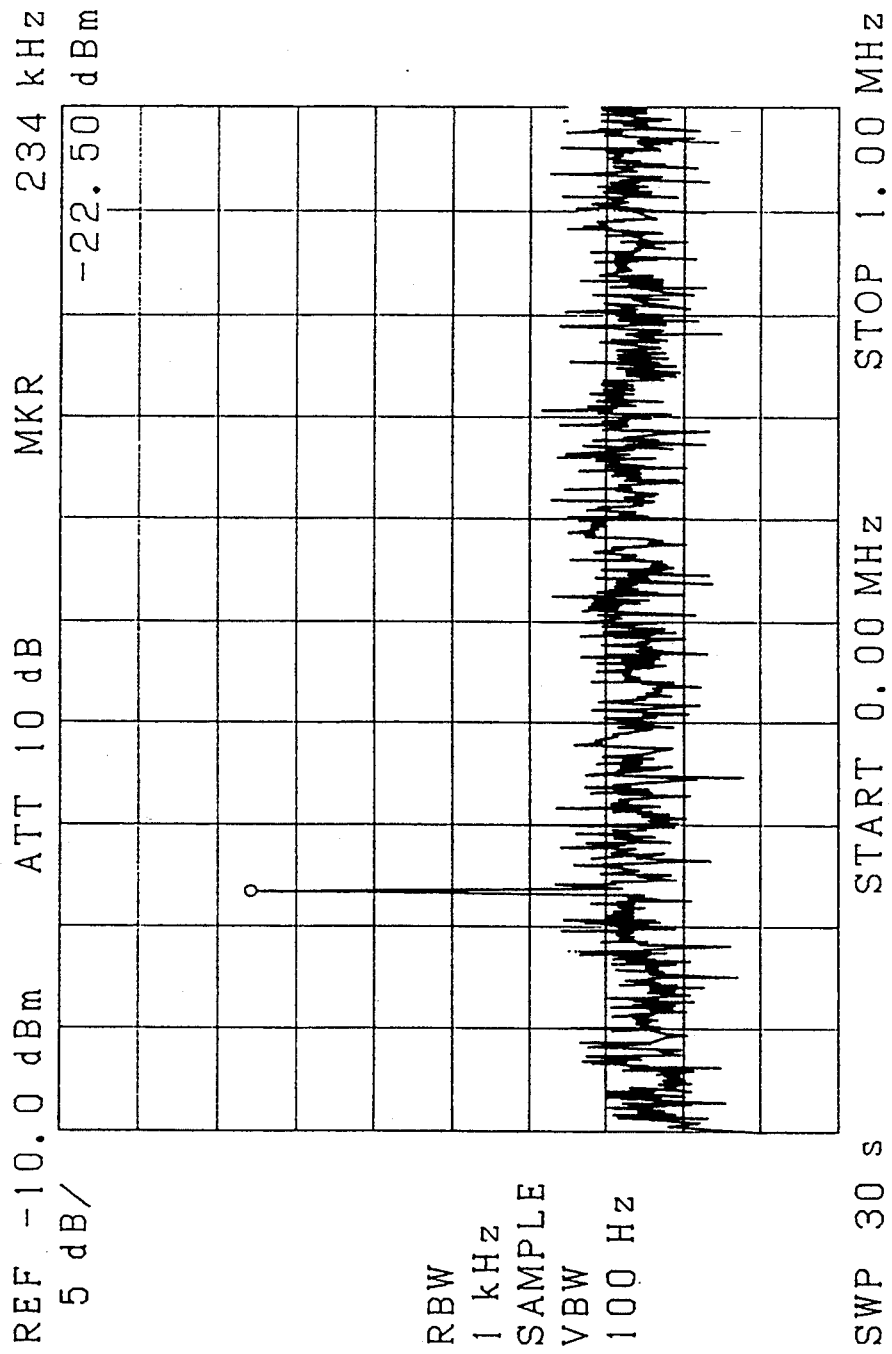
FIG. 5 is a drawing illustrative of the frequency spectrum of modulated data string obtained by data conversion in the data conversion device of embodiment 1.

The above procedure is repeated to convert the data successively. FIG. 5 shows the frequency spectrum of the modulated data string after being subjected to data conversion by the data conversion device of embodiment 1. It can be verified that pilot signals of about 23 dB can be added by the above procedure.

Although description of this embodiment assumes that 64 patterns of modulated data strings are accumulated in the data string adder 3, similar result can be obtained also by adding known data strings each having 150 bits successively to the 6-word modulated data string of which is output from the I-NRZI modulator 2 in the data string adder 3, with the results being input to the STSA 4, and storing the frequency spectrum of the detected pilot signals in the memory 5 while accumulating the 6-word modulated data string only in the memory 8.

In embodiment 1, because a data string is generated by adding one control bit to a k-bit applied data string to add the pilot signal, an effect of increasing the conversion efficiency can be obtained.

Embodiment 2

Figure 6:
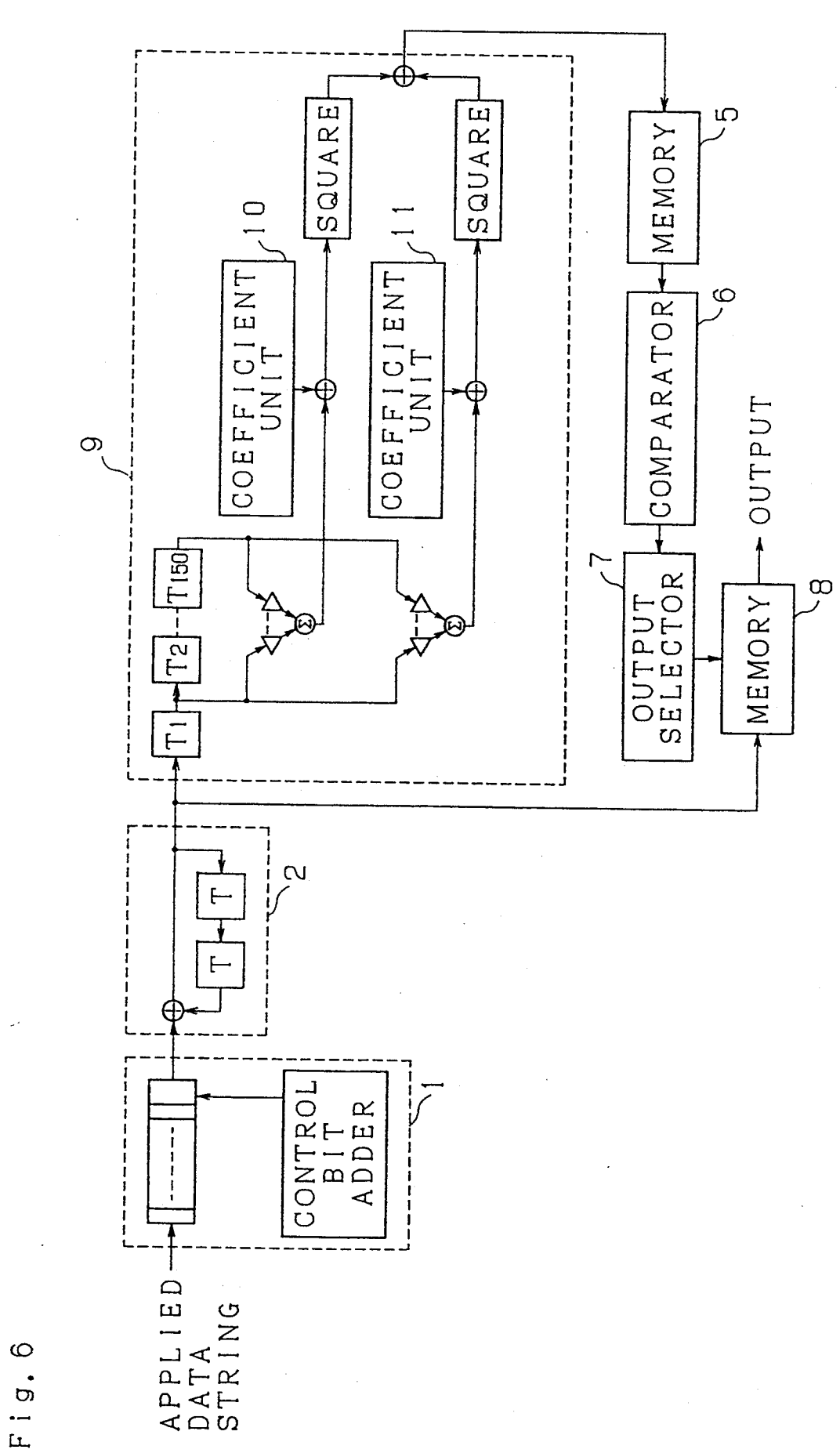
FIG. 6 is a block circuit diagram of the data conversion device of embodiment 2.

FIG. 6 shows the circuit construction of the data conversion device according to embodiment 2 of the invention. The same circuits as those of embodiment 1 will be given the same numerals in FIG. 3 and description thereof will be omitted. Numeral 9 denotes an STSA using a coefficient unit, and numerals 10, 11 denote coefficient units.

The operation of embodiment 2 will now be described. A FIR filter section of STSA 9 is provided with 150 taps of the former half counting from the input stage among the 300 taps of the STSA 4 in embodiment 1. Modulated data strings from the I-NRZI modulator 2 are modulated data strings based on the unit of 6 words similar to embodiment 1, which include 64 types generated by applying I-NRZI modulation while changing the control bits (6 bits) bit by bit from all 0 to all 1, and are store din the memory 8 successively while being input directly to the STSA 9 at the same time, to thereby calculate the former half of 150 taps which correspond to the modulated data of 6 words; 150 taps of the latter half of the FIR filter of the STSA 4 shown in embodiment 1 are assigned with known data strings corresponding thereto, and are the same data with respect to the 64 kinds of modulated data strings.

Thus, 150 taps in the latter half of the data strings shown in FIG. 4 of embodiment 1 are calculated in advance, provided as the coefficient units 10 and 11, are added to the calculated result of 150 taps in the former half, to thereby obtain the square sum. Consequently, the result of this calculation is similar to that of embodiment 1 and the frequency spectra of the pilot signals can be obtained. The values of spectra obtained as described above are stored in the memory 5, similar to embodiment 1, while the spectrum values corresponding to the 64 patterns of modulated data strings are compared in the comparator 6, to select the modulated data string having the greatest spectrum value from the memory 8.

Because the number of taps of STSA is decreased by calculating the data strings having frequency components of the pilot signals to obtain the coefficients in embodiment 2 as described above, the circuit scale of the STSA can be greatly reduced without decreasing the capability of detecting the pilot signal spectrum.

Embodiment 3

Figure 7:
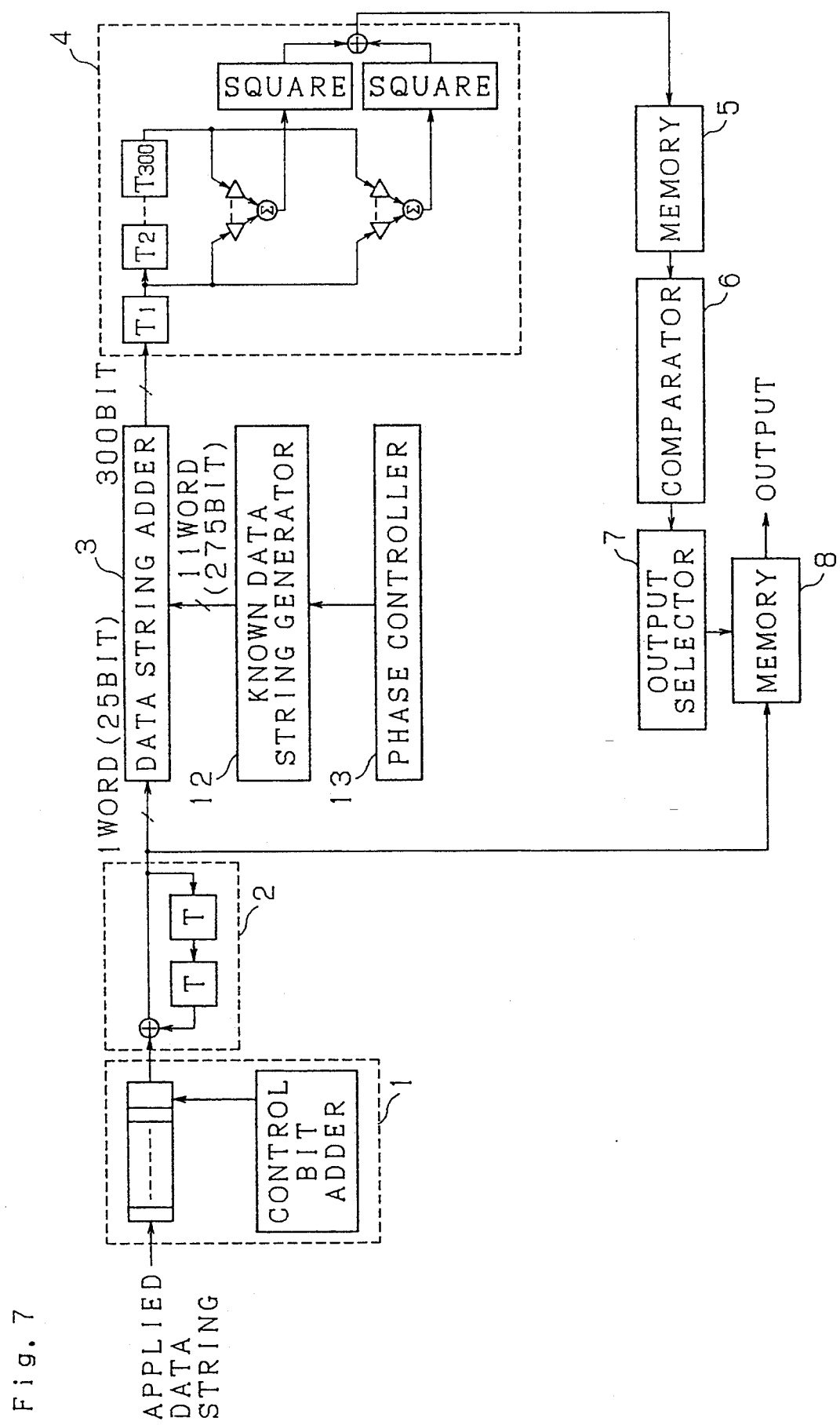
FIG. 7 is a block circuit diagram of the data conversion device of embodiment 3.

FIG. 7 shows the circuit construction of the data conversion device according to embodiment 3 of the invention. The same circuits as those of embodiment 1 will be given the same numerals as in FIG. 3 and description thereof will be omitted. Numeral 12 denotes a known data string generator which generates a plurality of known data strings having the frequency spectrum of the pilot signals of different phases. Numeral 13 denotes a phase controller which controls the phase of the pilot signals.

The object of embodiment 3 is to control the control bit of short I-NRZI modulated data strings not longer than one period of the pilot signals and generate pilot signals. In this embodiment, generating pilot signals from modulated data strings of 1 word (25/150=1/6 periods) will be described. The size of the control bit which is added to the modulated data string for the generation of pilot signals is 1 bit, and the modulated data string is selected from among $2^1$ (2) choices.

Figure 8:
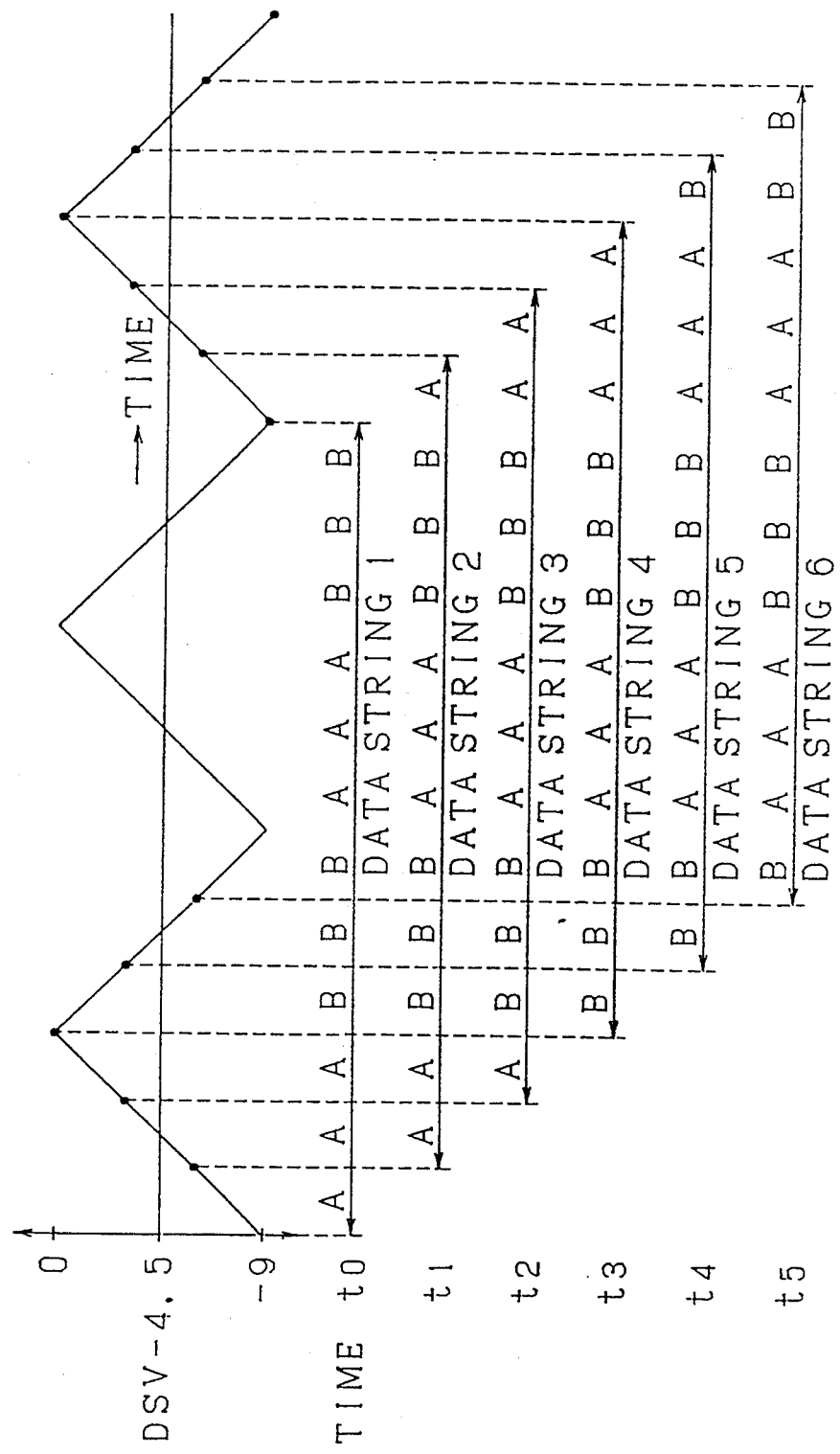
FIG. 8 is a drawing illustrative of the data string input to a short time spectrum analyzer.

In order to aid understanding of the operation of embodiment 3, an outline of the procedure of generating the pilot signals by using short time spectrum analysis will be described. Assume that the data string shown in FIG. 8 is input to the STSA 4 of embodiment 1. The data string shown in FIG. 8 includes a word string of data string A and data string B of FIG. 4 with the values of CDS being +3 and −3, respectively, wherein 25 bits constitute 1 word, and DSV varies periodically between 0 and −9. Consequently, a strong spectrum corresponding to the DSV variation period is obtained from the data string, which can be used as the pilot signal.

In the STSA 4 having 300 taps, at time t0, 12-word data string represented by data string 1 in FIG. 8 is input. The relationship between the data string 1 and the data of each part of 300 taps corresponds to 2 periods of pilot signals (Fch/150) which start with −90 degrees and end with −90 degrees, and the phase differs by 60 degrees every word. When such data is input, the spectrum of Fch/150 which is output from the STSA 4 has a very large value, as a matter of course.

Then one word period later, at time t1, a data string represented by data string 2 which starts with −30 degrees and ends with −30 degrees is input to the STSA 4. The spectrum of Fch/150 output from the STSA 4 has a large value similar to that at time t0. When the data strings corresponding to 2 periods of pilot signal cycle which gains the phase by 60 degrees for every word period is input to the STSA 4 in the same manner as above, the output spectrum of Fch/150 with a very large value similarly to that at time t0 is obtained. What should be noted here is the fact that the output spectrum of Fch/150 always has a very large value. By utilizing this characteristic, a data string (modulated data string) having the pilot signals can be generated in the procedure described below.

Figure 9:
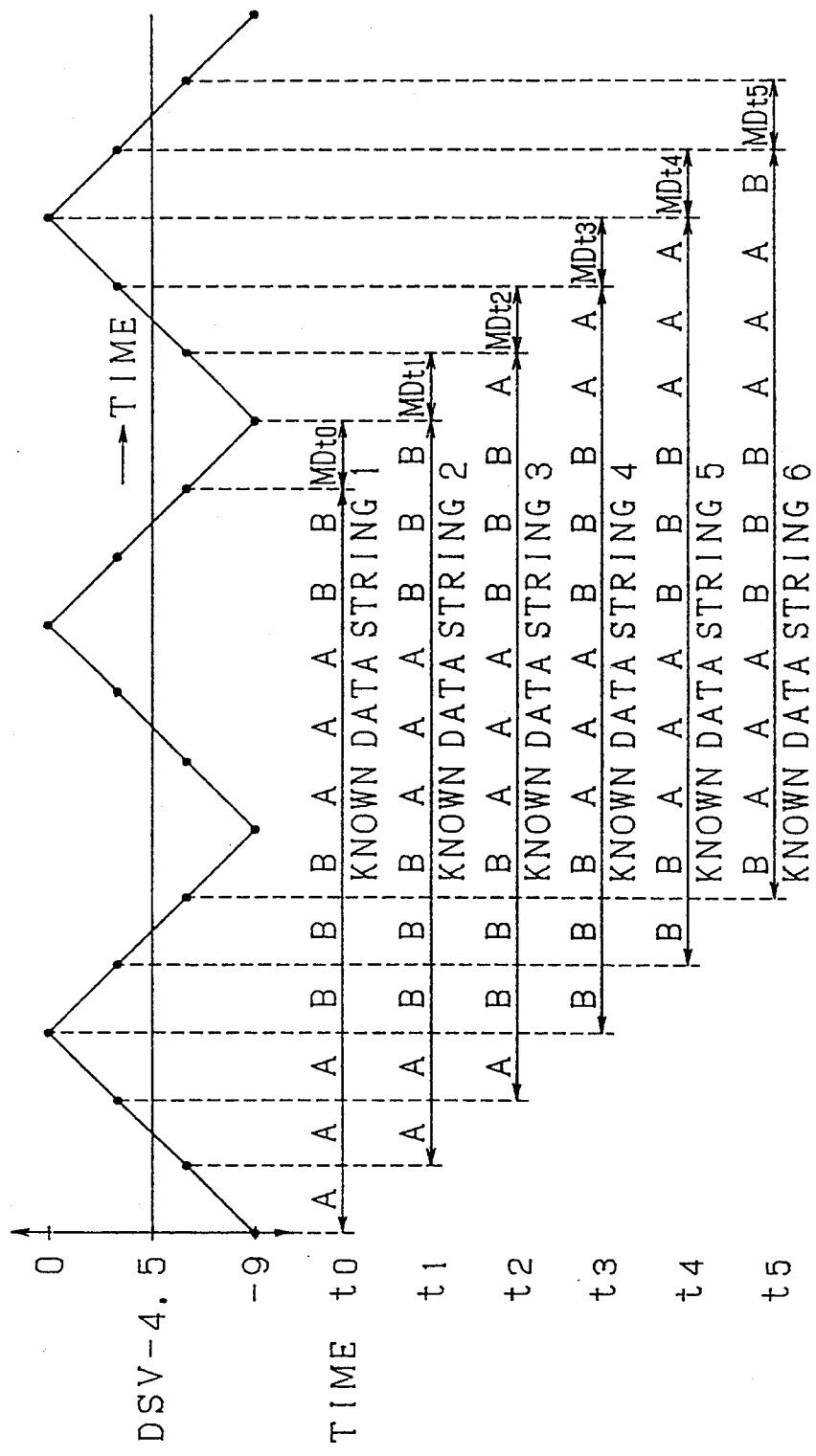
FIG. 9 is a drawing illustrative of a known data string required to compensate the phase of the pilot signals, which is output from a known data string generator.

FIG. 9 shows an example of known data string necessary to compensate the phase of pilot signals which are output from the known data string generator 12. At time t0, known data string 1 (11 words A, A, A, B, B, B, A, A, A, B, B) shown in FIG. 9 is input to T26 through T300 of the STSA 4, while setting the corresponding plurality of modulated data (2 kinds of modulated data which are subjected to I-NRZI modulation by adding the control bit 1 or 0) to be converted in T1 through T25, and the spectrum of Fch/150 is obtained to set the modulated data which gives the greatest value as MDt0. Another one word period later, at time t1, known data string 2 (11 words of A, A, B, B, B, A, A, A, B, B, B) is input to T26 through T300 of the STSA 4, while setting the corresponding plurality of modulated data (2 kinds of modulated data which are subjected to I-NRZI modulation by adding the control bit 1 or 0) to be converted following the above modulated data in T1 through T25, and the spectrum of Fch/150 is obtained to set the modulated data which gives the greatest value as MDt1. Further another 1 word period later, at time t2, known data string 3 (11 words of A, B, B, B, A, A, A, B, B, A) is input to T26 through T300 of the STSA 4, while setting the corresponding plurality of modulated data (2 kinds of modulated data which are subjected to I-NRZI modulation by adding the control bit 1 or 0) to be converted following the above modulated data in T1 through T25, and the spectrum of Fch/150 is obtained to set the modulated data which gives the greatest value as MDt2.

Similarly, known data strings 4, 5, 6 and so on with the phase shifting by 60 degrees for every word are input successively to T26 through T300, while selecting the modulated data which gives the greater value of Fch/150 spectrum from the plurality of modulated data which follow the above modulated data which is input to T1 through T25, setting the selected data strings as $MD_{t3}$, $MD_{t4}$, $MD_{t5}$ and so on.

It can be seen also from FIG. 9 that the selected modulated data MDt0, MDt1, . . . , MDt5 and so on which give the greatest spectrum of Fch/150 at the respective time are data strings with the phase being compensated. Therefore it will be understood that pilot signal spectrum of strong Fch/150 is obtained from the modulated data strings which have been selected.

With the above explanation, the operation in embodiment 3 will now be described below. The known data string generator 12 shown in FIG. 7 holds the 6 kinds of data strings each containing 11 words of the known data strings 1 through 6 shown in FIG. 9 described previously being stored therein. The known data strings are input to the data string adder 3 repetitively in the order of known data string 1, 2, 3, 4, 5, 6, 1, 2 and so on for every word period under the direction of the phase controller 13. The known data string 1 through known data string 6 which are input to the data string adder 3 are made to correspond to T26 through T300 when they are input to the STSA 4. The data string adder 3 and the memory 8 hold 2 kinds of data strings which have been given 1 or 0 added thereto in the control bit adder 1 to make 1 word which consists of 25 bits being input thereto after being modulated in the I-NRZI modulator 2.

The modulated data strings which are input to the data string adder 3 are made to correspond to T1 through T25 when they are input to the STSA 4. Therefore the data string adder 3 includes 2 sets of data strings, the data strings corresponding to 300 taps obtained by adding each known data string to the modulated data string which has been I-NRZI modulated by setting 0 to MSB, and the data strings corresponding to 300 taps obtained by adding each known data string to the modulated data string which has been I-NRZI modulated by setting 1 to MSB, existing therein. The above 2 kinds of data strings are successively input to the STSA 4, while each FCH/150 spectrum is detected as in embodiment 1, stored in the memory 5, with the magnitude thereof being compared in the comparator 6, and the modulated data string having greater Fch/150 is selected from the memory 8 under the direction of the output selector 7 and is output.

Figure 10:
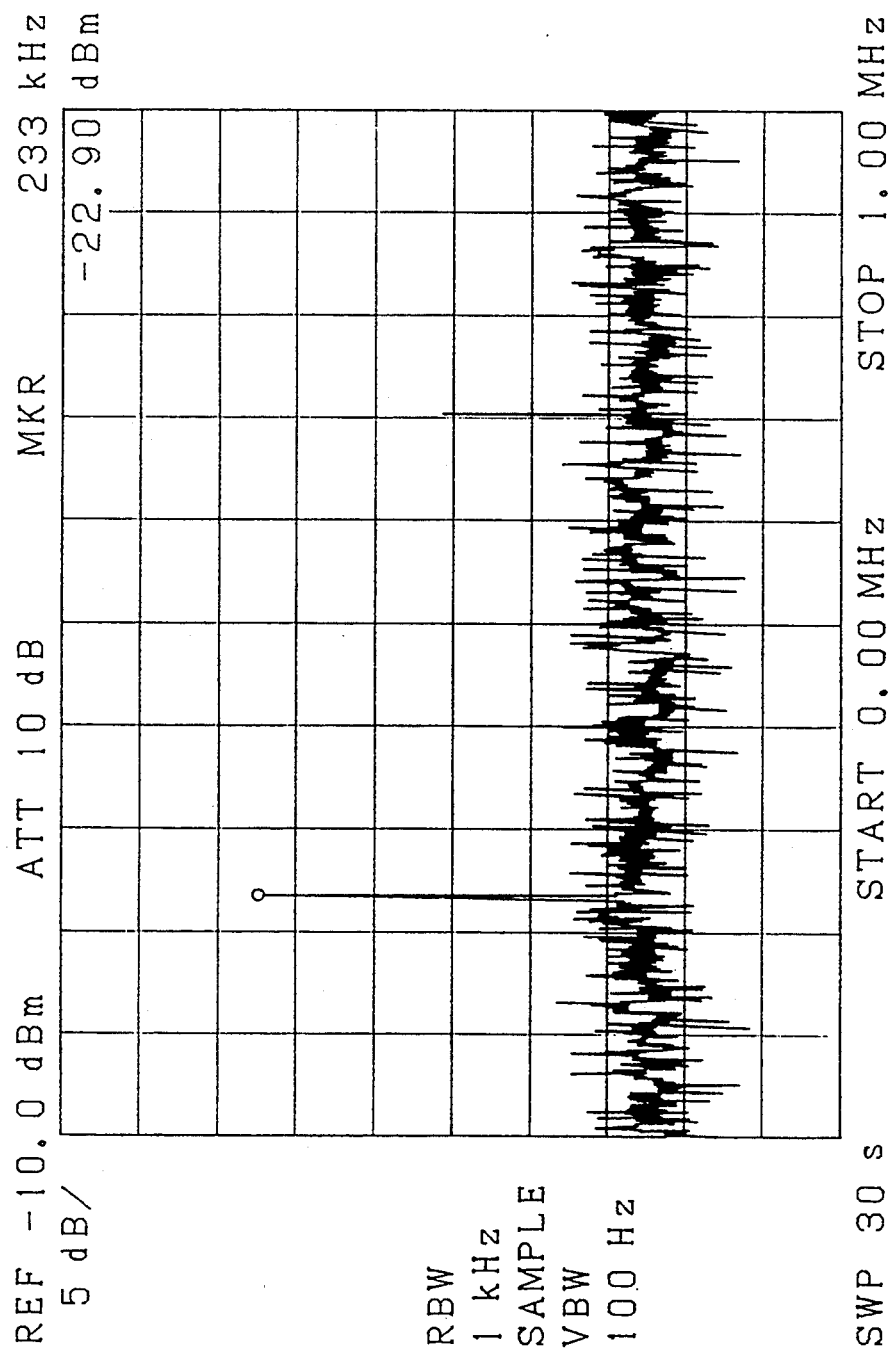
FIG. 10 is a drawing illustrative of the frequency spectrum of modulated data string obtained by data conversion in the data conversion device of embodiment 3.

Similarly, 2 kinds of 300-bit data strings obtained by adding a 1-word modulated data string, which has been I-NRZI modulated by setting the control bit as 1 or 0, to the 11-word known data string which advances the phase by 60 degrees is input via the data adder 3 to the STSA 4. Then Fch/150 spectrum of each data string is obtained and the modulated data string have the greater value is output from the memory 8, thus successively converting the data. The above procedure makes it possible to generate pilot signals which are synchronized with the digital-modulated data by controlling 1-bit control bit to be added to the MSB of each word. FIG. 10 shows the frequency spectrum of the modulated data string obtained by simulating the data conversion method of embodiment 3 and converting the data. This simulation verifies that pilot signals of about 23 dB can be added. This gives a result significantly equal to that shown in FIG. 5. Thus, it is possible to greatly reduce the number of calculations for the short time frequency spectrum analysis without deteriorating performance.

As described above, according to embodiment 3, the number of I-NRZI modulated data strings required for the frequency analysis can be greatly reduced without deteriorating performance, thereby reducing the number of frequency analyses.

Embodiment 4

Figure 11:
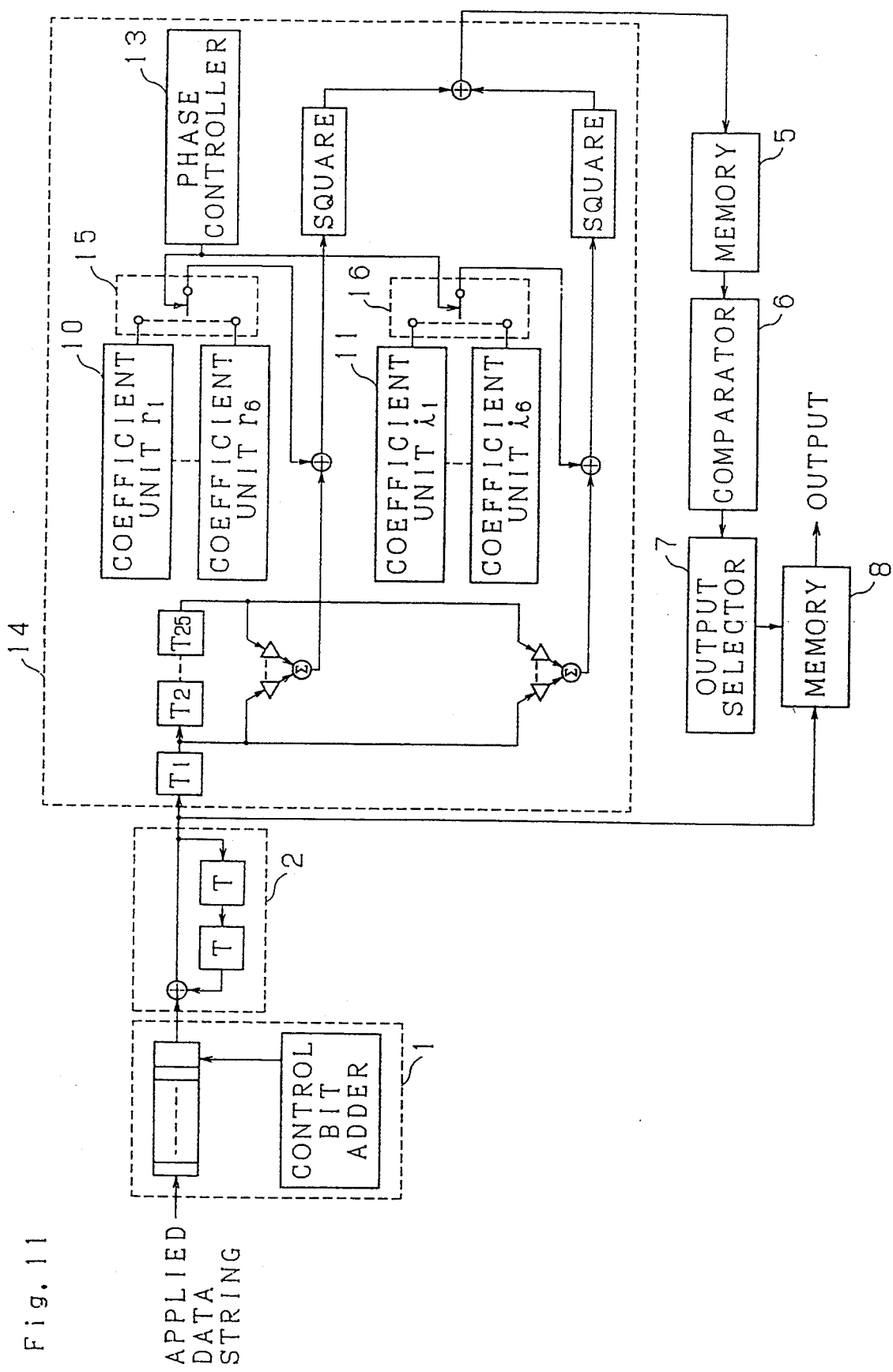
FIG. 11 is a block circuit diagram of the data conversion device of embodiment 4.

FIG. 11 shows the circuit construction of the data conversion device according to embodiment 4 of the invention. The same circuits as those of previous embodiments will be given the same numerals and description thereof will be omitted. Numeral 14 denotes an STSA using a plurality of coefficient units, and numerals 15, 16 denote coefficient selector switches.

The operation will now be described. 6 kinds of known data strings each consisting of 11 words having phases different from each other by 60 degrees which are output from the known data string generator 12 shown in FIG. 7 of embodiment 3 are calculated in advance corresponding to 275 taps of the STSA except for the former 25 taps as in embodiment 2, and are stored as the coefficients in the coefficient units 10 and 11. These become coefficient units having 6 different phases. By selecting these successively using the coefficient selector switches 15 and 16 at every time data conversion of 1 word is carried out, data conversion similar to embodiment 3 is successively carried out.

Consequently in embodiment 4, the circuit scale of the STSA can be greatly reduced and the number of calculations can be significantly reduced without deteriorating performance.

Embodiment 5

Figure 12:
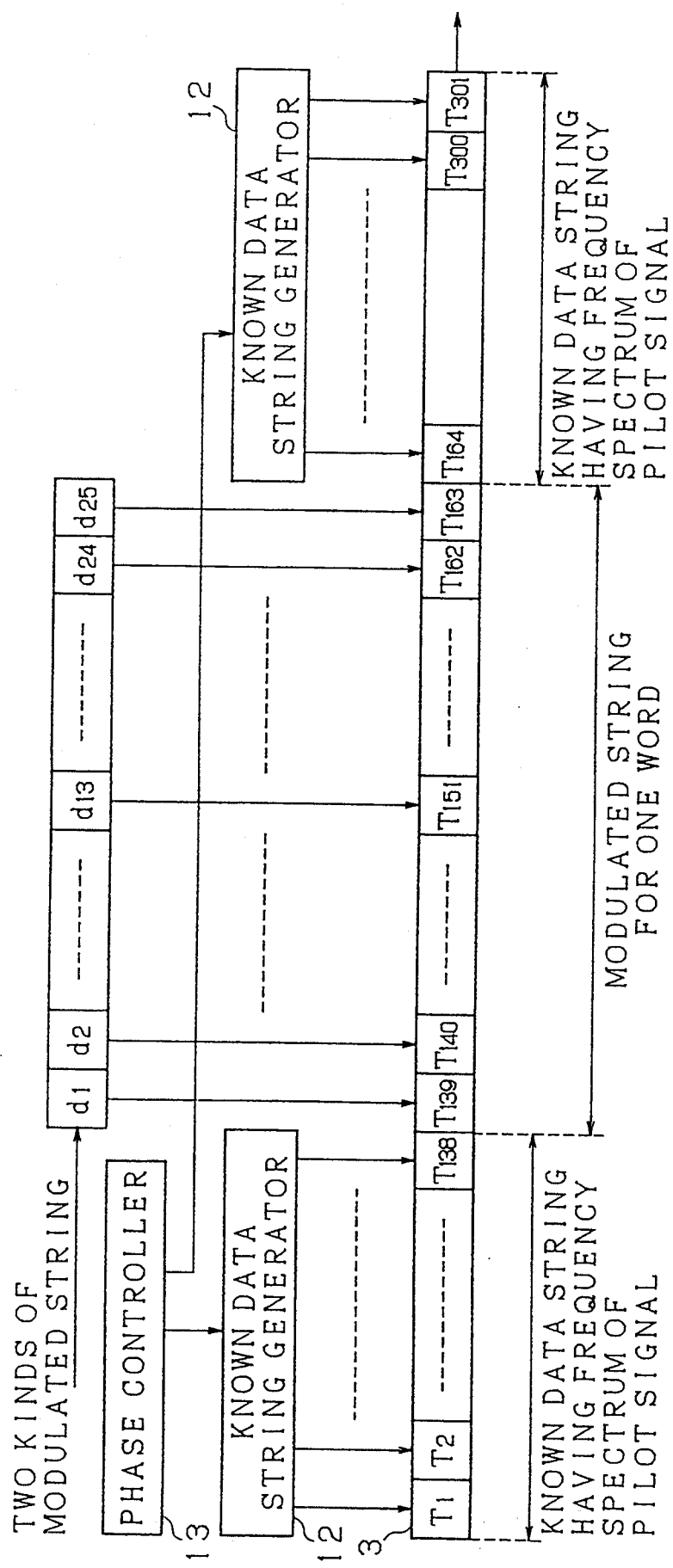
FIG. 12 is a block circuit diagram of a data string adder of the data conversion device of embodiment 5.

FIG. 12 shows the circuit construction of the data string adder of the data conversion device, according to embodiment 5 of the invention. An object of this embodiment is to reduce the circuit scale and the number of calculations placing emphasis on the data string adder 3 and the STSA 4. In the description that follows, emphasis will be placed on the circuit construction of the data string adder and the STSA.

First, let the number of taps of the STSA 4 be an odd number. Although it is assumed to be 301 here as an example, the embodiment is not restricted to this arrangement. When performing the spectrum analysis of the pilot signals of Fch/150 with this STSA, absolute values of the real term $h(hT-rT)\cos(\omega rT)$ and the imaginary term $h(nT-rT)\sin(\omega rT)$ of the STSA 4 shows bilateral symmetry with respect to the center (150th tap) of all taps.

Further, a known data string having the frequency spectrum of the pilot signals is added by the data string adder 3 so that the central bit (d13: 13th bit) of the 2 modulated data strings of 1 word of embodiment 3 overlaps with the central tap of the STSA 4. This process is shown in FIG. 12. The known data string is added to the modulated string of the 1 word while compensating the phase by the phase controller 13. The data string of 301 bits generated in the data string adder 3 is input to the STSA 4 which has 301 taps, where it is subjected to frequency analysis with the result being stored in the memory 5 and its magnitude is compared in the comparator 6 and, under the direction of the output selector 7, a modulated data string having greater Fch/150 spectrum is selected from the memory 8 and is output. Data conversion is carried out by repeating this procedure.

Because the STSA 4 at this time shows bilateral symmetry of the real term and the imaginary term with respect to the center (T151) of all taps, the constant unit of the real term and the imaginary term can be used in common for the left and right sides, making it possible to reduce the number of coefficient units. In order to simplify the description of the STSA, taps corresponding to the known data strings are replaced with coefficient units as in embodiment 4, and the number of taps of the FIR filter is assumed to be 25 bits (T139 through T163). The following description assumes these conditions.

The data string which is input to the STSA 4 is digital data of binary levels, 0 or 1, and the number of calculations of the constant unit can be reduced by calculating before using the constant unit for 2 sets of data which use the same constant unit. This process is described with reference to FIG. 13 which illustrates the values of the real term and the imaginary term of the STSA 4 and the control method when using each term in common. The real term is illustrated in FIG. 13(*a*), (*b*) and the imaginary term is illustrated in FIG. 13(*c*), (*d*). It is also assumed that the 25 taps from T139 to T163 correspond to d1 through d25 in FIG. 13. In the case of the real term, the constant units on the right and left are identical including the complement when viewed from d13 as shown in FIG. 13(*a*), and the outputs of the constant unit when d1 and d25 are 0 and 1, for example, are as shown in FIG. 13(*b*). In the case of the imaginary term, although the constant units on the right and left are identical when viewed from d13 as shown in FIG. 13(*c*), the complement is different and the outputs of the constant unit when d1 and d25 are 0 and 1, for example, are as shown in FIG. 13(*d*).

Figure 14:
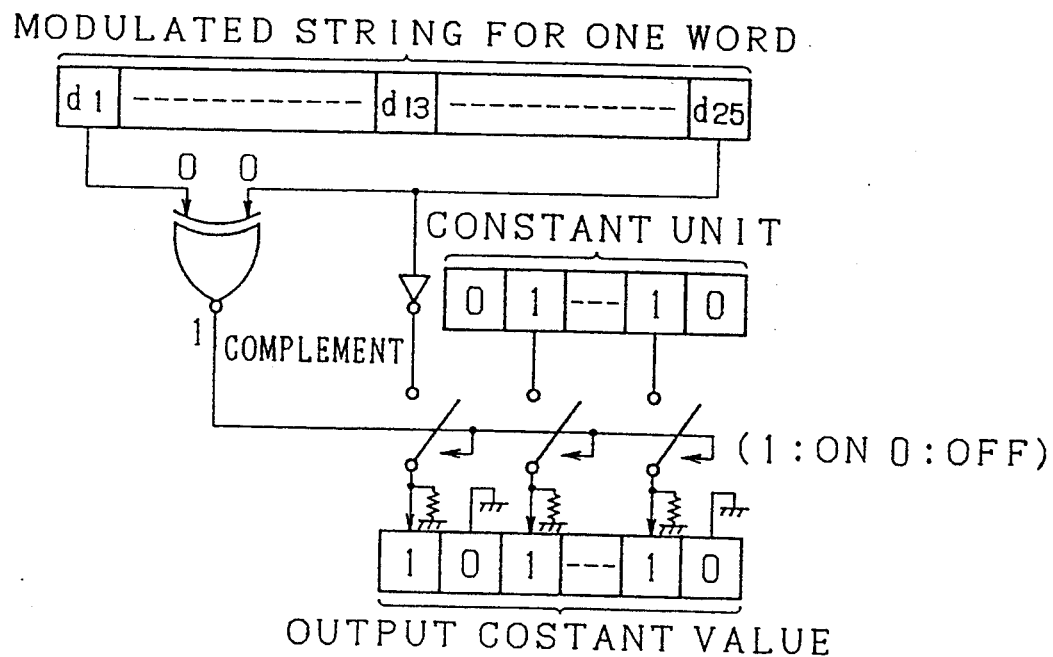
FIG. 14 is a block circuit diagram of the short time spectrum analyzer of the data conversion device of embodiment 5.

As described above, a constant of twice the value is set beforehand in the constant unit which is used in common, and whether to enable or disable the output of the constant unit and the complement of the constant unit are controlled by means of two bits which correspond to d1 and d25, thereby giving an output of the constant. An example of the real term circuit of the STSA 4 according to this embodiment is shown in FIG. 14. In the case of 25 bits, 12 constants and a constant corresponding to d13, 13 constants in all, are output simultaneously, and are summed up and output as the result. The value of the coefficient unit is added to this output to calculate the square sum which is output as the result of analysis of the STSA 4.

As described above, in embodiment 5, the real term and imaginary term of the STSA are made laterally symmetrical with respect to the center of the taps, and real terms and imaginary terms are used in common during frequency analysis of the data strings and, consequently, circuit scale of the STSA can be reduced and the number of calculations can be reduced without deteriorating performance.

Embodiment 6

Figure 15:
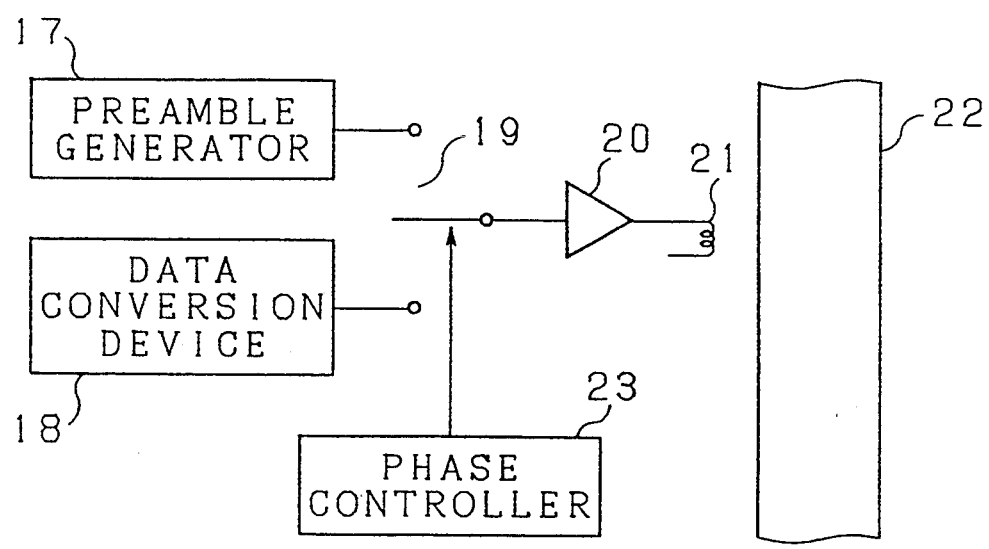
FIG. 15 is a block circuit diagram of the recording/reproduction apparatus of embodiment 6.
Figure 16:
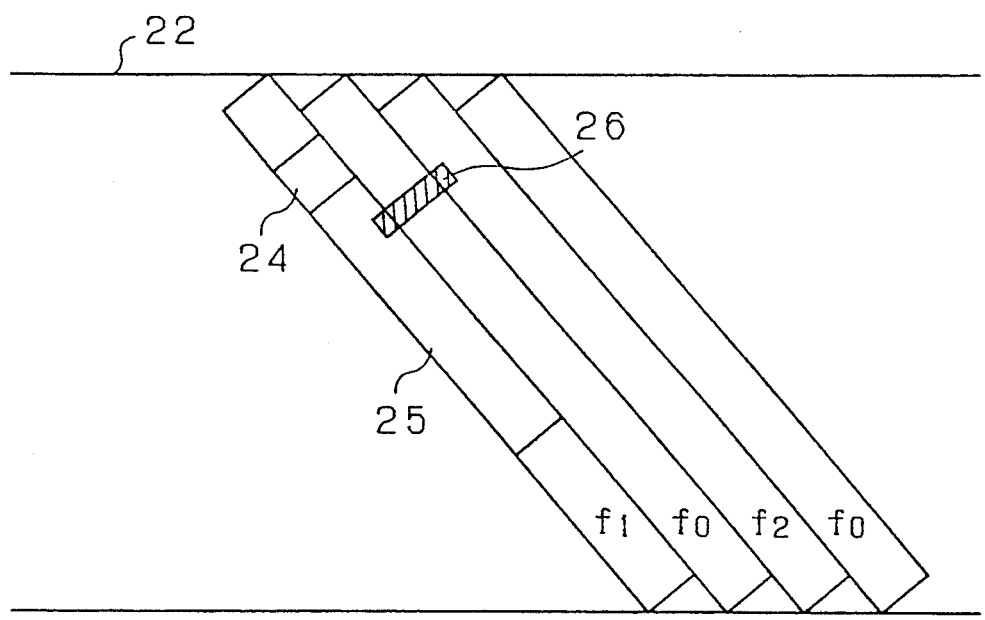
FIG. 16 is a recording pattern diagram on the recording tracks of the recording/reproduction apparatus of embodiment 6.
Figure 17:
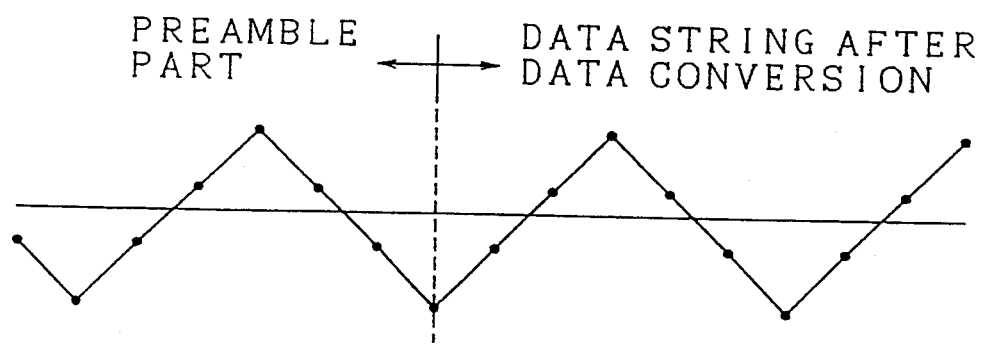
FIG. 17 is a drawing illustrative of a portion of the pilot signal between the preamble section and the data string after data conversion.

FIG. 15 shows the circuit construction of the recording/reproduction apparatus according to embodiment 6 of the invention. Numeral 17 denotes a preamble generator. Numeral 18 denotes a data conversion device according to the invention. Numeral 19 denotes a record signal selector switch. Numeral 20 denotes a recording amplifier, Numeral 21 denotes a recording magnetic head. Numeral 22 denotes a magnetic tape. Numeral 23 denotes a phase controller. FIG. 16 shows a recording pattern on the recording tracks of the data recording/reproduction apparatus according to embodiment 6. Numeral 24 denotes a preamble part. Numeral 25 denotes a recording section of data strings which are converted with the data conversion method of the invention. Numeral 26 denotes a reproduction magnetic head. FIG. 17 shows an example of joining the pilot signal between the preamble part and the data string after data conversion.

The operation of embodiment 6 will now be described below. The preamble generator 17 outputs a data string having the frequency spectrum of the pilot signals. This data string includes, for example, such signals as shown in FIG. 4. The data string converted with the data conversion method of the invention is added to this data string, with the result being recorded. This process is shown in FIG. 16. There are two kinds of pilot signals, f1 and f2, and no pilot signal is recorded in f0. The reproduction magnetic head 26 is a little wider than the recording track, and reproduces the pilot signals of the adjacent f1 and f2 as the crosstalk when reproducing the f0 track. By moving the reproduction magnetic head 26 so that the levels of the pilot signals of f1 and f2 become identical, data recorded on the f0 track can be reproduced correctly. This procedure is called the DTF (Dynamic Tracking Following) servo.

Using the DTF servo, it is desirable that not only the pilot signals of f1 and f2 which are recorded have the same levels but also the pilot signals on the track are consecutive. Therefore, although the pilot signals are recorded in the preamble part 24 and the recording section 25 of the data string after data conversion, level and phase of the pilot signals change at the joint if the pilot signals are out of phase making an obstruct for the DFT servo. This means that matching the phase is required. FIG. 17 shows the pilot signal at the joint. If the phase is matched in this way, for example, such a level variation of the pilot signals that obstructs the DTF servo will not occur, and stable pilot signals without disturbance can be obtained as the tracking control signals.

It is obvious from the foregoing description that, with the end of the phase of the preamble part 24 being fixed, for example, as shown in FIG. 17 to match the first phase of the output from the data conversion device 18 thereto, the phase of the known data string having the frequency spectrum of the pilot signals to be added in the data string adder 3 and the phase of the output modulated data string become identical in the case of, for example, the data conversion device of embodiment 1. Therefore, it will be sufficient to set the known data string of 150 bits so that it matches the phase of the preamble.

Although the frequencies of the pilot signals generated are limited to Fch/150 (1/6 words) in the above description of embodiments 1 through 6, 1/(2×word period) is sufficient to generate the pilot signals of frequencies 1/100 times the Fch similarly to the above.

Embodiment 7

Figure 18:
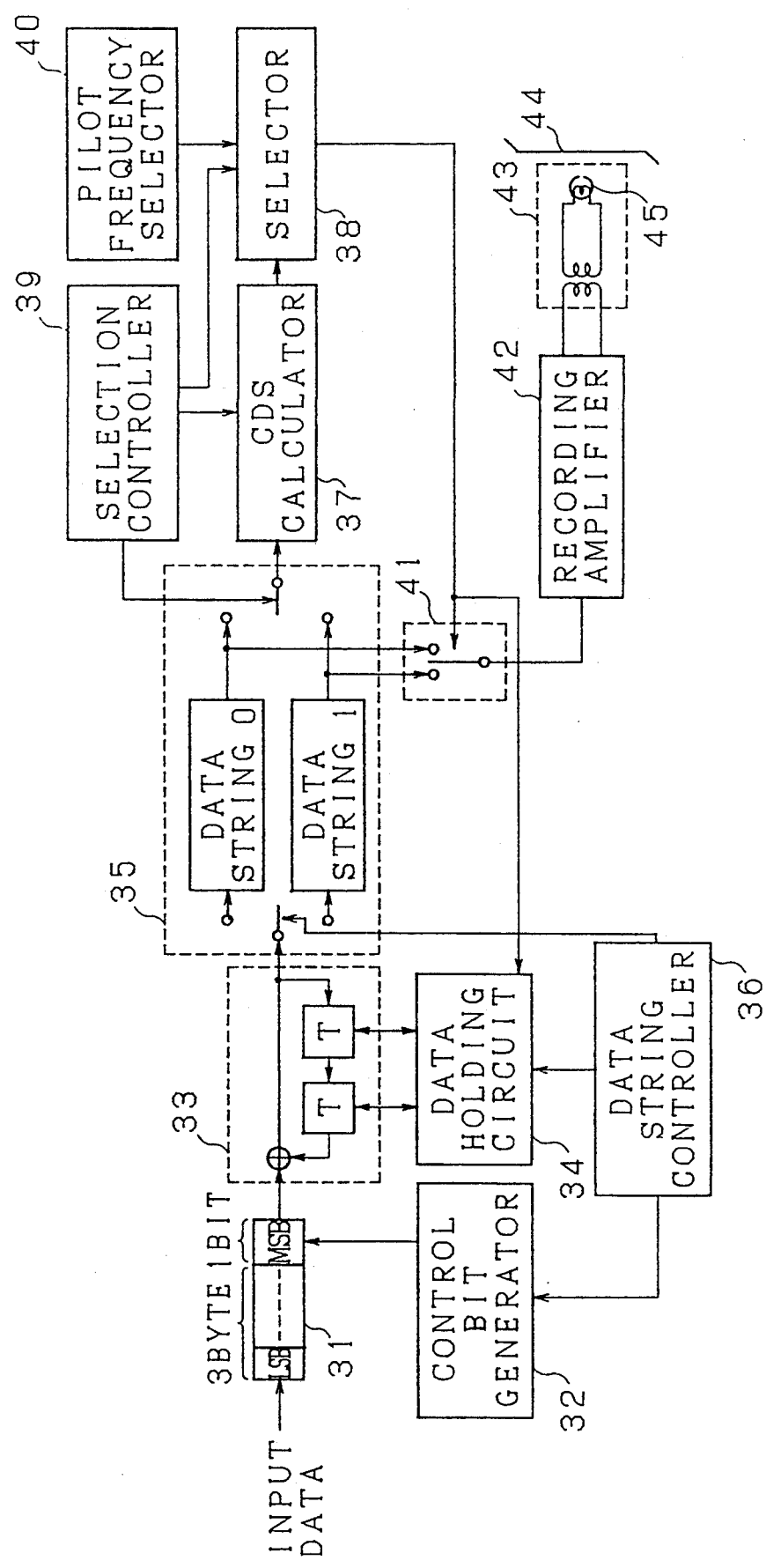
FIG. 18 is a block circuit diagram of the recording/reproduction apparatus of embodiment 7.

Embodiment 7 will now be described below. FIG. 18 shows the circuit construction of the recording/reproduction apparatus according to embodiment 7 of the invention. Numerical 31 denotes a control bit adder. Numeral 32 denotes a control bit generator. Numeral 33 denotes an I-NRZI modulator. Numeral 34 denotes a data holding circuit which holds the data of the I-NRZI modulator 33. Numeral 35 denotes a memory which stores a data string 0 or a data string 1. Numeral 36 denotes a data string controller. Numeral 37 denotes a CDS calculator. Numeral 38 denotes a selector. Numeral 39 denotes a selection controller. Numeral 40 denotes a pilot frequency selector. Numeral 41 denotes an output selector switch. Numeral 42 denotes a recording amplifier. Numeral 43 denotes a rotary drum with 180 degrees opposing heads mounted thereon. Numeral 44 denotes a magnetic tape. Numeral 45 denotes A head having plus azimuth among the magnetic heads.

This embodiment assumes a single input of 3 bytes (24 bits) for the input data. Data length of the input data will be described below. Input data is treated in the unit of byte (8 bits). A control bit to be added is 1 bit, and better conversion efficiency is obtained as the input data length is increased. However, because either a data string of 0 obtained by adding a control bit of 0 to the input data and applying I-NRZI modulation or a data string of 1 obtained by adding a control bit of 1 to the input data and applying I-NRZI modulation is selected for the record signal, longer input data leads to deteriorated selection characteristic and lower level of the pilot signal which is the object. Based on these considerations, input data length is set to 3 bytes in this embodiment, which results in a conversion efficiency of 96%.

The pilot frequency to be added to the recorded signals will now be described below. As described in the prior art, reproduction of pilot signals during ATF servo or the like is made using crosstalk from the track adjacent to the reproduced track wherein azimuth recording has been done. Because crosstalk signals have greater levels when the frequency is lower which results in reduced azimuth loss, a lower frequency is selected for the pilot signals. However, recording signals pass the rotary transformer, which has low frequency cutoff characteristic when being recorded on the magnetic tape 44 via the rotary drum 43. It is impossible to record pilot signals on the magnetic tape unless the frequency is equal to or higher than the cutoff frequency. From these considerations, this embodiment assumes a recording bit rate fch=35.388 MHz and pilot frequencies f1=fch/150 (235.9 kHz), f2=fch/100 (353.9 kHz).

The operation of embodiment 7 will now be described below. First the procedure of generating a data string of 0 will be described. The control bit adder 31 adds a control bit 0 generated in the control bit generator 32 to the MSB of the 3-byte input data to form a 25-bit data string. Then the I-NRZI modulator 33 reads the previous data from the data holding circuit 34, applies I-NRZI modulation to the data string of 25 bits, generates the data string 0 and stores it in the memory 35. Data of the delay circuit of the I-NRZI modulator 33 is temporarily stored in the data holding circuit 34. Then the data string 1 is generated. The control bit generator 32 is controlled by the data string controller 36 to generate a control bit of 1. The data string 1 is generated similarly to the case of data string 0 and is stored in the memory 35. Data of the delay circuit of the I-NRZI modulator 33 is also temporarily stored in the data holding circuit 34.

Among the data string 0 and the data string 1 stored in the memory 35, the data string 0 is first retrieved by the selection controller 39 and is input to the CDS calculator 37 to calculate CDS. A result of the CDS calculation is input to the selector 38 for temporary storage. Then the data string 1 is retrieved by the selection controller 39 and is input to the CDS calculator 37 to calculate CDS. A result of the CDS calculation is input to the selector 38 for temporary storage. The selector 38, under the direction of the pilot frequency selector 40, changes the CDS periodically and selects either one of the known CDS values which is given as the pilot frequency component of f1 (hereafter called the known CDSf1) and the known CDS value which is given as the pilot frequency component of f2 (hereafter called the known CDSf2).

The known CDS will now be described. Amplitude of low frequencies of the digital data can be represented by CDS. In this embodiment, known CDS is obtained by periodically changing the CDS with data length of 25 bits. First f1 will be considered. f1 is the frequency of 1/150 times the fch, and can be generated by considering a data string which has a period of 150 bits. Known CDS can be represented by 6 CDs (150 bits/25 bits=6). The greater the amplitude, the greater the pilot signal energy, and therefore the CDS value is desirably greater. However, the input data is random data and the values of CDS which a 25-bit data string can have are, in the descending order of probability, ±1, ±3, ±5, ±7 . . . , ±25. From these considerations, the known CDSf1 of this embodiment is set to +3, +3, +3, −3, −3, −3. Similarly, the known CDS f2 of is set to +3, +3, −3, −3.

Now assume that the known CDS f1 is selected. Values of CDS of the data string 0 and the data string 1 which are input to the selector 38 are compared to the known CDS f1, and the value of CDS nearer to the known CDSf1 is selected. The known CDS is repetitively updated as +3, +3, +3, −3, −3, −3, +3, +3, . . . , every time the result of comparison is output. The result of selection is input to the output selector switch 41, then the data string 0 or data string 1 is output as the recording signal.

The result of selection is also input to the data holding circuit 34, and either one of the data of the delay circuit of the I-NRZI modulator 33 temporarily stored when generating the data string 0 or data string 1 is selected and stored. This data is used as the data for generating the next data string 0 or data string 1. If the data string is generated by using the previous data, the input data can be reproduced when demodulating. I-NRZI modulation is a precoder of partial response class IV (PR4), and PR4 and BITABI demodulation are used in reproduction/demodulation.

The recording signals are input to the recording amplifier 42 and recorded onto the magnetic tape 44 via the rotary drum 43. In the explanatory drawing of the ATF servo of FIG. 2 of the prior art, only the A head is used to record the pilot signals, and the pilot frequency change with every half revolution of the drum which has a pair of heads opposite by 180 degrees. Therefore the pilot frequency selector 40 switches the frequency between f1 and f2 at every half revolution of the drum.

Figure 19:
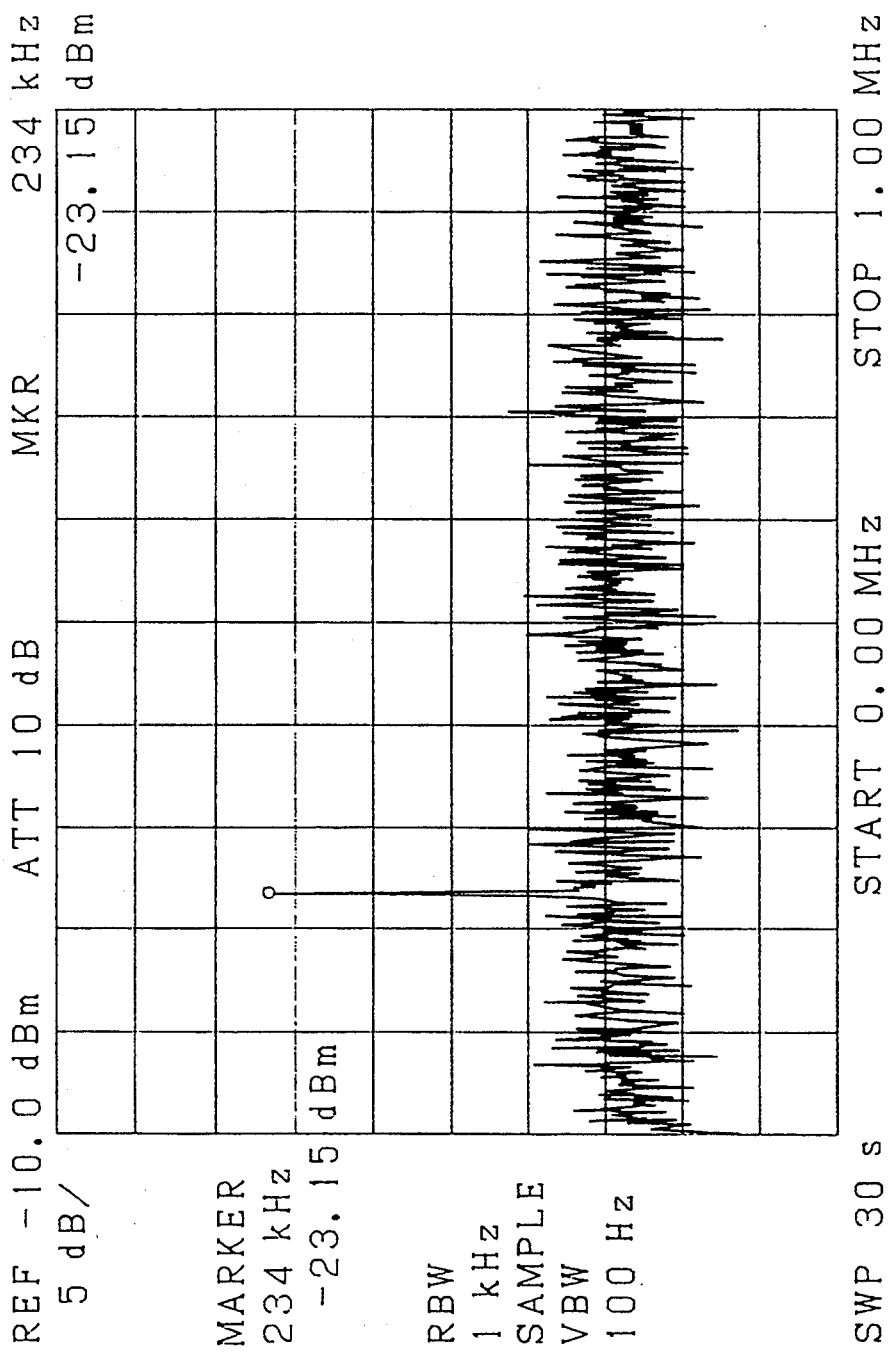
FIG. 19 is a drawing illustrative of the frequency spectrum of the data string with pilot signals of f1 which are output as a result of simulating embodiment 7.
Figure 20:
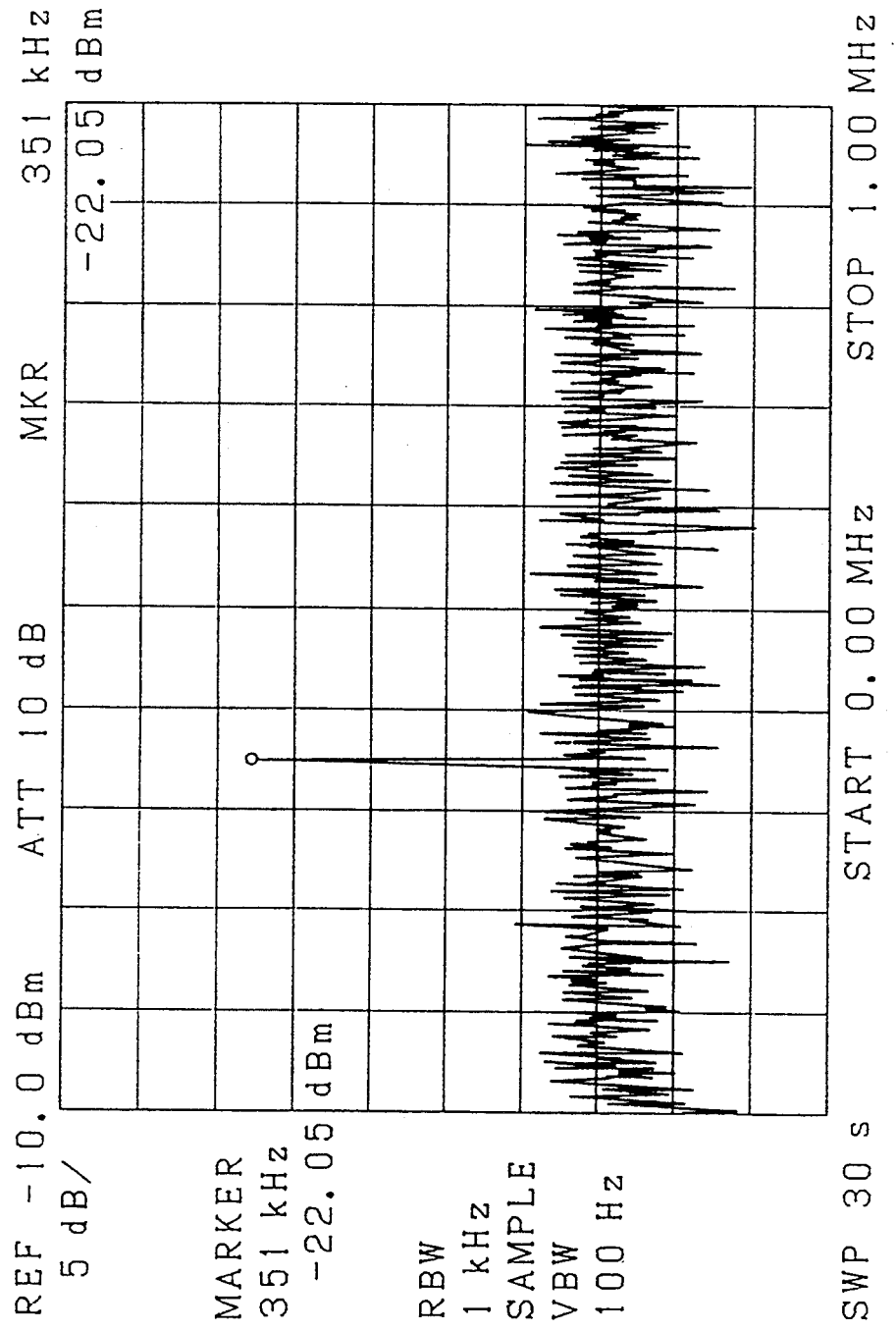
FIG. 20 is a drawing illustrative of the frequency spectrum of the data string with pilot signals of f2 which are output as a result of simulating embodiment 7.

A result of a simulation of such an embodiment as described above is shown in FIG. 19 and FIG. 20. FIG. 19 shows the pilot signals of f1. FIG. 20 shows the frequency spectrum of the output with the pilot signal of f2 being added thereto. In either case pilot signals of 22 to 23 dB can be obtained.

According to embodiment 7, recording signals with pilot signals synchronized with the digital data being added thereto are generated by adding one control bit to the n-bit input data, and therefore the conversion efficiency can be increased. Also because the pilot signals can be generated simply by comparing the CDS of the input data and the known CDS, the circuit can be made in a smaller scale at a lower cost.

Embodiment 8

Figure 21:
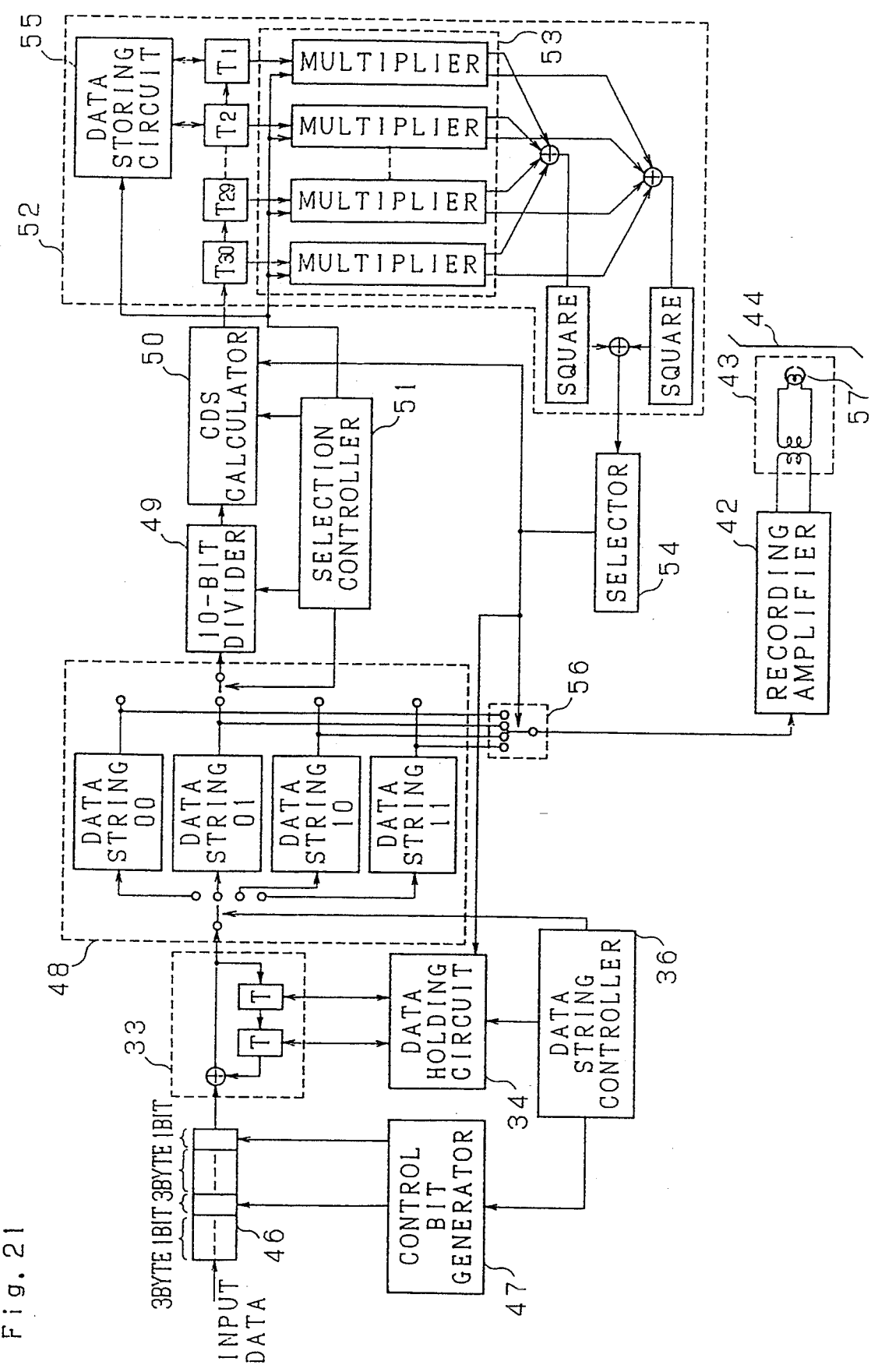
FIG. 21 is a block circuit diagram of the recording/reproduction apparatus of embodiment 8.

Embodiment 8 will now be described below. FIG. 21 shows the circuit construction of the recording/reproduction apparatus according to embodiment 8 of the invention. The same circuits as those shown in FIG. 18 will be given the same numerals and description thereof will be omitted. Numeral 46 denotes a control bit adder. Numeral 47 denotes a control bit generator. Numeral 48 denotes a memory to store the data strings 00 through 11 (data string subjected to I-NRZI modulation with 2 control bits being added thereto is called data string 00. Data string 01, data string 10, and data string 11 are similarly defined). Numeral 49 denotes a 10-bit divider which divides data into 10-bit groups. Numeral 50 denotes a CDS calculator which calculate CDS of the divided data. Numeral 51 denotes a selection controller which controls data during calculation for the selection of record signals. Numeral 52 denotes an STSA. Numeral 53 denotes a multiplier which multiplies the coefficient of the STSA 52 with the input data. Numeral 54 denotes a selector. Numeral 55 denotes a data storing circuit. Numeral 56 denotes a 4-channel output selector switch. Numeral 57 denotes a B head having minus azimuth among the magnetic heads.

First the input data length will be described. Similar to embodiment 7, a data string is generated by adding one control bit to the 3-byte input data. However, in this system, the generated data string is divided into 10-bit groups but the data string cannot be divided by 10 because it consists of 25 bits. To solve this problem, two 25-bit data strings are generated at the same time to generate a 50-bit data string. At this time two control bits are added in four combinations; 00, 01, 10, 11. Pilot signal frequencies are set to fch/150 and fch/100 similarly to embodiment 7.

The operation of embodiment 8 will now be described below. First a data string 00 is generated. 3-byte input data is input twice to the control bit adder 46. The control bit generator 47 outputs control bits in the combination of 00 and adds it to the MSB of each of the two 3-byte input data. This is subjected to I-NRZI modulation similarly to embodiment 7 to generate the data string 00 and stores it in the memory 48. Then the data string 01 is generated. The data string controller 36 controls the control bit generator 47 to generate control bit 01. This is followed by a process of generating the data string 01 and storing it in the memory 35, similar to that for the data string 00 described above. Similar process is carried out for data strings 10 and 11.

Among the data strings 00 through 11 which are stored in the memory 48, the data string 00 is first retrieved by the selection controller 51 and is input to the 10-bit data. These are input to the CDS calculator 50 successively to calculate CDS of each of the 5 data groups. 5 CDS values calculated are input to the STSA 52 which carries out spectrum analysis. Defining equations for the short time spectrum analysis are the same as those of embodiment 1 and will not described here.

The STSA 52 shown in FIG. 21 of this embodiment will now be described below. Frequencies of analysis are f1 being fch/150 and f2 being fch/100. A common multiple of 150 and 100 is selected for the number of taps to include integral numbers of these periods. While the bandwidth of spectrum analysis becomes narrower when the number of taps increases, the bandwidth appears in the output as the notch width of the notch signals (record signals with attenuated frequency components). Because signals including pilot signals and notch signals being mixed are extracted with the BPF of the pilot frequency during reproduction, the notch width must be wider than the pas band of the BPF. For this reason, STSA of 300 taps is assumed in this embodiment. However, constructing hardware of STSA 52 with 300 taps leads to a very large scale of circuit and is not practical. Therefore, the STSA 52 is constructed with 1/10 the number of taps by calculating CDS for every 10 bits of data which is input to the STSA 52 and using the mean energy of the low frequencies included in the digital data. In this embodiment, 300 bits of data is analyzed in the STSA 52 of 30 taps.

The process of spectrum analysis in the STSA 52 of 30 taps will now be described. Input data is divided into 10-bit data groups and CDS for each data group is calculated and is input to the STSA 52 of 30 taps. Input data at each tap of the STSA is multiplied by the coefficient value in the multiplier 53. Because the coefficient value changes every time each of f1 and f2 is calculated, it is controlled by the selection controller 51. The real term and the imaginary term are determined by calculating as described above, and are squared and summed to obtain the power spectrum.

The operation of embodiment 8 will now be described with reference to FIG. 21. T1 through T30 are shift registers. 5 values of CDS of the data string 00 are input to T26 through T30. Spectrum analysis is carried out first for f1. The multiplier 53 is controlled by the selection controller 51 to select the coefficient of f1. A value of CDS input to each tap and the coefficient of the multiplier 53 are multiplied, and the real terms and the imaginary terms are separately summed, each being squared and summed to perform the spectrum analysis. A result of the spectrum analysis is input to the selector 54 and is temporarily stored therein. Then the selection controller 51 controls the multiplier 53 to switch the multiplier 53 to multiply the coefficients of f2. In the rest of the process, spectrum analysis is carried out and the result is temporarily stored in the selector 54 similarly to that of f1. Then the data of T1 through T25 is stored by the selection controller 51 in the data storing circuit 55.

Then spectrum analysis is carried out on the data string 01. Data is stored in T26 through T30 similarly to the data string 00. The data stored in T1 through T25 is retrieved from the data storing circuit 55. Spectrum analyses of f1 and f2 are carried out similarly to the data string 00 with the result temporarily stored in the selector 54. Similar operations are carried out for the data strings 10 and 11.

Then in the selector 54, the data string which gives the smallest values of f1 and f2 is selected from among the data strings 00 through 11 based on the result of spectrum analysis calculated as described above. A result of the selection is used in switching the output selector switch 56 and providing one of the data strings 00 through 11 as the output record signal. This is input to the recording amplifier 2 and is recorded on the magnetic tape 44 by the magnetic head 57 of the rotary drum 43. The result of selection is also input to the data holding circuit 34, and data is selected from the data of the I-NRZI modulator 33 after the data strings 00 through 11 were generated and is stored. This data is used in generating the next data string. The result of selection is also input to the CDS calculator 50, and the CDS value calculated for the selected data string is input to the STSA 52, thereby the data of T1 through T25 stored by the data storing circuit 55 as described above is retrieved.

According to embodiment 8, notch signals of both f1 and f2 can be generated by adding 1 control bit to the n-bit input data. Because the data string is divided by m bits to calculate the CDS thereof, and the CDS value is used in the spectrum analysis by the STSA, the STSA can be constructed with 1/m the number of taps making it possible to construct it in a small scale of circuit at a low cost.

Embodiment 9

Figure 22:
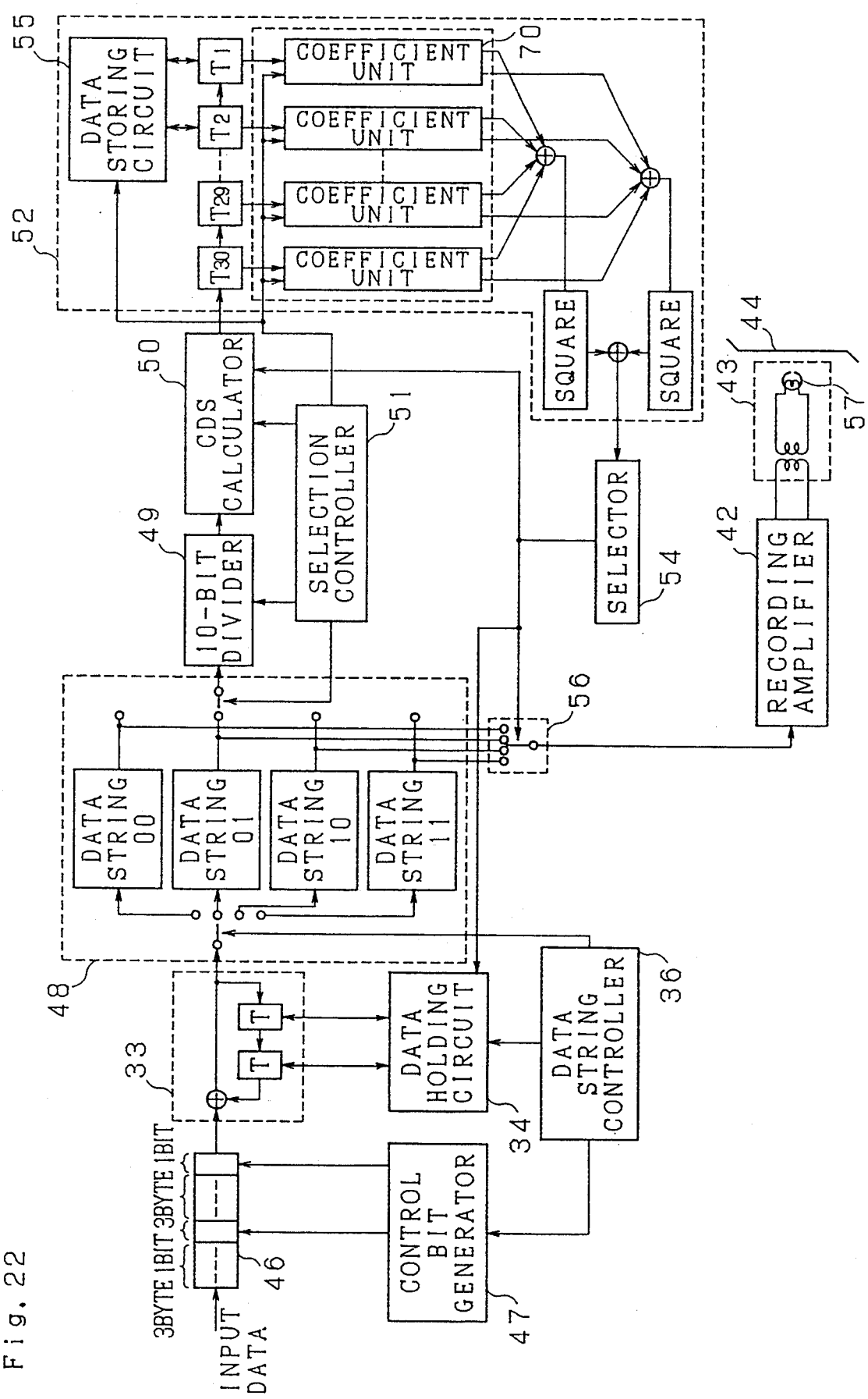
FIG. 22 is a block circuit diagram of the recording/reproduction apparatus of embodiment 9.

Embodiment 9 will now be described below. FIG. 22 shows the circuit construction of the recording/reproduction apparatus according to embodiment 9 of the invention. The same circuits as those shown in embodiment 8 will be given the same numerals and description thereof will be omitted. Numeral 70 denote a coefficient unit of the STSA 52.

Embodiment 9 is a variation of the circuit construction of the STSA of embodiment 8. The STSA according to embodiment 9 will be described below. Frequencies of analysis are f1 being fch/150 and f2 being fch/100. A common multiple of 150 and 100 is selected for the number of taps to include integral numbers of these periods. Because pilot signals are extracted with the BPF during reproduction, the notch width must be wider than the pass band of the BPF. For this reason, STSA of 300 taps is assumed in this embodiment.

By dividing the STSA which originally has 300 taps into 10-tap groups to form 30-tap STSA 52 (STSA of 30 taps will hereafter be called STSA 52 by using the numeral in FIG. 22), and the value of CDS of the 10-bit data input to the divided 10 taps is calculated and is regarded as the amplitude energy of the low frequency range to carry out the spectrum analysis. This allows analyzing the frequency spectrum of f1 and f2 of the 300-bit data by means of the 30-tap STSA 52. The STSA 52 will now be described below.

Coefficients of the taps of the STSA 52 will be described below. Each tap of the STSA 52 is originally constituted of 10 taps, and the CDS values which the 10-bit data input thereto can have are 0, 2, 4, 6, 8, 10. FIG. 23 shows the representative data having each of these CDS values. Coefficient of each tap of the STSA 52 is the sum of the 10 coefficients which are output when representative 10-bit data of FIG. 23 is input to the original 10 taps. Each tap has the same number of coefficients as the kinds of data of each CDS value of FIG. 23 and, in this embodiment, has 11 coefficients per tap.

The process of spectrum analysis in the STSA 52 will now be described. Input data is divided into 10-bit data groups to calculate CDS for each data group, and is input to the STSA 52 of the 30 taps. At each tap of the STSA 52, coefficient value calculated from the data of the same CDS value as the input CDS value is selected. This is calculated to determine the real term and the imaginary term which are squared and summed up to obtain the power spectrum.

The operation of embodiment 9 will now be described with reference to FIG. 22. T1 through T30 are shift registers. CDS values of 10-bit data of the data string 00 are input to T26 through T30. Spectrum analysis is carried out first for f1. The coefficient unit 70 is controlled by the selection controller 51 to select the coefficient of f1. A value of CDS input to each tap is used to select one of the 11 coefficients by each coefficient unit of the coefficient unit 70, and the real terms and the imaginary terms are separately summed, each being squared and summed to perform the spectrum analysis. A result of the spectrum analysis is input to the selector 54 and is temporarily stored therein. Then the selection controller 51 controls the coefficient unit 70 to select the coefficient of each tap from the coefficients of f2. In the rest of the process, spectrum analysis is carried out and the result is temporarily stored in the selector 54 similarly to that of f1. Then the data of T1 through T25 is stored by the selection controller 51 in the data storing circuit 55.

Then spectrum analysis is carried out on the data string 01. Data is input in T26 through T30 similarly to the data string 00. The data stored in T1 through T25 is retrieved from the data storing circuit 55. Spectrum analyses of f1 and f2 are carried out similarly to the data string 00 with the result temporarily stored in the selector 54. Similar operations are carried out for the data strings 10 and 11. Then the results of spectrum analysis are compared similarly to embodiment 8 and the selected output is recorded on the magnetic tape 44.

Figure 24:
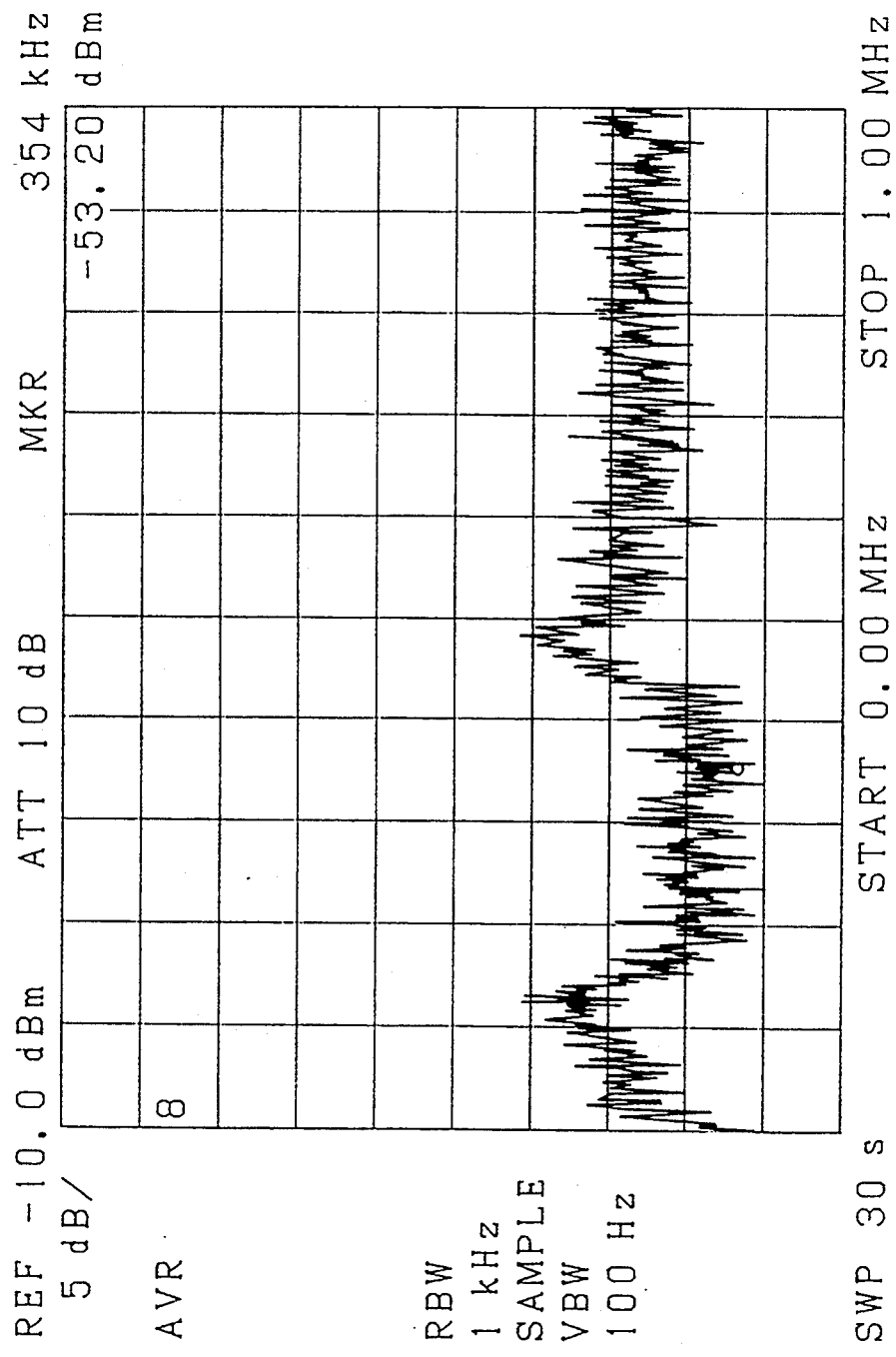
FIG. 24 is a drawing illustrative of the result of simulation assuming 300 taps without compressing STSA.
Figure 25:
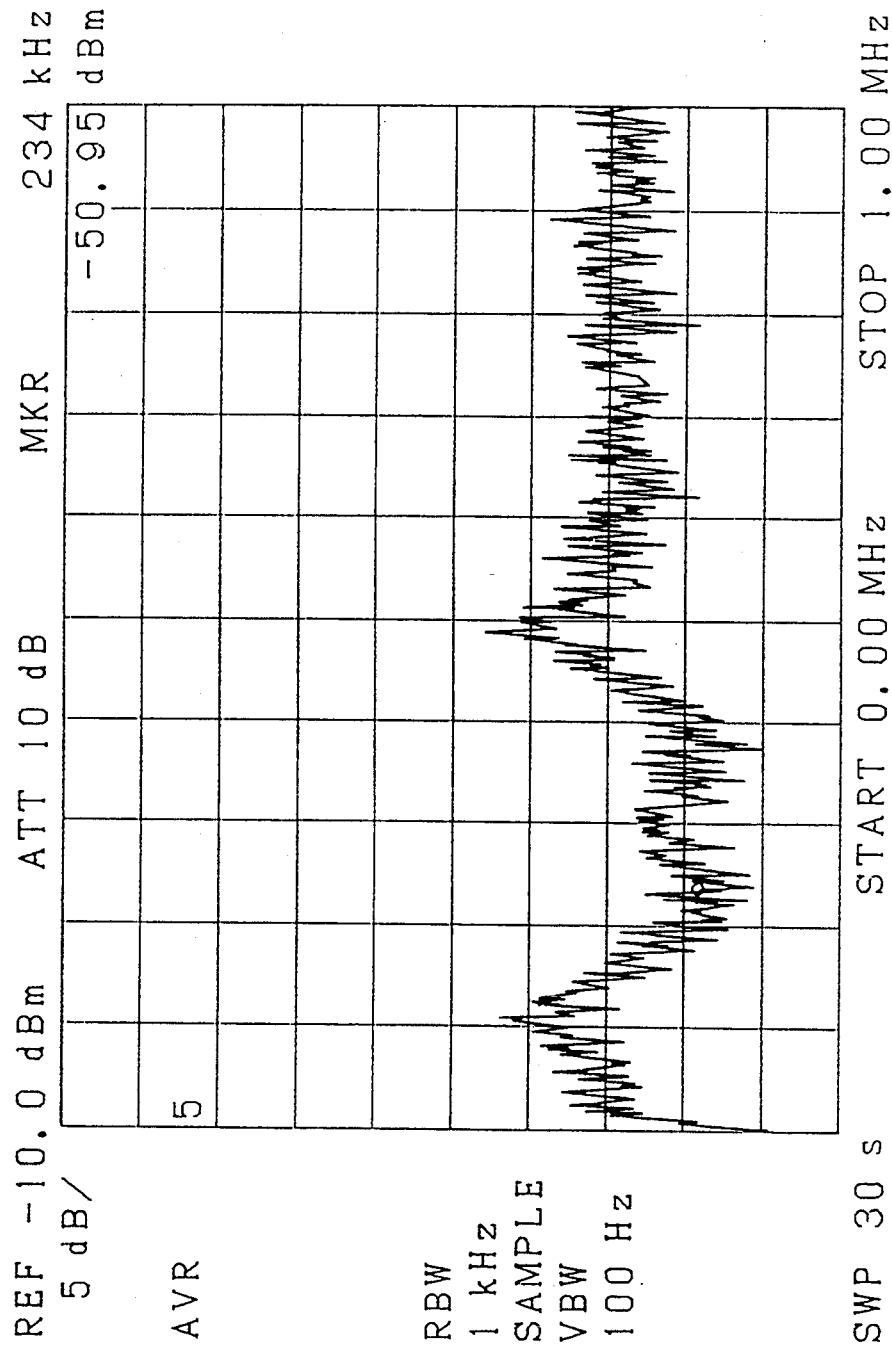
FIG. 25 is a drawing illustrative of the result of simulation when data string is separated into groups each having 10 bits.

FIG. 24 shows the result of simulation by means of STSA of 300 taps. Notch signals of about 5 to 6 dB are obtained. FIG. 25 shows the result of simulation by means of STSA of 30 taps by dividing the data strings into 10-bit groups in this embodiment. A substantially similar result is obtained when compared to FIG. 24.

Figure 26:
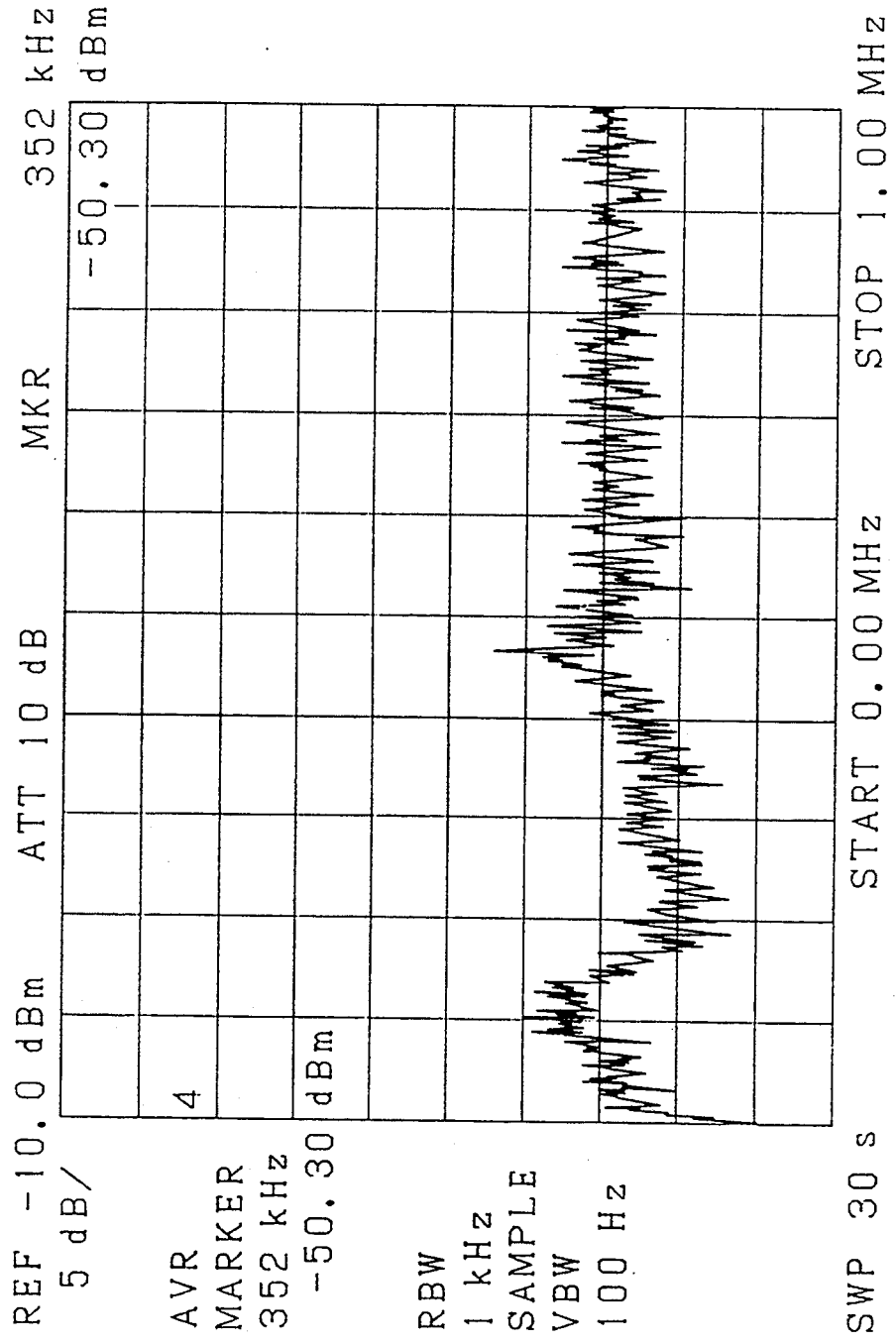
FIG. 26 is a drawing illustrative of the result of simulation when data string is separated into groups each having 25 bits.

While data strings are divided into 10-bit groups in this embodiment, division can be made to data groups of any bit length depending on the input data length and frequency of analysis. However, longer data length after division enables it to smaller scale of hardware, but results in greater errors in the result of spectrum analysis. This problem will be described taking an example below. Data strings may be divided into 25-bit data groups under the conditions of this embodiment. STSA at this time has 12 taps. Result of simulating this is shown in FIG. 26. It shows distorted waveform of the notch signals and decreased attenuation in comparison to FIG. 24. This indicates that the S/N ratio lowers by several dB figures when the pilot signals are extracted during reproduction.

In embodiment 9, a similar result to that of embodiment 8 can be obtained.

Embodiment 10

Figure 27:
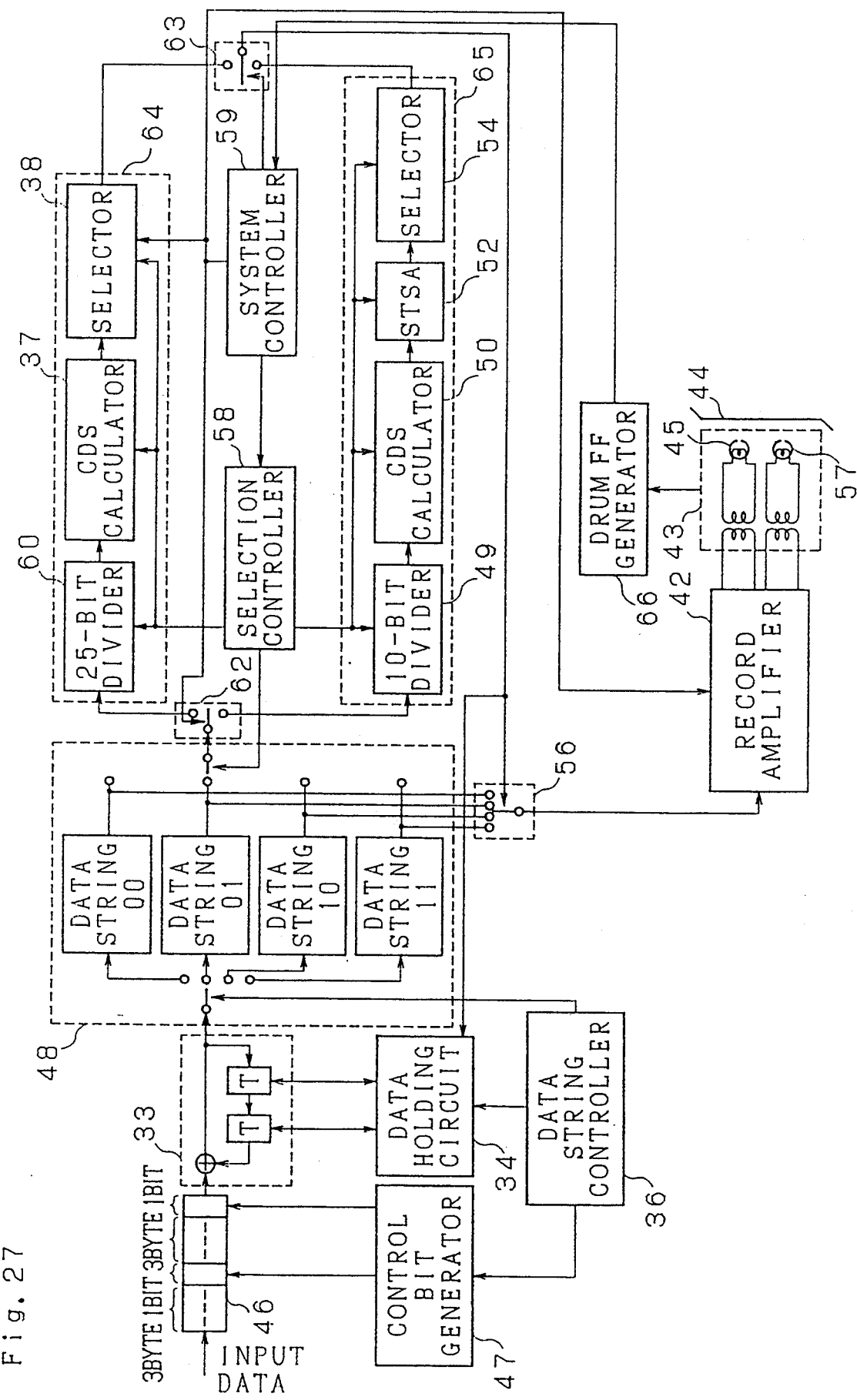
FIG. 27 is a block circuit diagram of the recording/reproduction apparatus of embodiment 10.

Embodiment 10 will now be described below. FIG. 27 shows the circuit construction of the recording/reproduction apparatus according to embodiment 10 of the invention. The same circuits as those of the previous embodiments will be given the same numerals and description thereof will be omitted. Numeral 58 denotes a selection controller. Numeral 59 denotes a system controller. Numeral 60 denotes a 25-bit divider. Numerals 62, 63 denote selector switches. Numeral 64 denotes a pilot signal generator. Numeral 65 denotes a notch signal generator. Numeral 66 denotes a drum FF generator which generates flip-flop signals of 50% duty at the period of drum revolution.

An outline of embodiment 10 will first be described. Embodiment 7 of the invention showed the procedure of generating pilot signals and embodiments 8, 9 showed the procedure of generating notch signals. In a magnetic recording/reproduction apparatus, combination of the above two examples improves the S/N ratio of the pilot signals during reproduction and makes it possible to build a stable servo system. Thus when implementing embodiment 7 and embodiment 8, pilot signal performance can be improved while suppressing the increase of circuit scale, by constructing a system wherein the control bit adder 46, the control bit generator 47, the I-NRZI modulator 33, the data holding circuit 34, the data string controller 36, the memory 48 and the output selector switch 56 which are common to both embodiments are used in common.

Next, the operation of embodiment 10 will be described. The recording pattern is one shown in FIG. 2. The rotary drum 43 has two-channel heads opposite by 180 degrees. During every half rotation of the rotation drum 43, ACH (+1), BCH (notch signal), ACH (+2) and BCH (notch signal) are recorded in this sequence. First the pilot signals of f1 are generated. The procedure up to the generation of the data strings 00 through 11 is the same as in embodiment 8, and will not be described. The system controller 59 switches the selector switches 62, 63 to the side of the pilot signal generator 64, and the selection controller 58 reads the data string 00 and inputs it to the 25-bit divider 60, where the 50-bit data string 00 is divided into two parts. Two 25-bit data groups which have been divided are input to the CDS calculator 37 where each CDS is calculated and input to the selector 38 to be stored temporarily. The same procedure is carried out for data strings 01 through 11. The selector 38 selects, among the CDS values calculated as described above, the nearest one to the known CDS value being made to the known CDS value being made to correspond to f1 described in embodiment 7 by the system controller 59, and outputs the result. The result of the selection is input to the output selector switch 56 wherein the record signals are selected from the data strings 00 through 11 and are input to the recording amplifier 42. The system controller 59 control the recording amplifier 42 to record the signals on the magnetic tape 44 with the ACH head 45. At this time, the drum FF generator 66 generates drum FF signal and inputs to the system controller 59. The drum FF signals is high when recording ACH and is low when recording BCH, for example.

When the drum FF signal changes from high to low, the system controller 59 switches the selector switches 62, 63 to the side of the notch signal generator 65, and further controls the recording amplifier 42 to record with the BCH head 57. The process of generating notch signals is similar to that of embodiment 8, and the description thereof will be omitted.

When the drum FF signal changes from low to high, the system controller 59 switches the selector switches 62, 63 to the side of the pilot signal generator 64, and changes the value of the known CDS of the selector 38 to that corresponding to f2, then controls the recording amplifier 42 to record with the ACH head 45. The process of generating f2 is similar to that for f1, and the description thereof will be omitted.

Because embodiment 10 includes both the pilot signal generator of embodiment 7 and the notch signal generator of embodiment 8 (or embodiment 9) so that a part of the circuits is used in common, it is possible to obtain a system having a good S/N ratio of the pilot signals during reproduction with less circuitry at a low cost.

Embodiment 11

Figure 28:
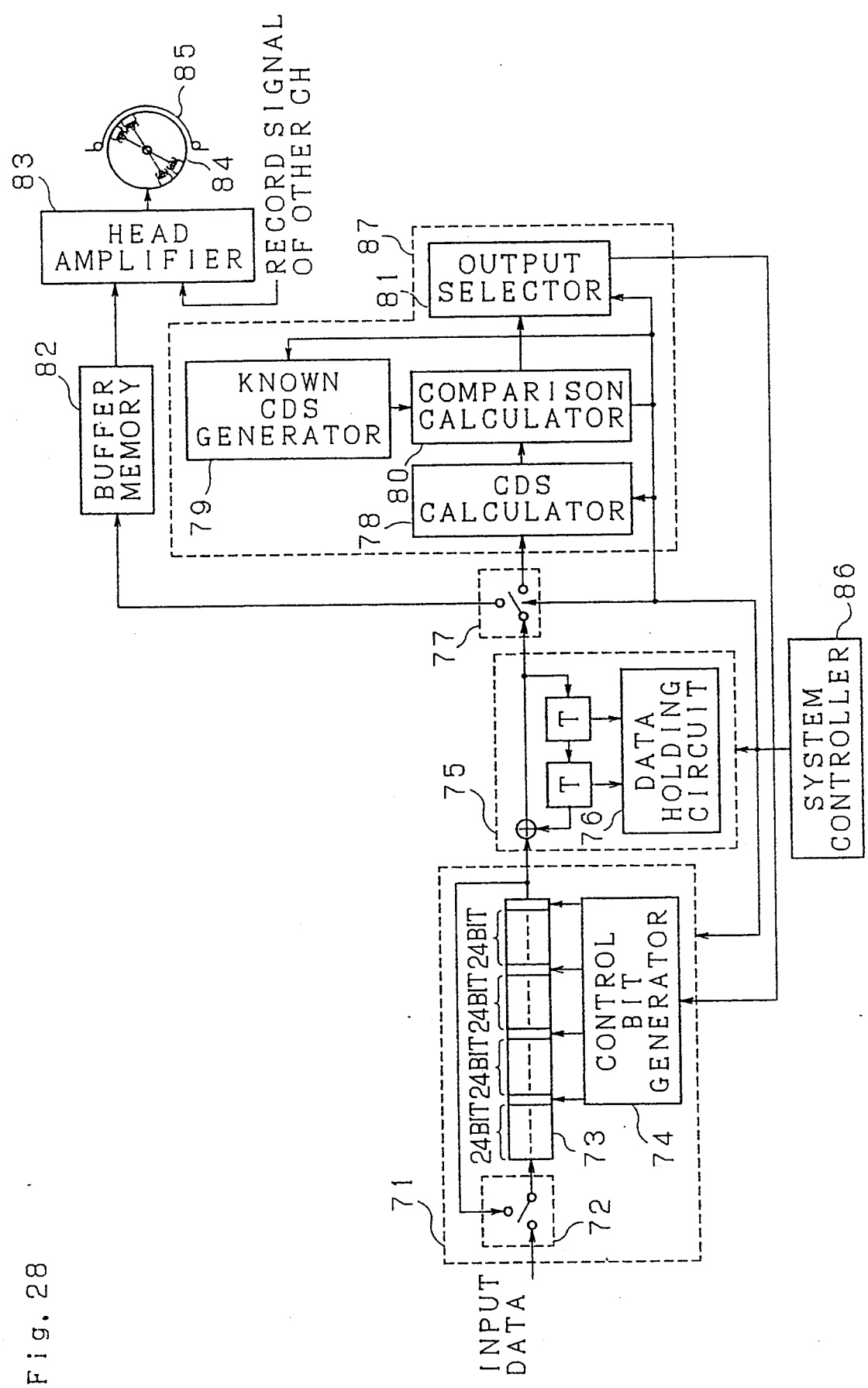
FIG. 28 is a block circuit diagram illustrative of the recording modulation section of the recording/reproduction apparatus of embodiment 11.

Embodiment 11 will now be described below. FIG. 28 shows the block circuit diagram of the recording modulation section of the recording/reproduction apparatus according to embodiment 11 of the invention. In FIG. 28, numeral 71 denotes a control bit adder. Numerals 72, 77 denote selector switches. Numeral 73 denotes a shift register. Numeral 74 denotes a control bit generator. Numeral 75 denotes an I-NRZI modulator. Numeral 76 denotes a data holding circuit. Numeral 78 denotes a CDS calculator which calculates CDS for every 25 bits. Numeral 79 denotes a known CDS generator. Numeral 80 denotes a comparison calculator which calculates the sum of absolute values of differences between the known CDS and the CDS of input data. Numeral 81 denotes an output selector which selects the data corresponding to the result of calculation having the least value. Numeral 82 denotes a buffer memory. Numeral 83 denotes a head amplifier. Numeral 84 denotes a rotary drum. Numeral 85 denotes a magnetic tape. Numeral 86 denotes a system controller. Numeral 87 denotes a first operation unit in embodiment 11.

Figure 2:
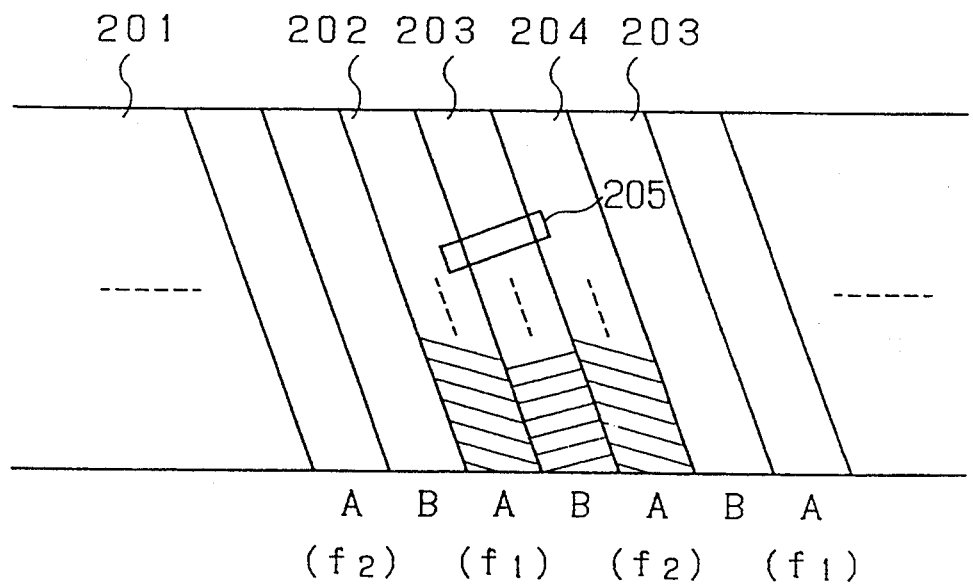
FIG. 2 is an explanatory drawing of ATF servo.

The magnetic recording/reproduction apparatus of this embodiment has an ATF servo of 2-frequency pilot system and a pair of heads opposing at 180 degrees interval, with the recording track pattern of the magnetic tape 85 as shown in FIG. 2. Two tracks A and B are recorded simultaneously at every half revolution of the drum. The pilot signals recorded in the A track are switched between f1 and f2 at every half revolution of the drum. In this embodiment, f1 is set to 1/150 times the fch and f2 is set to 1/100 times the fch.

The input data is digital data obtained by converting the video signals or audio signals, for example, into binary data. The recording modulator of the magnetic recording/reproduction apparatus of this embodiment is controlled by the system control circuit 86. When the magnetic recording/reproduction apparatus enters the recording mode, the system controller 86 outputs control command to each circuit shown in FIG. 28 to carry out recording modulation. First, the input data is input to the control bit adder 71. The selector switch 72 is set on the input data side and four sets of 24-bit data are input to the shift register 73. Then the control bit generator 74 adds a control bit to the MSB of 24-bit input data to generate 100-bit data. The control bit generator 74 generates 4-bit control bits to generate 16 ($2^4$) kinds of data from 0000 through 1111. First, data with control bit, 0000, being added thereto is output from the shift register 73. At this time, the selector switch 72 is switched to the output side of the shift register 73, and the input data is input to the shift register 73 again.

The data with the control bit added thereto is I-NRZI modulated in the I-NRZI modulator 75. The I-NRZI modulator 75 in such a manner as performs EXOR operation with 2-bit delay data. However, because I-NRZI modulation is applied 16 times to one output of recording signal in this embodiment, 2-bit data of the delay device of the record signal which has been output previously must be held. Therefore, data of the delay device at the time the record signal is output to the buffer memory 82 is stored in the data holding circuit 76, and the data of the data holding circuit 76 is read into the delay device of the I-NRZI modulator 75 always when applying I-NRZI modulation. In the data holding circuit 76, because there is not the previous record signal at the first record signal of the track, for example, demodulation is made possible during reproduction if the initial value is set to, for example, 00.

Method of recording modulation will now be described below. In the control bit adder 71, control bit 0000 is generated and subjected to I-NRZI modulation. The selector switch 77 is placed on the CDS calculator 78 side and inputs the I-NRZI modulated data to the CDS calculator 78. CDS for every 25 bits calculated and known CDS which is output from the known CDS generator 78 are input to the comparison calculator 80 to take the difference between the CDS of input data and the known CDS, with the absolute values thereof being summed and input to the output selector 81. The output selector 81 selects the control bit which gives a calculation result of the least value.

Now the known CDS will be described below. Description will first be given on f2 of pilot frequency fch/100. In order to obtain pilot signal f2 synchronized with the digital data, DSV having a period of 100 bits is considered, for example, data with the CDS changing as +5, +5, −5, −5 for every 25 bits. This data is called the known CDS. Repetitive outputs of the record signals having the known CDS do not include DC components and have pilot signal f2 synchronized with the digital data. With regard to f1, signals having a period of 150 bits are considered. Known CDS have values +5, +5, +5, −5, −5, −5, patten −5, −5, +5, +5. Because the input data length is 100 bits, pilot signal f1 is obtained by repeating the pattern +5, −5, −5, −5, pattern −5, −5, +5, +5 and pattern +5, −5, −5, −5.

The calculation described above will be described below by example. Assume that control bit 0000 is added to the input data, for example, to obtain I-NRZI modulated data having CDS +3, −5, −5, +1, the | (−5+5)|+=(1+5)| =18. This value indicates the magnitude of deviation in the waveform between the known CDS and the data CDS. The lower this value, the nearer the data CDS to the known CDS, and a value of 0 indicates that the data CDS is equal to the known CDS.

The above procedure is repeated successively on the control bits 000 through 1111. Control bit selected by the output selector 81 is added to the input data in the control bit adder 71 to apply I-NRZI modulation to the input data and generate record signals. The selector switch 77 is switched to the side of the buffer memory 82 to input the record signal to the buffer memory 82, and the record signals are sent to the head amplifier 83 following the previous record signals, thereby recording the signals onto the magnetic tape 85 via the rotary head 84. Data of the delay device of the I-NRZI modulator 75 is held in the data holding circuit 76.

Figure 29A:
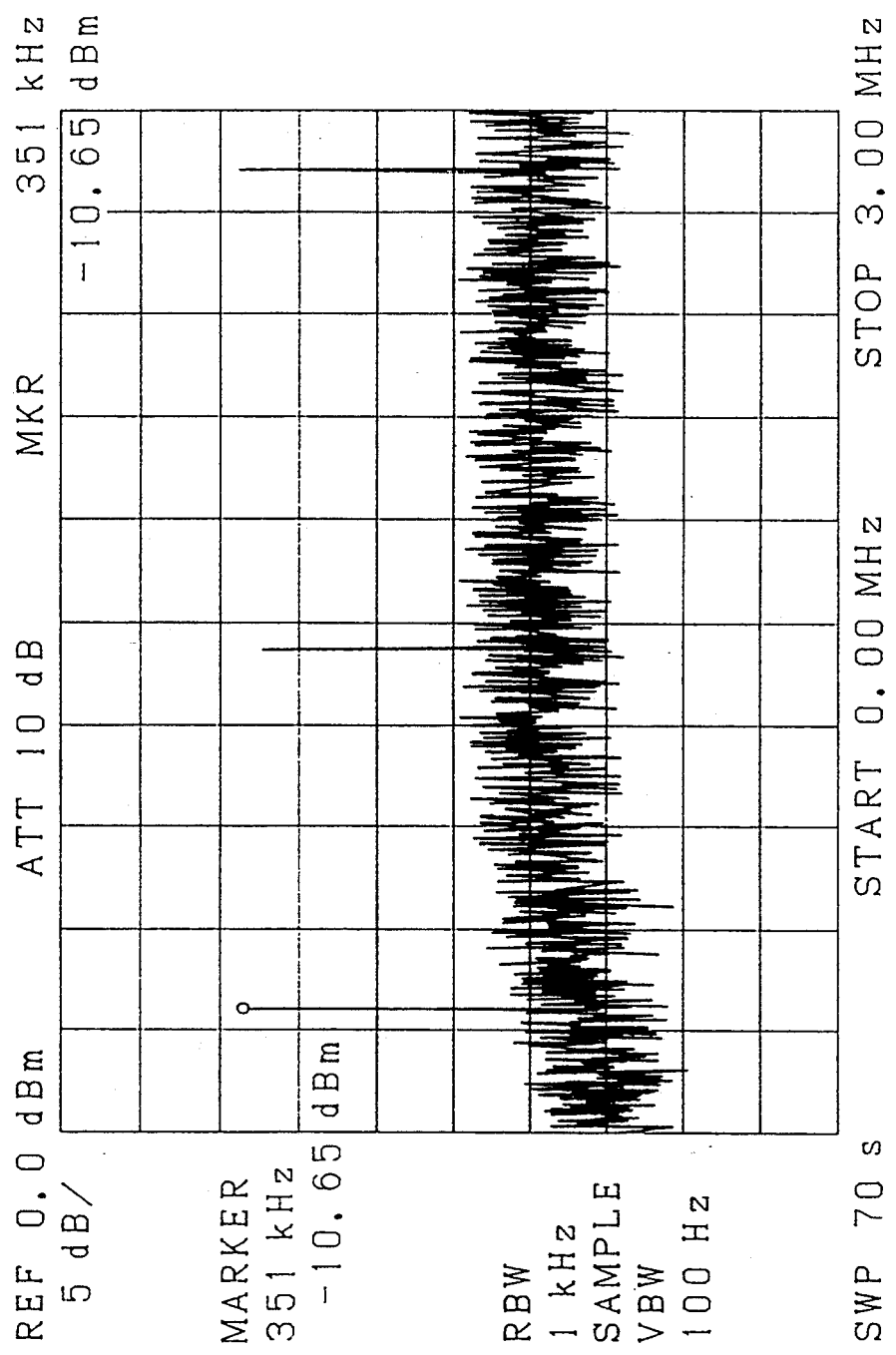
FIG. 29(a) is a drawing illustrative of the frequency spectrum of the record signals resulting from a simulation of embodiment 11.
Figure 29B:
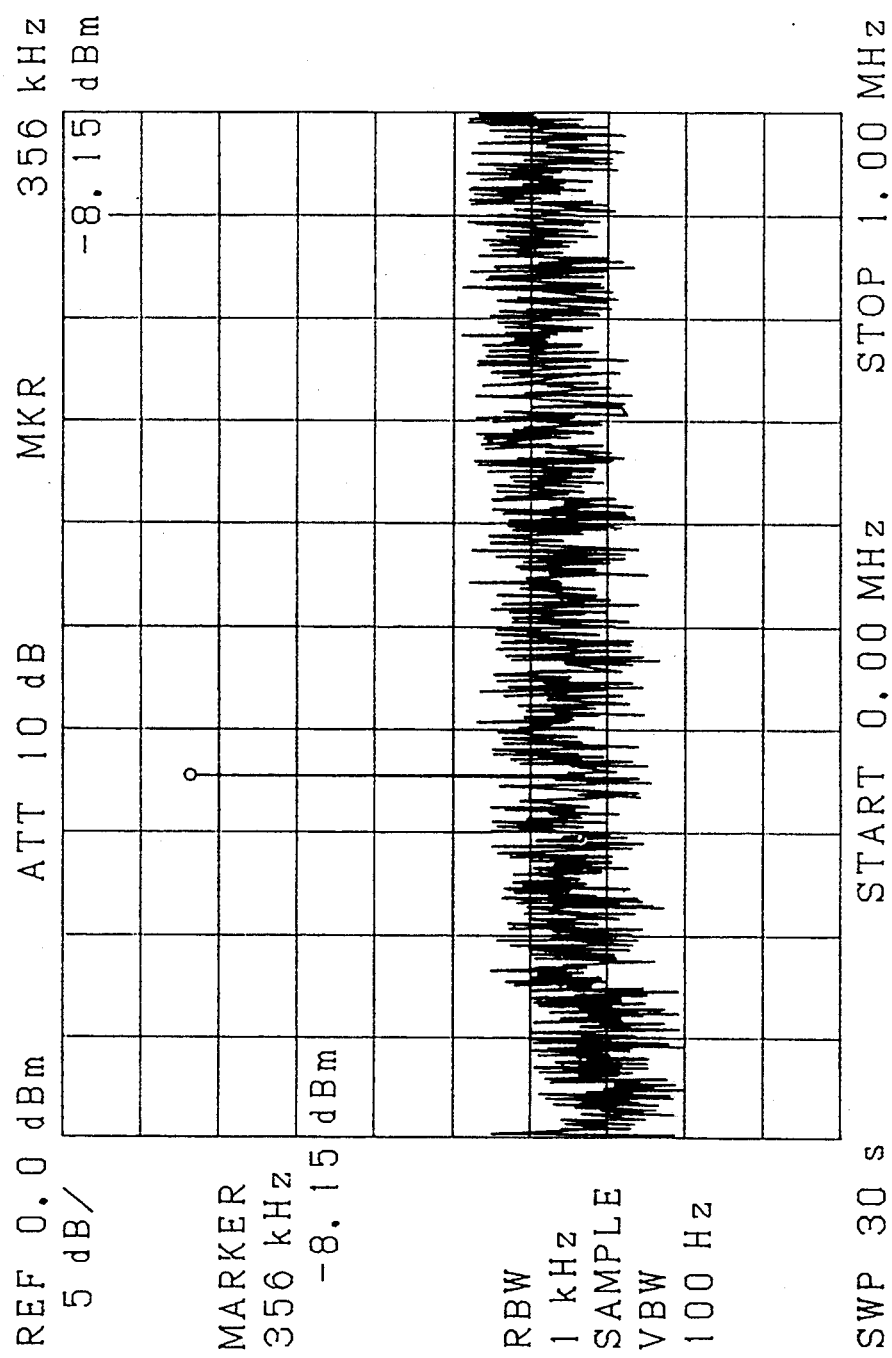
FIG. 29(b) is a drawing illustrative of the frequency spectrum of the record signals resulting from a simulation of embodiment 11.

FIG. 29(a), (b) show the result of simulating the record signals in this embodiment. These drawings show the spectra of recording signals generated by setting as fch=35.388 MHz (f1=235.9 kHz, F2=353.9 kHz). A run length of the record signals not less than 10 is determined to be NG. Record signals are generated in the prior art by adding control bit of 0 or 1 to the MSB of 24-bit data to apply I-NRZI modulation thereto, carrying out spectrum analysis of the data while adding data having the same CDS as the known CDS to 275 bits of the reset when the data is input to the 300-tap STSA, and adding the control bit which corresponds to the greater pilot signal components. From FIG. 29, it can be seen that low frequency components not higher than approximately 1 MHz are suppressed and pilot signals of about 23 dB are obtained.

Although ATF servo based on 2-frequency pilot is assumed in this embodiment, similar result can be obtained with AFT servo based on 4-frequency pilot or DTF servo. It is also assumed a pair of heads opposing each other with 180 degrees interval, although the embodiment is not restricted to this arrangement and similar result can be obtained with 180 degrees-opposed single head. Further, it is assumed that one control bit is added to every 24 bits in this embodiment, although the embodiment is not restricted to this scheme and similar result can be obtained by adding one control bit to every 16 bits. This leads to greater energy of pilot signals but lower conversion efficiency. Further, CDS for every 25 bits is calculated by the CDS calculator 78 in this embodiment, it is not limited to 25 bits. Also ±5 is used as the known CDS, it is not limited to this and ±3 may be employed. In case ±3 is employed, pilot signal becomes a little smaller because DSV amplitude is low, while the low frequency components can be suppressed more effective. However, use of the known CDS of too small a value such as +1 is undesirable because it results in very small energy of pilot signal and makes it unable to function as pilot signal.

In embodiment 11, recording signals having a waveform similar to that of the known CDS is selected to suppress the low frequency components and obtain pilot signals which are synchronized with the digital data. Also because recording modulation is carried out by adding a 1-bit control signal to n bits, conversion efficiency can be improved. Also because low frequency of the recording signals can be suppressed and pilot signals synchronized with the digital data can be obtained, it possible to obtain recording signals which are suitable for narrow-track magnetic recording/reproduction apparatus employing ATF servo or the like.

Embodiment 12

Figure 30:
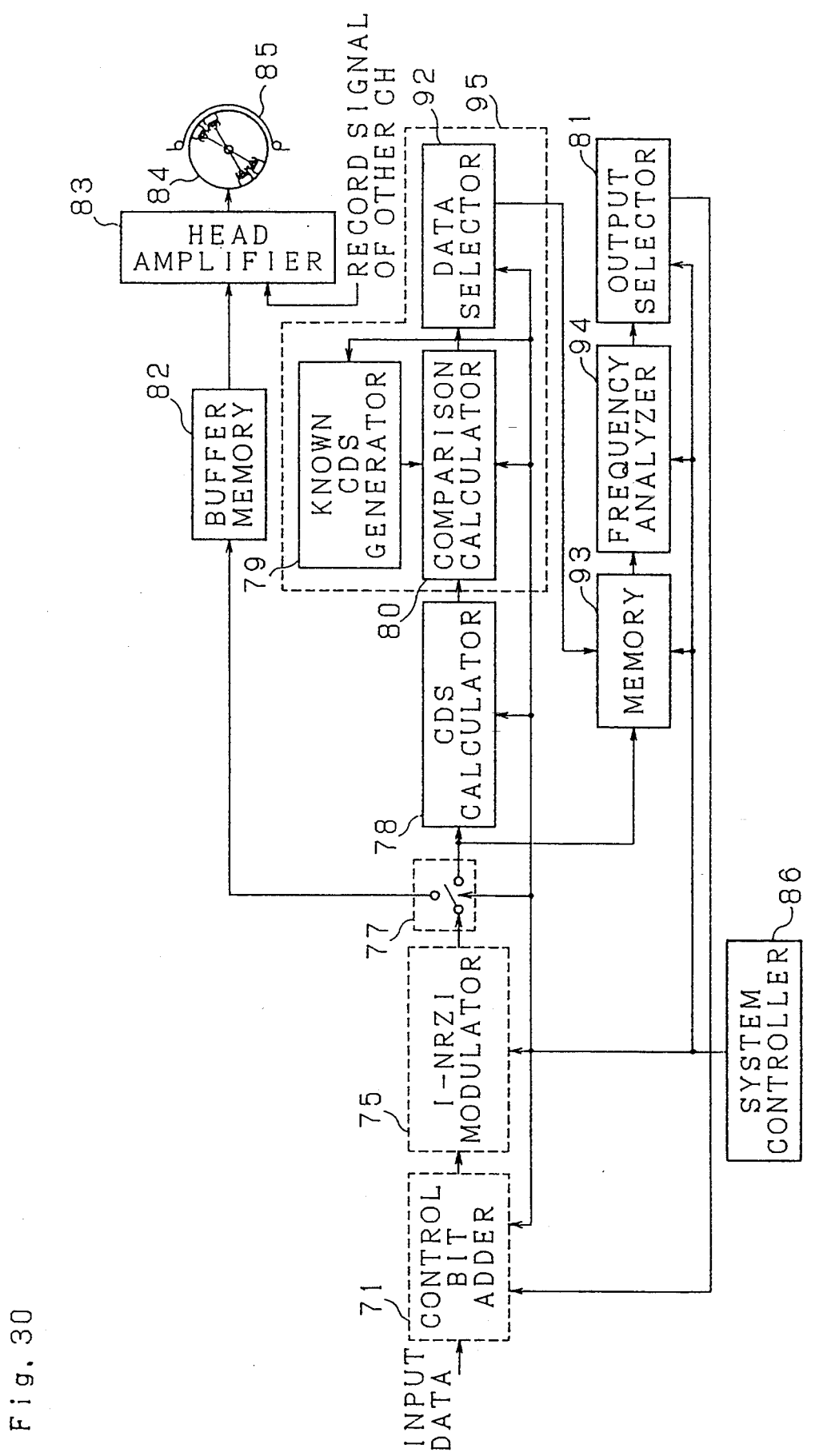
FIG. 30 is a block circuit diagram illustrative of the recording modulation section of the recording/reproduction apparatus of embodiment 12.
Figure 31:
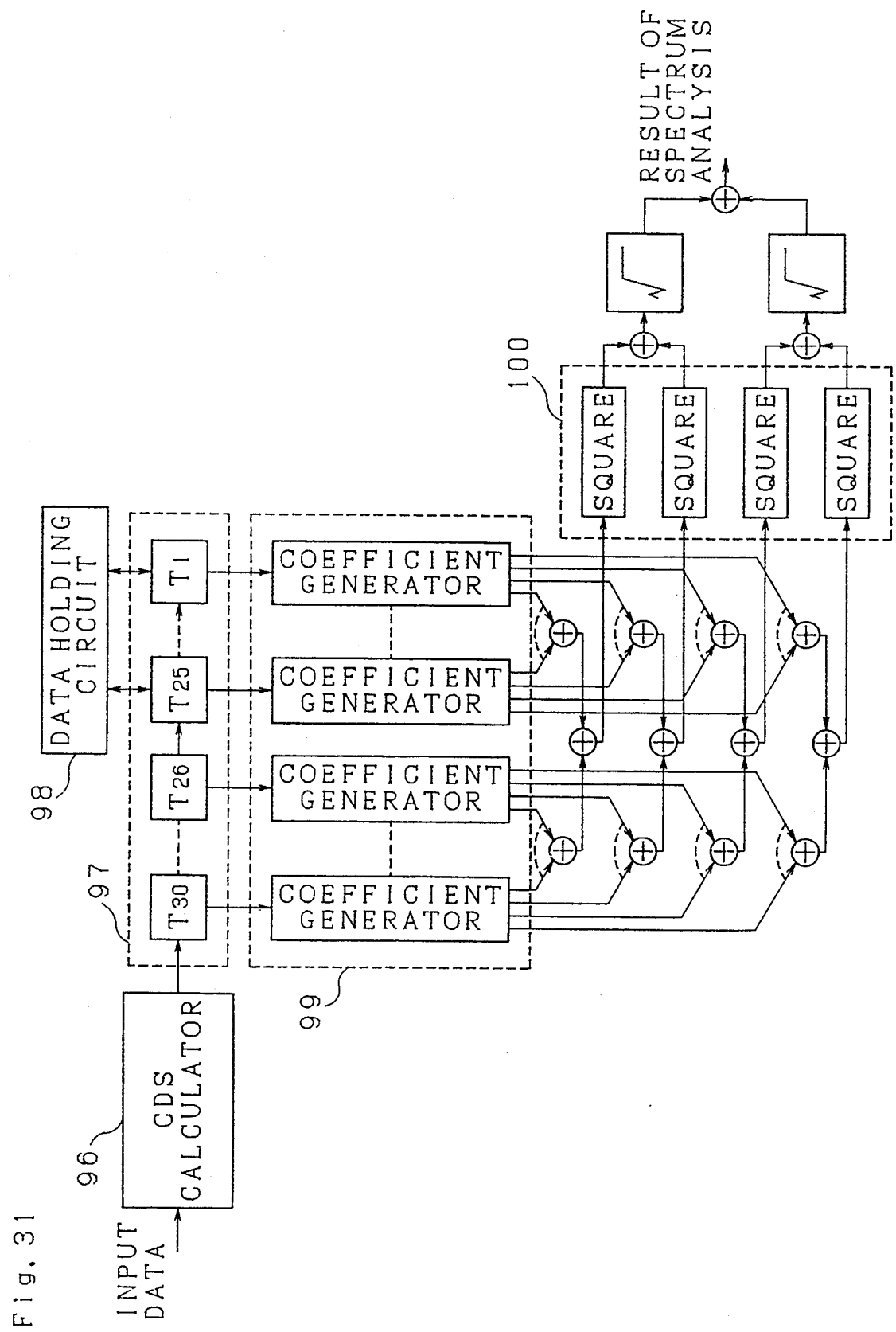
FIG. 31 is a drawing illustrative of the construction of the short time spectrum analyzer.

Embodiment 12 will now be described below. FIG. 30 shows the block circuit diagram of the recording modulator section of a recording/reproduction apparatus according to embodiment 12 of the invention. The same circuits as those of the previous embodiments will be given the same numerals and description thereof will be omitted. Numeral 92 denotes a data selector. Numeral 93 denotes a memory which stores data. Numeral 94 denotes an STSA. Numeral 95 denotes a second operation unit of embodiment 12. FIG. 31 shows the construction of the STSA 94. Numeral 96 denotes a CDS calculator which calculates CDS of every 10 bits. Numeral 97 denotes a shift register. Numeral 98 denotes a data holding circuit. Numeral 99 denotes a coefficient generator. Numeral 100 denotes a square calculator.

The system construction of the magnetic recording/reproduction apparatus of this embodiment is the same as that of embodiment 11. As in the case of embodiment 11, 4-bit control bits are added by the control bit adder 71 to I-NRZI modulate the data, CDS is calculated for every 25 bits, and the absolute values of the differences between the known CDS and the calculated CDS are summed up in the comparison calculator 80.

A result of the calculation in the comparison calculator 80 is input to the data selector 92, to select the data in ascending order of the magnitude with four sets of selected data being stored in the memory 93. The four sets of data stored in the memory 93 are subjected to spectrum analysis in the STSA 94, with the results being input to the output selector 81. The output selector 81 selects the data having the least magnitudes of frequency components around f1 and f2, and controls the control bit adder 71 to output the record signals following the previous data similarly to embodiment 11 and record the data on the magnetic tape 85.

This embodiment employs the short time spectrum analysis method and makes the number of taps smaller similar to the previous embodiments. CDS of every 10 bits is input to the shift register 97. While spectrum analysis is carried out on four sets of data in this embodiment, CDSs of T1 through T25 in the drawing are those of the previous recording signals which are stored in the data holding circuit 98 and are read every time analysis is carried out. CDS which is input to the shift register 97 is used to output the real term and the imaginary term for each of f1 and f2 by the coefficient generator 99. A sum of the real terms and a sum of imaginary terms are squared and added together, and square root of the sum is calculated to obtain the energy of f1 and f2. Energy values of f1 and f2 are summed and sent to the output selector 81 as the result of spectrum analysis. The value represents the mean value of the f1 and f2 energy. Data of the least value is output.

Figure 32A:
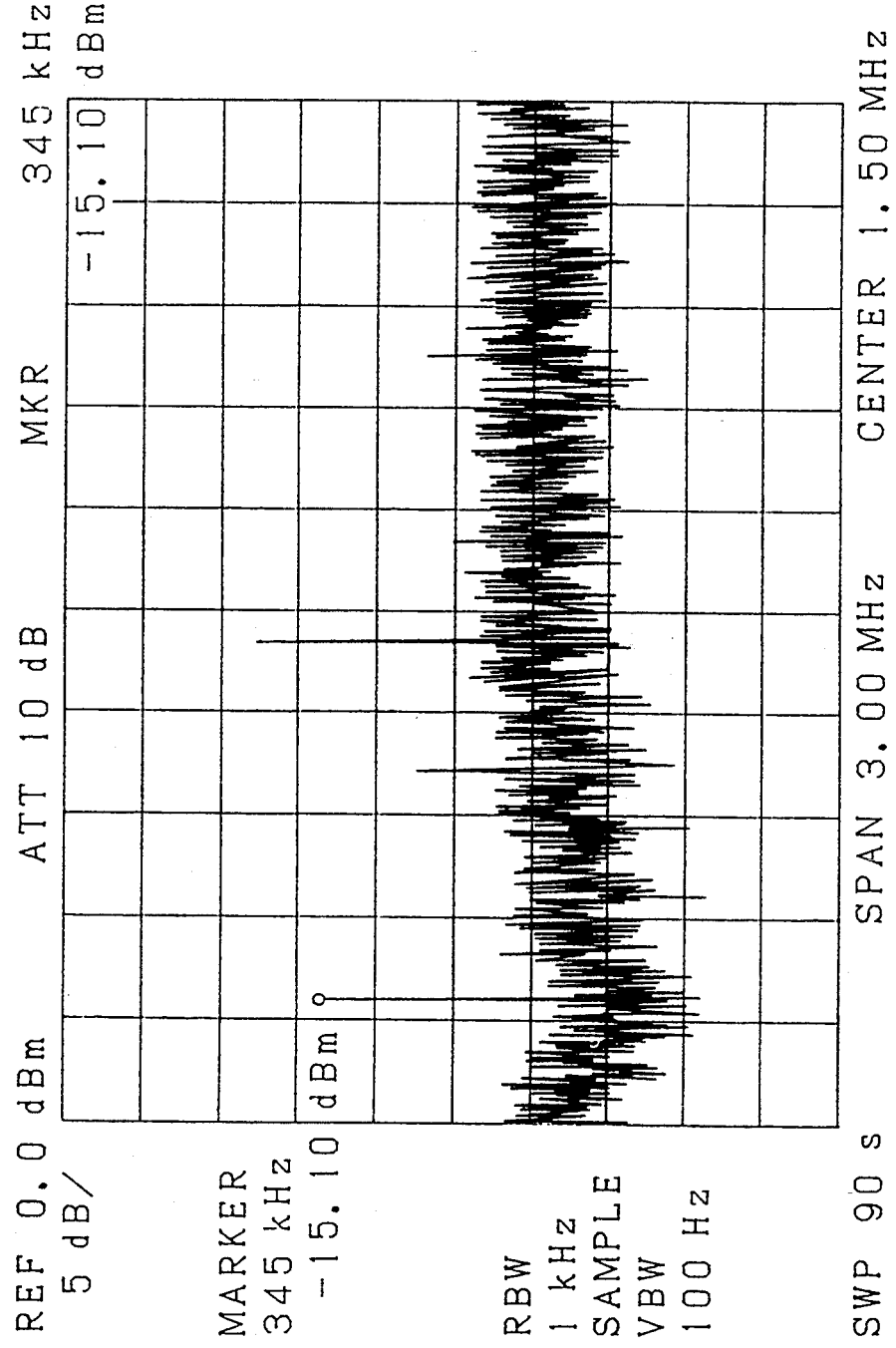
FIG. 32(a) is a drawing illustrative of the frequency spectrum of the record signals resulting from a simulation of embodiment 12.

FIG. 32(a), (b) show the result of simulation in this embodiment in case record signals are generated by setting as fch=35.3 MHz. Run length of the record signals not less than 10 is determined to be NG. FIG. 32(b) shows that the spectrum around the pilot signal of the record signal in this embodiment is reduced by about 3 dB and pilot signal of about 20 dB can be obtained.

Although four data sets having the least values of calculation result are selected from which the record signal is selected in this embodiment, it is not restricted to this arrangement and three data sets, for example, may be selected from which the record signal is selected. In this case, energy of the pilot signal increases and the spectrum of notch components becomes flat as the number of data sets which are selected first in the data selector 92 is reduced.

In embodiment 12, low frequency components are suppressed and pilot signals synchronized with the digital data are obtained, while at the same record signals with spectrum of reduced amplitude around the pilot signal are obtained. Because recording modulation is carried out by adding one control bit to every n bits, conversion efficiency is improved. Because low frequency components of the record signals are suppressed and pilot signals synchronized with the digital data can be obtained, while recording signals of spectrum with the amplitude around the pilot signal decreased can be obtained at the same time, it is possible to obtain recording signals which are suitable for narrow-track magnetic recording/reproduction apparatus employing ATF servo or the like. Also because the spectrum in the vicinity of the pilot signal has lower amplitude when the pilot signal is extracted from the reproduced signals i the BFP, S/N ratio of the pilot signal is improved.

Embodiment 13

Figure 33:
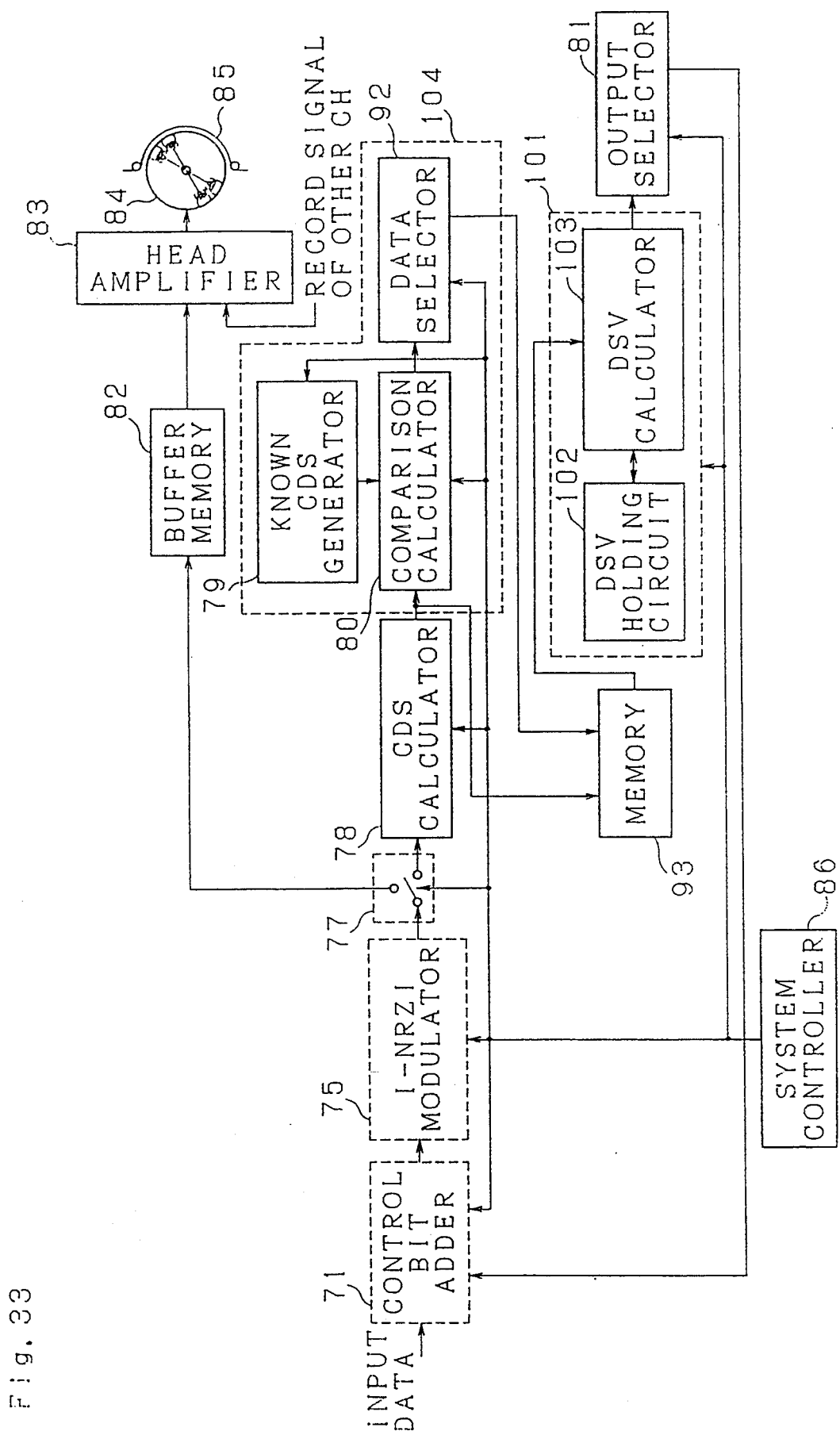
FIG. 33 is a block circuit diagram illustrative of the recording modulation section of the recording/reproduction apparatus of embodiment 13.

Embodiment 13 will now be described below. FIG. 33 shows the block circuit diagram of the recording modulator section of a recording/reproduction apparatus according to embodiment 13. The same circuits as those in FIG. 28 will be given the same numerals and description thereof will be omitted. Numeral 101 denotes a DSV calculation unit. Numeral 102 denotes a DSV holding circuit. Numeral 103 denotes a DSV calculator. Numeral 104 denotes a third operation unit of embodiment 13.

The system construction of the magnetic recording/reproduction apparatus of this embodiment is the same as that of embodiment 11. As in the case of embodiment 11, 4-bit control bits are added by the control bit adder 71 to I-NRZI modulate the data, CDS is calculated for every 25 bits, and the absolute values of the differences between the known CDS and the calculated CDS are summed in the comparison calculator 80.

The result of the calculation in the comparison calculator 80 is input to the data selector 92, to select the data in the ascending order of the magnitude with the CDS of four sets of selected data being stored in the memory 93. The four CDSs stored in the memory 93 are added to the DSV of the previous record signals which have been output and stored in the DSV holding circuit 102, to calculate the value of DSV in the DSV calculation unit 101. Because there is not a previous recording signal for the first recording signal of the track, the initial value is set to 0. The output selector 81 selects the control bit corresponding to the previously input DSV of a value nearest to 0 and controls the control bit adder 71 to output the record signals following the previous data and record it on the magnetic tape 85 similar to embodiment 11. The DSV of the record signals at this time is stored in the DSV holding circuit 102.

Figure 34A:
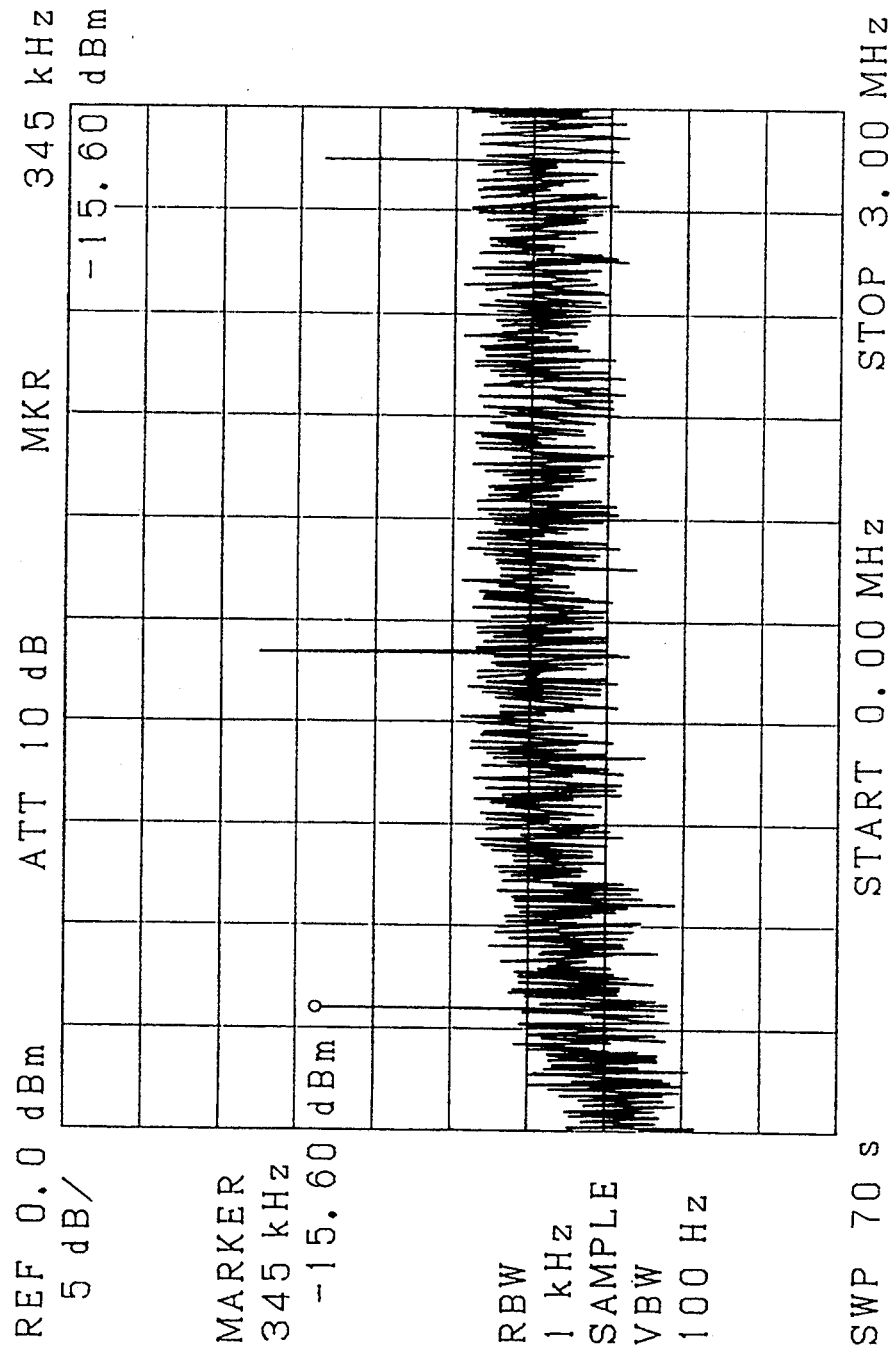
FIG. 34(a) is a drawing illustrative of the frequency spectrum of the record signals resulting from a simulation of embodiment 13.
Figure 34B:
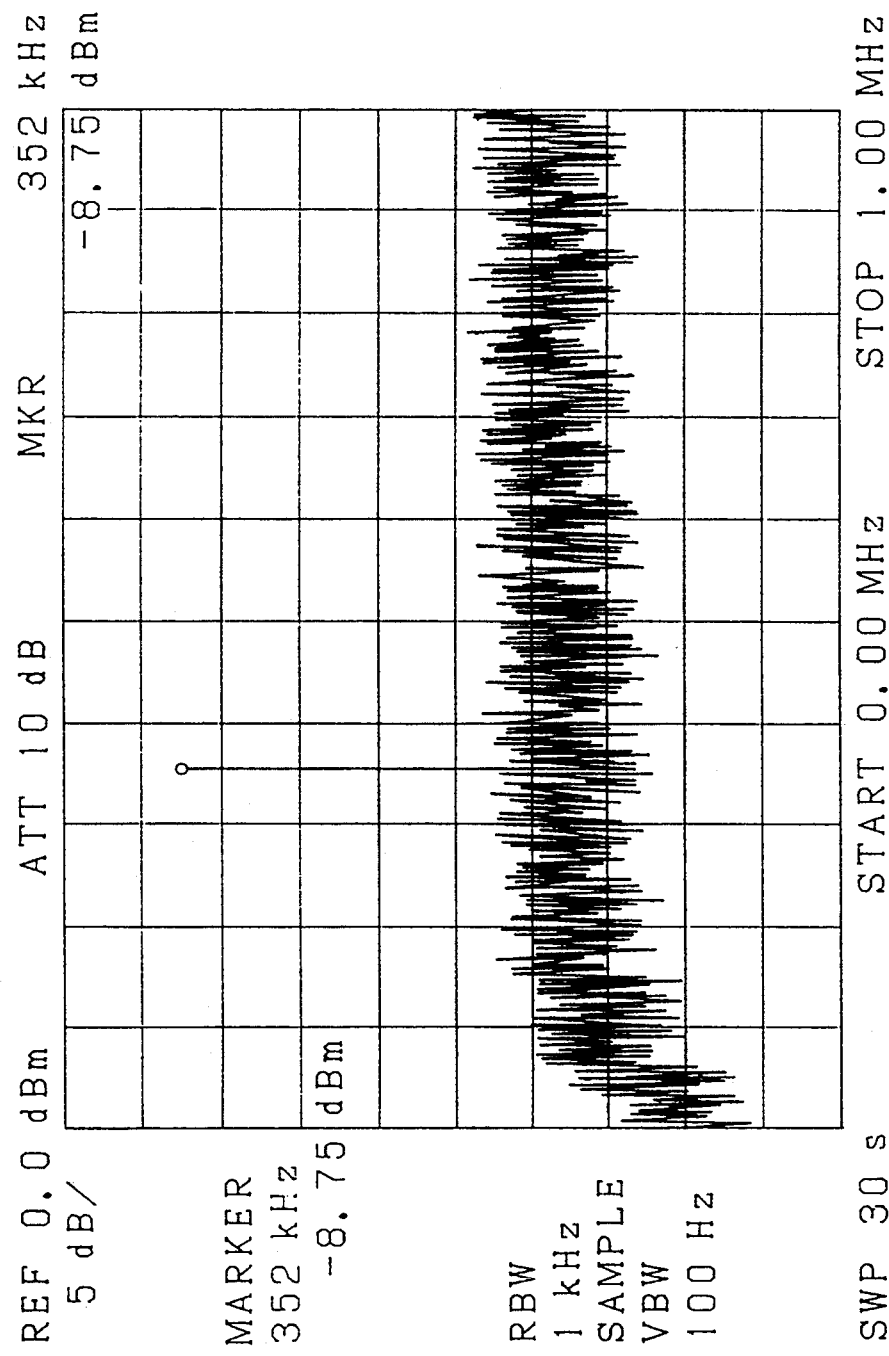
FIG. 34(b) is a drawing illustrative of the frequency spectrum of the record signals resulting from a simulation of embodiment 13.

FIG. 34(a), (b) show the result of simulation in this embodiment where recording signals are generated by setting fch=35.388 MHz. A run length not less than 10 is determined to be NG. FIG. 34(b) shows that pilot signal of about 23 dB is obtained for the recording signal in this embodiment, with the DC component being suppressed.

In embodiment 13, the DC component is suppressed and a pilot signal synchronized with the digital data is obtained. Because recording modulation is carried out by adding one control bit to every n bits, conversion efficiency is improved. Also because the DC component of the recording signals is suppressed and pilot signals synchronized with the digital data can be obtained, it is possible to obtain recording signals which are suitable for narrow-track magnetic recording/reproduction apparatus employing ATF servo or the like.

Embodiment 14

Figure 35:
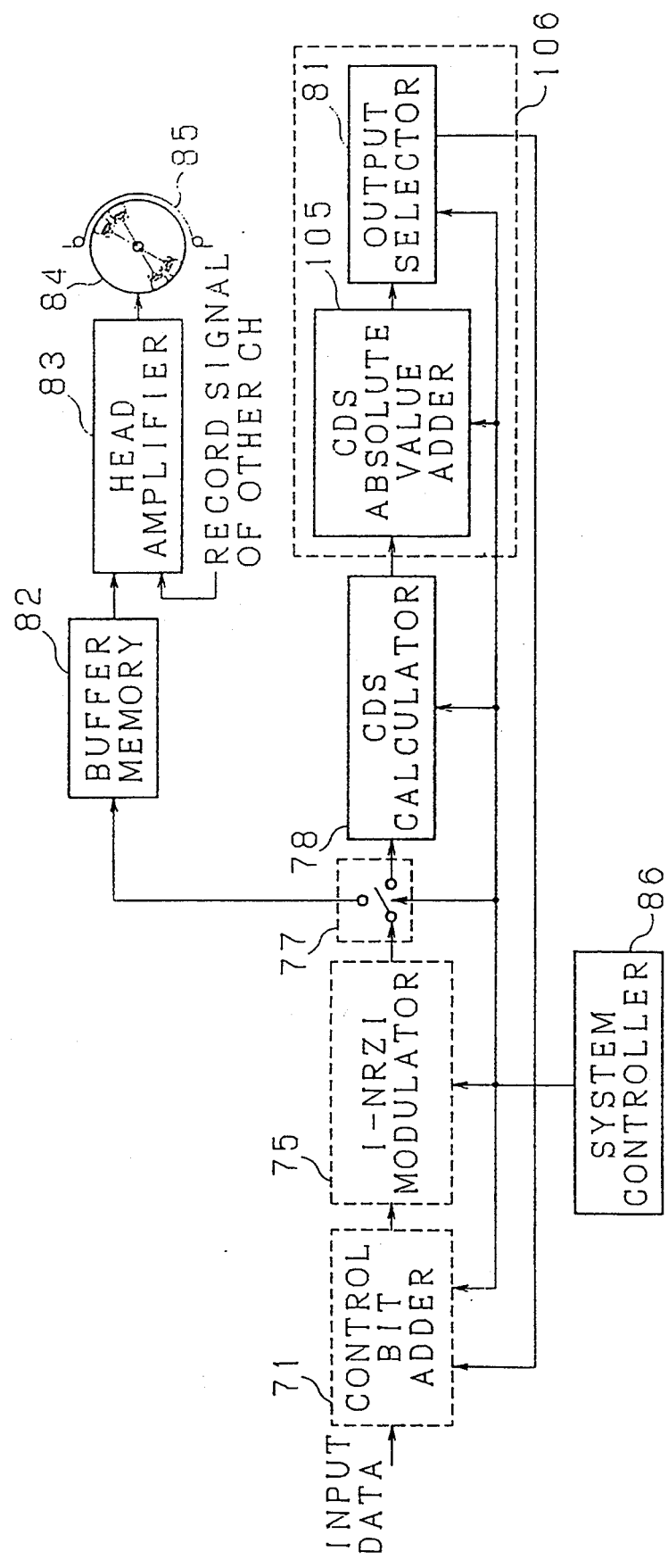
FIG. 35 is a block circuit diagram illustrative of the recording modulation section of the recording/reproduction apparatus of embodiment 14.

Embodiment 14 will now be described below. FIG. 35 shows the block circuit diagram of the recording modulator section of a recording/reproduction apparatus according to embodiment 14. The same circuits as those in FIG. 28 will be given the same numerals and description thereof will be omitted. Numeral 105 denotes a CDS absolute value adder. Numeral 106 denotes a fourth operation unit of embodiment 14.

Recording signals in this embodiment have no pilot signals with only the low frequency components being suppressed. Recording signals generated by the recording modulator section of the magnetic recording/reproduction apparatus are recorded on B track 203 of the track pattern shown in FIG. 2, for example.

System construction of the magnetic recording/reproduction apparatus of this embodiment is the same as that of embodiment 11. As in the case of embodiment 11, 4-bit control bits are added by the control bit adder 71 to I-NRZI modulate the data and CDS is calculated for every 25 bits. Then the absolute values of the calculated CDS are summed in the CDS absolute value adder 105. The above process is repeated for the control bits 0000 through 1111 successively. The output selector 81 selects the data corresponding to the least value of the above calculation and controls the control bit adder 71 to generate record signals and record them on the magnetic tape 85, similar to embodiment 11.

Figure 36:
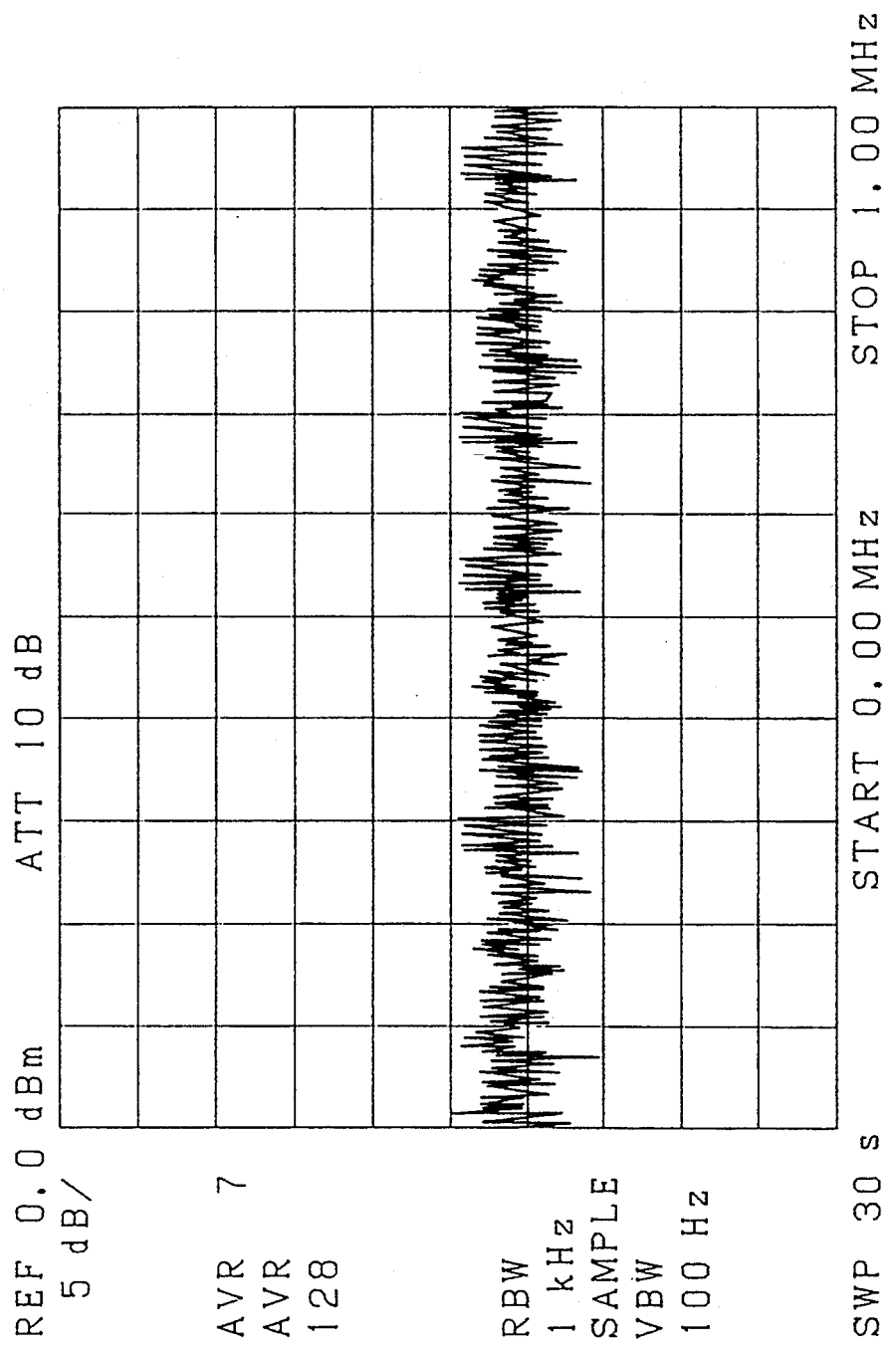
FIG. 36 is a drawing illustrative of the frequency spectrum of random data.
Figure 37:
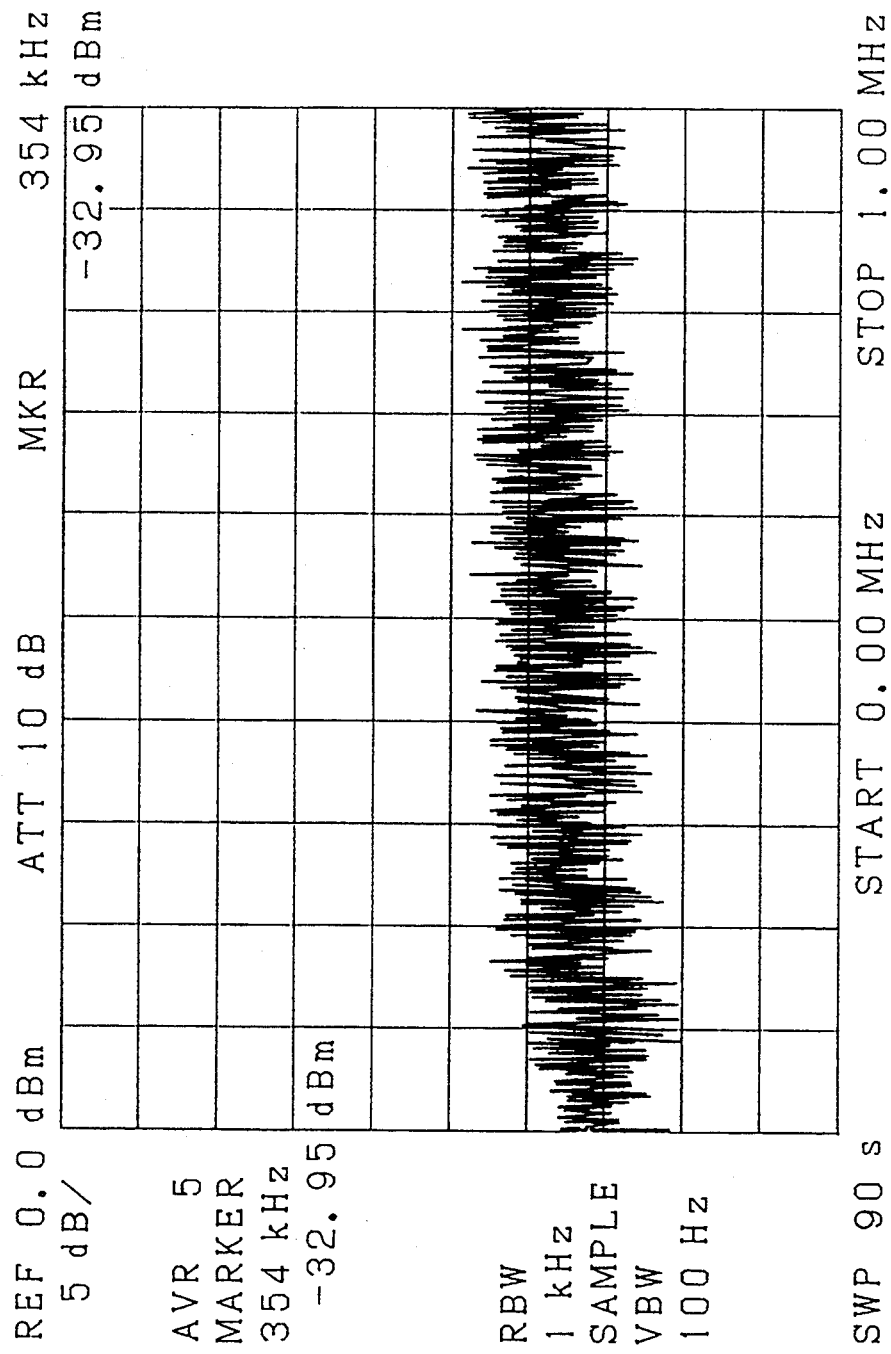
FIG. 37 is a drawing illustrative of the frequency spectrum of the record signals resulting from a simulation of embodiment 14.

FIG. 36 shows the spectrum of random data where recording signals are generated by setting as fch=35.3 MHz, and FIG. 37 shows the result of simulation of this embodiment. A run length not less than 10 is determined to be NG. Because data having smaller values of CDS for every 25 bits of record signals are selected in this embodiment, the amplitude of DSV is decreased and consequently the low frequency components can be suppressed. FIG. 37 shows that the low frequency components of the recording signals in this embodiment are suppressed.

Figure 38:
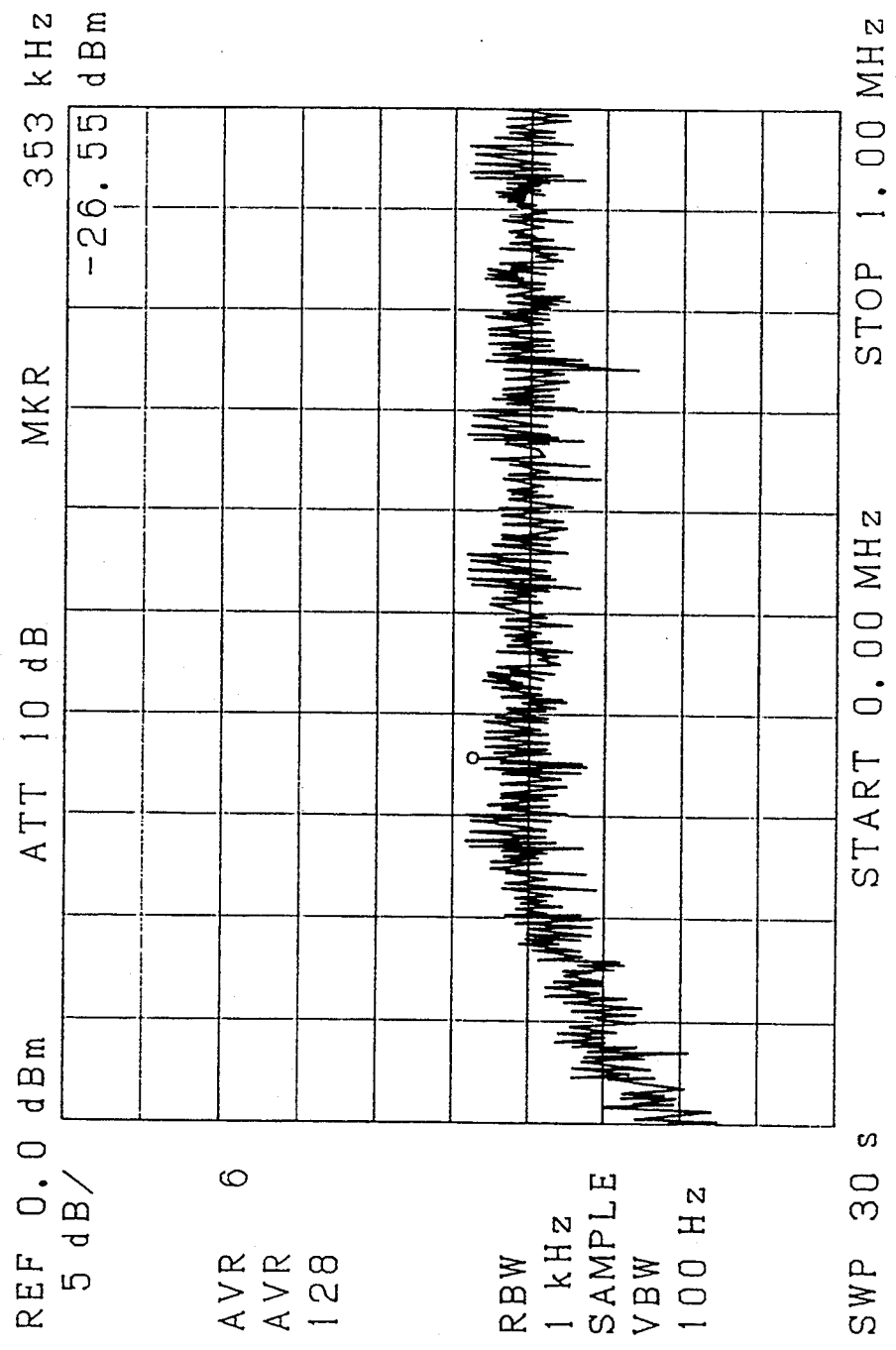
FIG. 38 is a drawing illustrative of the frequency spectrum of the record signals obtained by simulating the calculation of 100-bit CDS in embodiment 14.

Although CDS is calculated for every 25 bits in this embodiment, it may be calculated for every 100 bits and low frequency components can be suppressed more d effectively by measuring CDS of greater number of bits. FIG. 38 shows the result of simulation in case recording modulation is carried out similarly to this embodiment while calculating CDS of every 100 bits. It can be seen that low frequency components are suppressed more effectively compared to FIG. 37.

In embodiment 14, DSV amplitude is decreased and low frequency components are suppressed. Because recording modulation is carried out by adding one control bit to every n bits, conversion efficiency is improved. Also the low frequency components of the recording signals are suppressed and recording signals which are suitable for magnetic recording/reproduction apparatus can be obtained.

Embodiment 15

Figure 39:
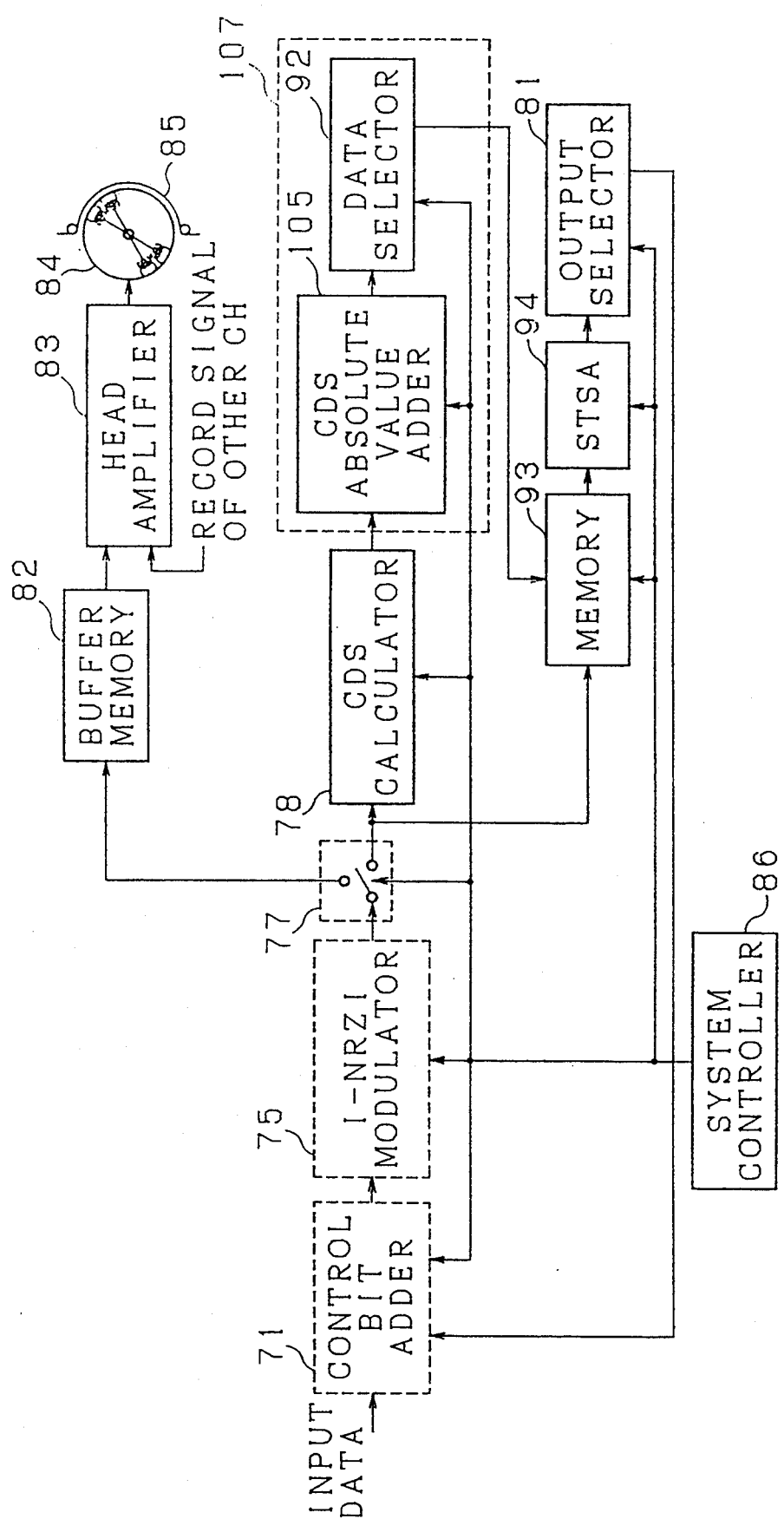
FIG. 39 is a block circuit diagram illustrative of the recording modulation section of the recording/reproduction apparatus of embodiment 15.

Embodiment 15 will now be described below. FIG. 39 shows the block circuit diagram of the recording modulator section of a recording/reproduction apparatus according to embodiment 15. The same circuits as those in the previous drawings will be given the same numerals an description thereof will be omitted. Numeral 107 denotes a fifth operation unit of embodiment 15.

System construction of the magnetic recording/reproduction apparatus of this embodiment is the same as that of embodiment 15. As in the case of embodiment 15, 4-bit control bits are added by the control bit adder 71 to I-NRZI modulate the data, CDS is calculated for every 25 bits, and the absolute values of the calculated CDS are summed up. The above process is repeated for the control bits 0000 through 1111 successively. The data selector 92 selects four data sets of the least values of the result of calculation in the CDS absolute value adder 105 and stores the data in the memory 93. Four data sets input to the memory 93 are subjected to spectrum analysis in the STSA 94. Based on the result of spectrum analysis, the output selector 81 selects the data having the least amplitude of the frequency components in the vicinity of f1 and f2, and controls the control bit adder 71 to generate recording signals and record them on the magnetic tape 85 similar to embodiment 11.

Figure 40A:
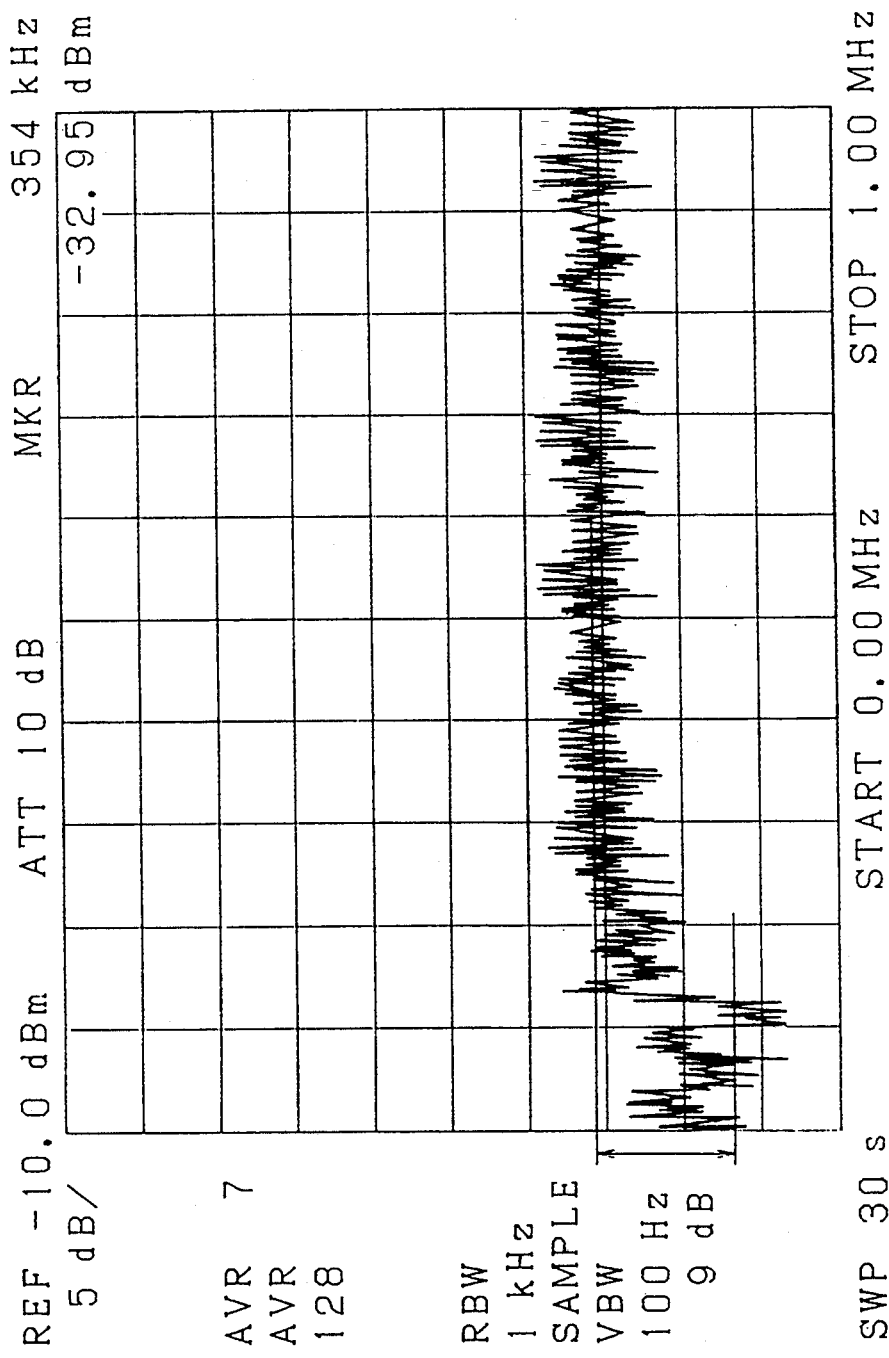
FIG. 40(a) is a drawing illustrative of the frequency spectrum of the record signals resulting from a simulation of embodiment 15.
Figure 40B:
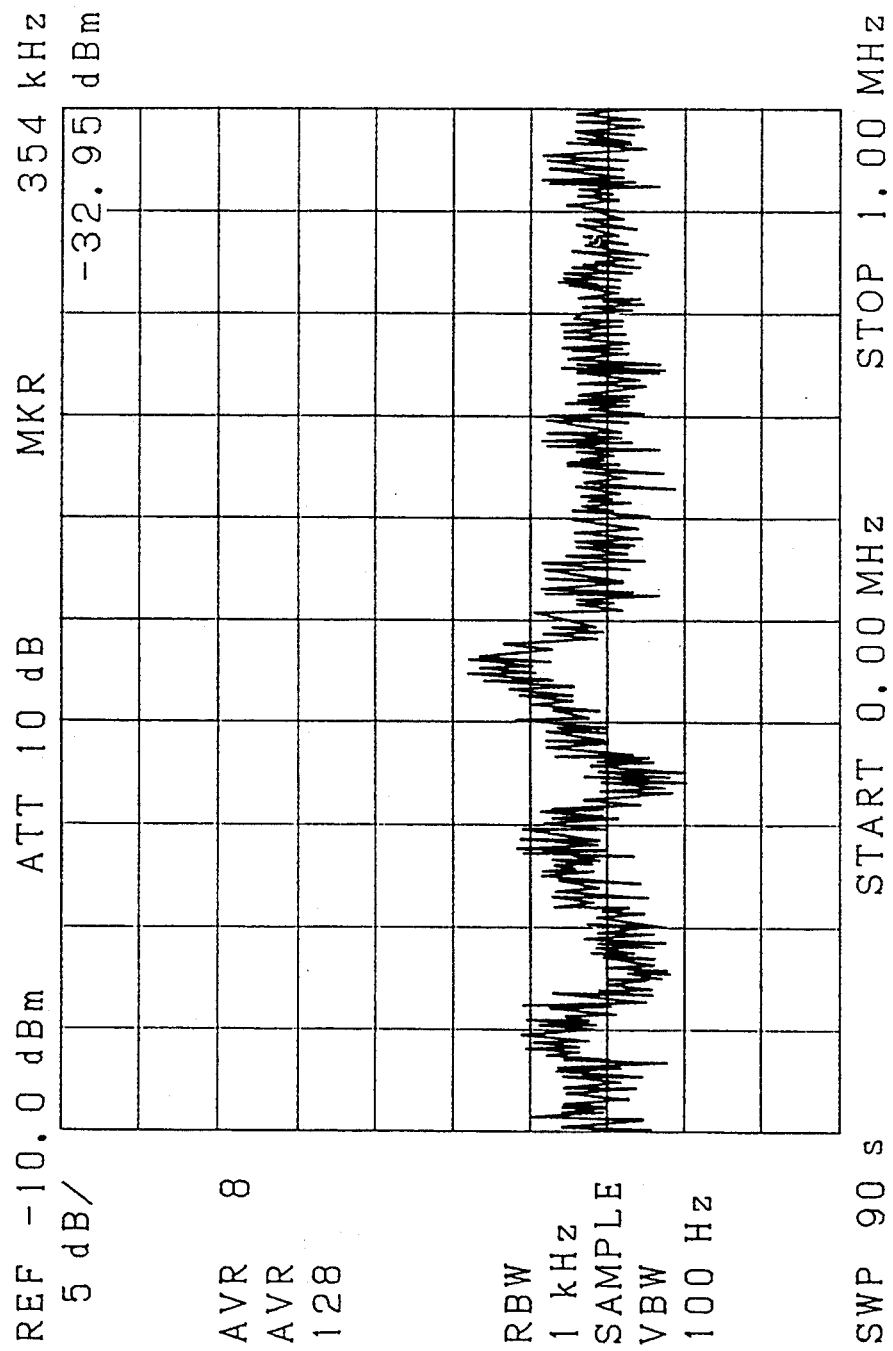
FIG. 40(b) is a drawing illustrative of the frequency spectrum of the record signals resulting from a simulation of embodiment 15.

FIG. 40(*a*), (*b*) show the results of simulation of this embodiment where recording signals are generated by setting fch=35.3 MHz. A run length not less than 10 is determined to be NG. Because data having smaller amplitudes of frequency components in the vicinity of the pilot signal from among 4 data sets of smaller value of CDS for every 25 bits of record signals is selected in this embodiment, low frequency components can be suppressed and notch signal can be generated. (FIG. 40(*a*) shows that the low frequency components of the record signals i this embodiment are suppressed and notch signal of about 9 dB is generated.

Figure 41B:
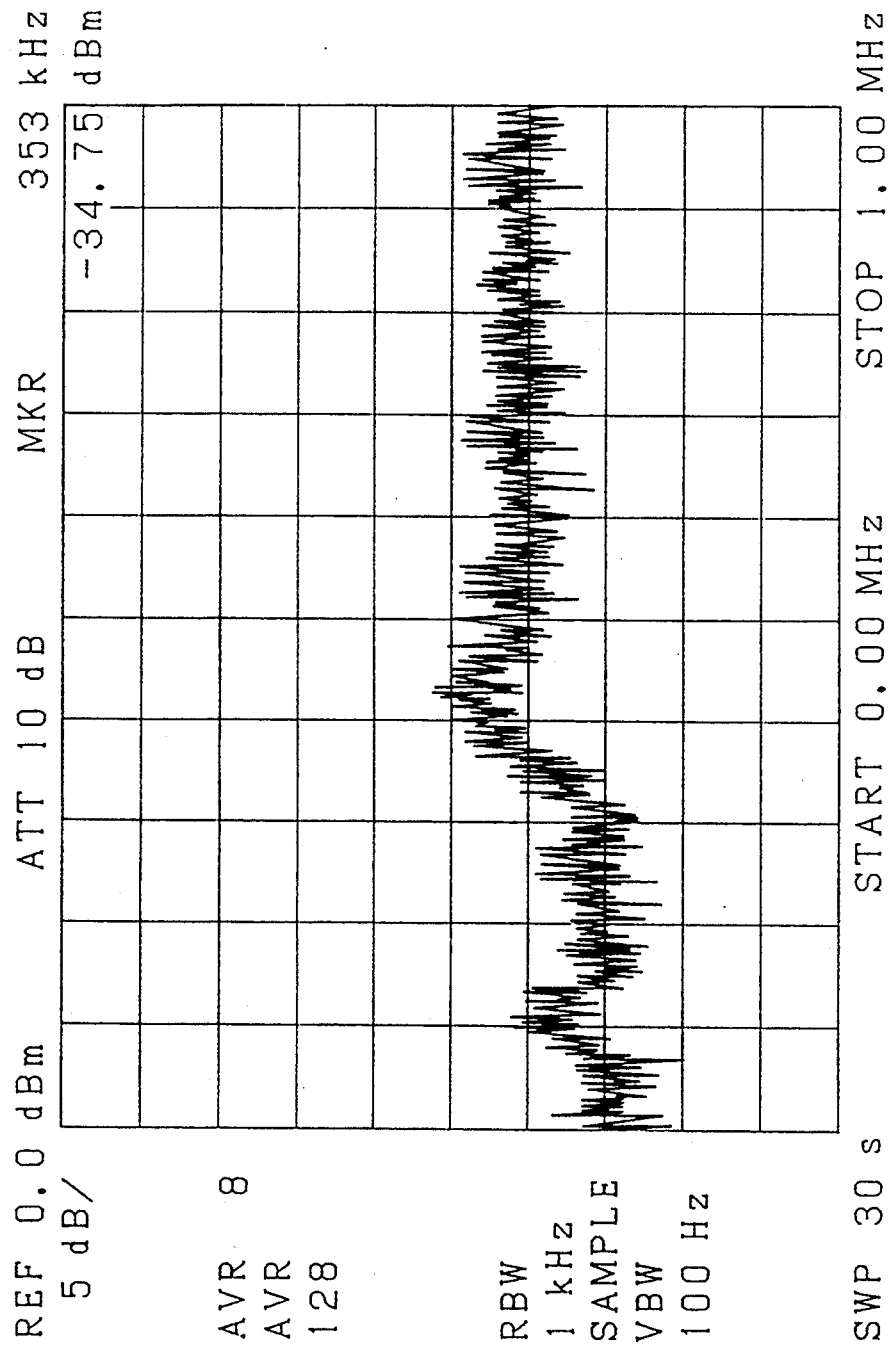
FIG. 41(b) is a drawing illustrative of the frequency spectrum of the record signals obtained by simulating the calculation of 100-bit CDS in embodiment 15.

Although CDS is calculated for every 25 bits in this embodiment, it may be calculated for every 100 bits and low frequency components can be suppressed more effectively by calculating CDS of greater number of bits. FIG. 41(*a*), (*b*) show the result of simulation in case recording modulation is carried out similarly to this embodiment while calculating CDS of every 100 bits. It can be see that low frequency components are suppressed more effectively compared to FIG. 40 and notch signal of about 6 dB is generated.

Although CDS is calculated for every 25 bits in this embodiment, it may be calculated for every 100 bits and low frequency components can be suppressed more effectively by calculating CDS of greater number of bits. FIG. 41(*a*), (*b*) show the result of simulation in case recording modulation is carried out similarly to this embodiment while calculating CDS of every 100 bits. It can be seen that low frequency components are suppressed more effectively compared to FIG. 40 and notch signal of about 6 dB is generated.

In embodiment 15, low frequency components are suppressed and recording signals with a spectrum of reduced amplitude around the pilot signal are obtained. Because recording modulation is carried out by adding one control bit to every n bits, conversion efficiency is improved. Also because low frequency components of the record signals are suppressed and recording signals with a spectrum with the amplitude in the vicinity of the pilot signal being decreased can be obtained, it is made possible to obtain recording signals which are suitable for narrow-track magnetic recording/reproduction apparatus employing ATF servo or the like.

Embodiment 16

Figure 42:
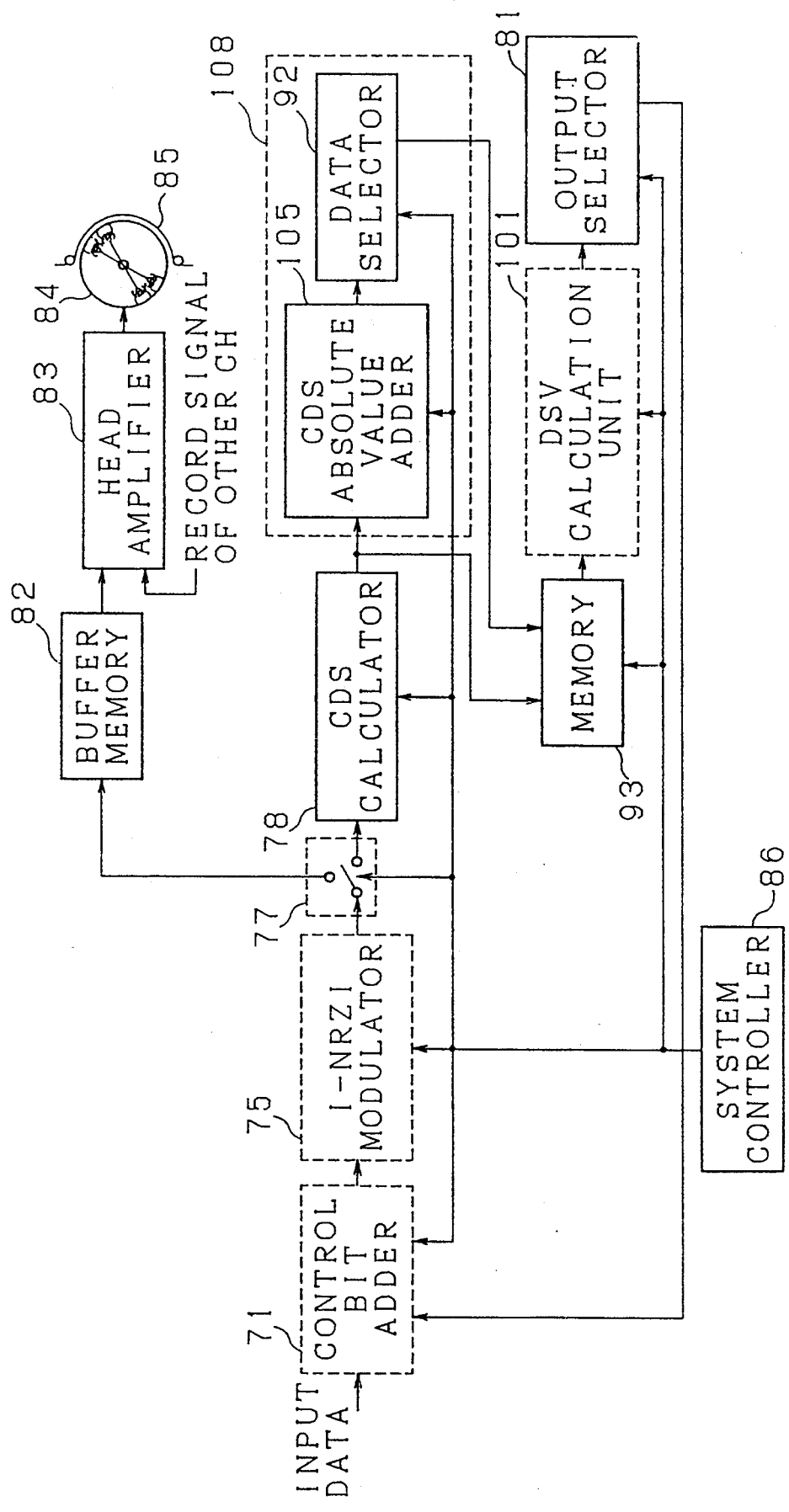
FIG. 42 is a block circuit diagram illustrative of the recording modulation section of the recording/reproduction apparatus of embodiment 16.

Embodiment 16 will now be described below. FIG. 42 shows the block circuit diagram of the recording modulator section of a recording/reproduction apparatus according to embodiment 16. The same circuits as those in the previous drawings will be given the same numerals and description thereof will be omitted. Numeral 108 denotes a sixth operation unit of embodiment 16 which is similar to the fifth operation unit 107 of embodiment 15.

System construction of the magnetic recording/reproduction apparatus of this embodiment is the same as that of embodiment 15. As in the case of embodiment 14, 4-bit control bits are added by the control bit adder 71 to I-NRZI modulate the data, CDS is calculated for every 25 bits, and the absolute values of the calculated CDS are summed up. The above process is repeated for the control bits 0000 through 1111 successively. The data selector 92 selects four data sets of the least values of the result of calculation in the CDS absolute value adder 105 and stores CDS of the data in the memory 93. Four values of CDS which are input to the memory 93 are used to calculate the DSV of each data set in the DSV calculation unit 101. Based on the result of this DSV calculation, the output selector 81 selects the data having the least amplitude of the frequency components in the vicinity of f1 and f2, and controls the control bit adder 71 to generate record signals and record them on the magnetic tape 85 similarly to embodiment 11.

Figure 43:
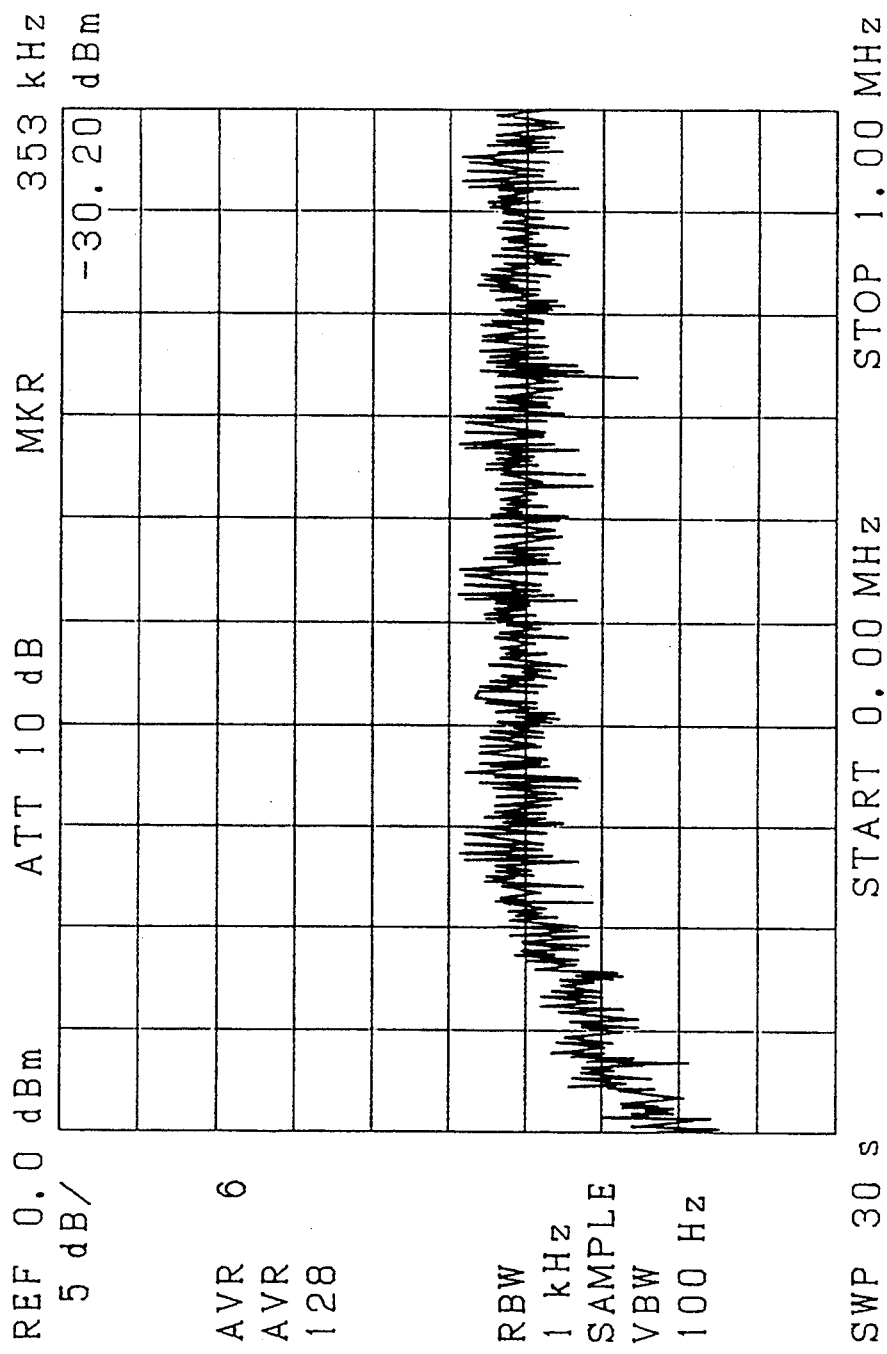
FIG. 43 is a drawing illustrative of the frequency spectrum of the record signals resulting from a simulation of embodiment 16.

FIG. 43 shows the result of simulation in this embodiment in case record signals are generated by setting as fch=35.388 MHz. A run length not less than 10 is determined to be NG. In this embodiment, because DSV is always controlled to be near 0, low frequency components near DC components are reliably suppressed. This effect can be confirmed from FIG. 43.

In embodiment 16, because recording modulation is carried out by adding one control bit to every n bits, conversion efficiency is improved. Also DC component of the record signals is suppressed and record signals which are suitable for narrow-track magnetic recording/reproduction apparatus can be obtained.

Embodiment 17

Figure 44:
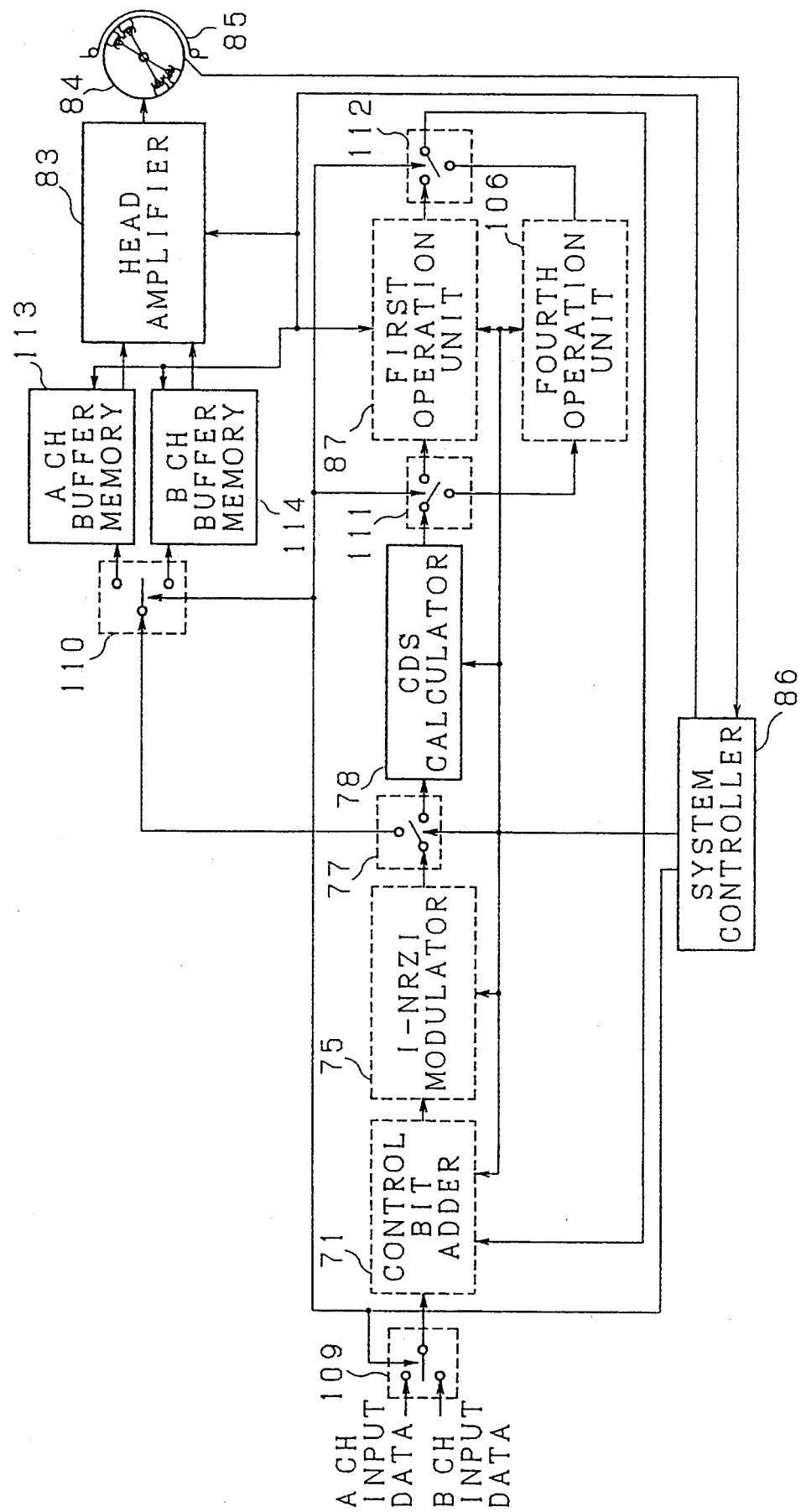
FIG. 44 is a block circuit diagram illustrative of the recording modulation section of the recording/reproduction apparatus of embodiment 17.

Embodiment 17 will now be described below. FIG. 44 shows the block circuit diagram of the recording modulator section of a recording/reproduction apparatus according to embodiment 17. The same circuits as those in the previous drawings will be given the same numerals and description thereof will be omitted. Numerals 109, 110, 111 and 112 denote selector switches. Numeral 113 denotes ACH buffer memory. Numeral 11 denotes BCH buffer memory.

System construction of the recording/reproduction apparatus of this embodiment is the same as that of embodiment 11. This embodiment is a recording/reproduction apparatus wherein the track pattern shown in FIG. 2 is formed by the recording signals of embodiment 11 and the recording signals of embodiment 14. It has both the first operation unit 87 of embodiment 11 and the fourth operation unit 106 of embodiment 14, and switches between these units to obtain the ACH record signals having the pilot signal of embodiment 11 and the BCH record signal of embodiment 14. In the magnetic recording/reproduction apparatus of this embodiment, the pilot signal of the ACH record signal changes alternately between f1 and f2 at every half revolution of the drum, and two tracks of ACH and BCH are recorded at every half revolution of the drum.

The operation of embodiment 17 will now be described below. Drum FF signal which forms one period of rectangular waveform in one revolution of the rotary drum 84 is input to the system controller 86, upon which the recording start timing of the recording signal and the recording modulation start timing are controlled. Recording modulation is started before the rotary drum reaches the recording start timing. First, ACH record signals having pilot signal f1 are generated. The selector switches 109, 110 are set on the ACH side and the selector switches 111, 112 are set on the side of the first operation unit 87 of embodiment 11. Then ACH record signals are generated as in embodiment 11 and stored in the ACH buffer memory 103. 100-bit ACH record signals are generated in this procedure. Next, BCH record signals are generated. The selector switches 109, 110 are set on the BCH side and the selector switches 111, 112 are set on the side of the fourth operation unit 106 of embodiment 14. Then BCH record signals are generated as in embodiment 14 and stored in the BCH buffer memory 113. 100-bit BCH record signals are generated in this procedure.

When the rotary drum 84 reaches the position of recording start timing, recording signals which are stored in the ACH buffer memory 113 and in the BCH buffer memory 114 are output to the head amplifier 83 successively at the recording channel rate. At the same time, the next ACH record signal and BCH record signal are generated and stored in the buffer memories, then output following the previous record signals. By repeating this process for a period of a half revolution of the drum, A track 202 having pilot signal f1 and B track 203 adjacent thereto are obtained. In the period of the next half revolution of the drum, ACH record signals and BCH record signals having pilot signal f2 are generated and recorded similarly to the procedure described above. By repeating this procedure, the track pattern shown in FIG. 2 can be generated.

Embodiment 18

Figure 45:
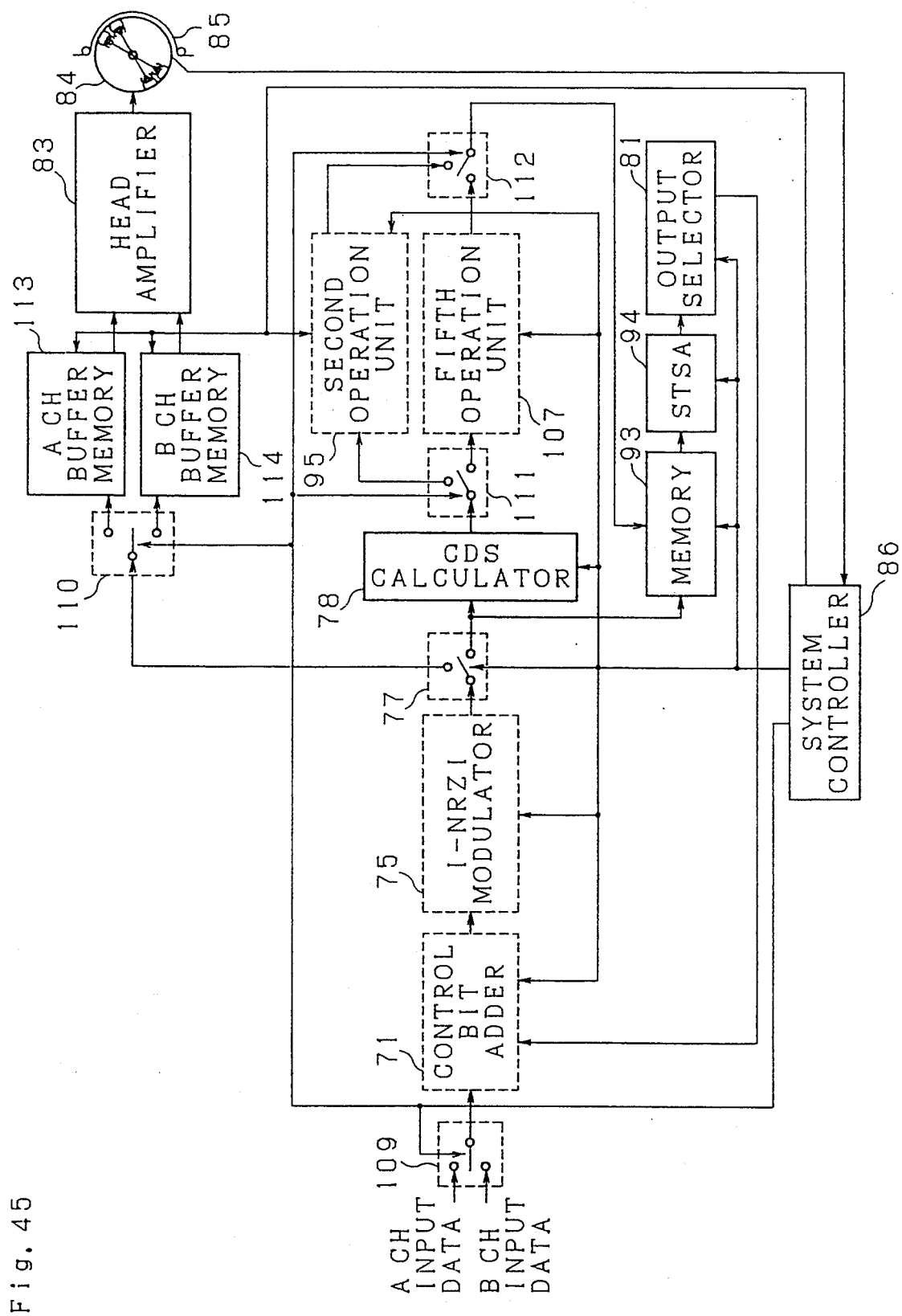
FIG. 45 is a block circuit diagram illustrative of the recording modulation section of the recording/reproduction apparatus of embodiment 18.

Embodiment 18 will now be described below. FIG. 45 shows the block circuit diagram of the recording modulator section of a recording/reproduction apparatus according to embodiment 18. The same circuits as those in the previous drawings will be given the same numerals and description thereof will be omitted.

System construction of the recording/reproduction apparatus of this embodiment is the same as that of embodiment 11. This embodiment is a recording/reproduction apparatus wherein the track pattern shown in FIG. 2 is formed by means of the recording signals of embodiment 12 and the recording signals of embodiment 15. It has both the second operation unit 95 of embodiment 12 and the fifth operation unit 107 of embodiment 15, and switches between these units to obtain the ACH record signals having the pilot signal of embodiment 12 and the BCH record signal of embodiment 15. System operation is basically the same as that of embodiment 17.

The operation of embodiment 18 will now be described below. First, ACH recording signals having the pilot signal f1 are generated. The selector switches 109, 110 are set on the ACH side and the selector switches 111, 112 are set on the side of the second operation unit 95 of embodiment 12. ACH record signals are generated as in embodiment 12 and stored in the ACH buffer memory 113, thereby generating 100-bit ACH record signals. Then BCH record signals are generated. The selector switches 109, 110 are set on the BCH side and the selector switches 111, 112 are set on the side of the fifth operation unit 107 of embodiment 15. BCH record signals are generated as in embodiment 15 and stored in the BCH buffer memory 114, thereby generating 100-bit BCH record signals.

When the rotary drum 84 reaches the position of recording start timing, record signals which are stored in the ACH buffer memory 113 and in the BCH buffer memory 114 begin to be output to the head amplifier 83 successively at the recording channel rate. At the same time, the next ACH record signal and BCH record signal are generated and stored in the buffer memories, then output following the previous record signals. By repeating this process for a period of half revolution of the drum, A track 202 having pilot signal f1 and B track 203 adjacent thereto are obtained. In the period of the next half revolution of the drum, ACH record signals and BCH record signals having pilot signal f2 are generated and recorded similarly to the procedure described above. By repeating this procedure, the track pattern shown in FIG. 2 can be generated.

Embodiment 19

Figure 46:
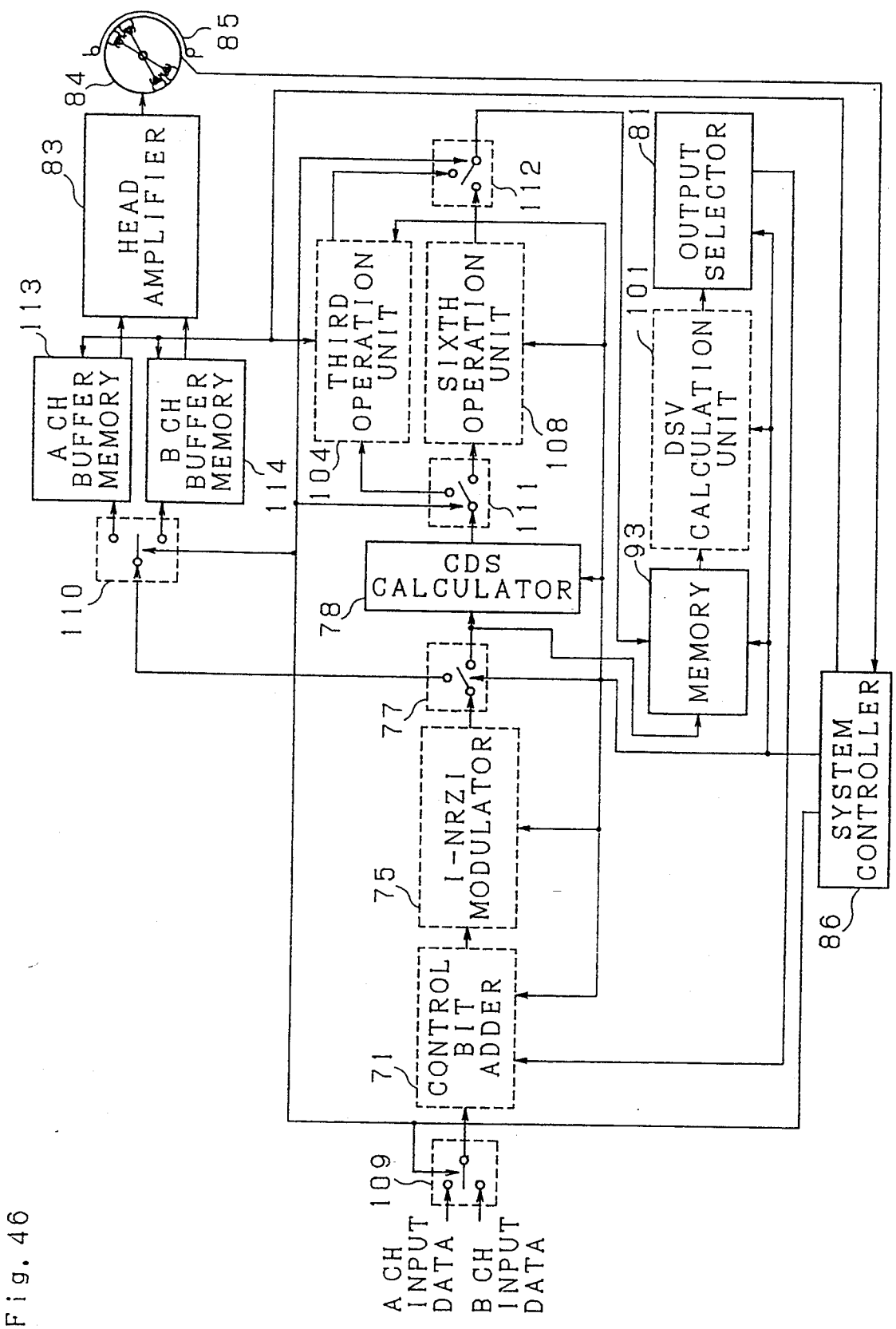
FIG. 46 is a block circuit diagram illustrative of the recording modulation section of the recording/reproduction apparatus of embodiment 19.

Embodiment 19 will now be described below. FIG. 46 shows the block circuit diagram of the recording modulator section of a recording/reproduction apparatus according to embodiment 19. The same circuits as those in the previous drawings will be given the same numerals and description thereof will be omitted.

System construction of the recording/reproduction apparatus of this embodiment is the same as that of embodiment 11. This embodiment is a recording/reproduction apparatus wherein the track pattern shown in FIG. 2 is formed by means of the recording signals of embodiment 13 and the recording signals of embodiment 16. It has both the third operation unit 104 of embodiment 13 and the sixth operation unit 108 of embodiment 16, and switches between these units to obtain the ACH record signals having the pilot signal of embodiment 13 and the BCH record signal of embodiment 16. System operation is basically the same as that of embodiment 17.

The operation of embodiment 19 will ow be described below. First, ACH record signals having the pilot signal f1 are generated. The selector switches 109, 110 are set on the ACH side and the selector switches 111, 112 are set on the side of the third operation unit 104 of embodiment 13, ACH record signals are generated as in embodiment 13 and stored in the ACH buffer memory 113, thereby generating 100-bit ACH record signals. Then BCH record signals are generated. The selector switches 109, 110 are set on the BCH side and the selector switches 111, 112 are set on the side of the sixth operation unit 108 of embodiment 16. BCH record signals are generated as in embodiment 16 and stored in the BCH buffer memory 114, thereby generating 100-bit BCH record signals.

When the rotary drum 84 reaches the position of recording start timing, record signals which are stored in the ACH buffer memory 113 and in the BCH buffer memory 114 begin to be output to the head amplifier 83 successively at the recording channel rate. At the same time, the next ACH record signal and BCH record signal are generated and stored in the buffer memories, then output following the previous record signals. By repeating this process for a period of half revolution of the drum, A track 202 having pilot signal f1 and B track 203 adjacent thereto are obtained. In the period of the next half revolution of the drum, ACH record signals and BCH record signals having the pilot signal f2 are generated and recorded similarly to the procedure described above. By repeating this procedure, the track pattern shown in FIG. 2 can be generated.

In embodiment 17, 18, 19 as described above, pilot signals synchronized with the digital data can be obtained without multiplexing the pilot signals. As a result, sags in the recording signals due to low frequency cut-off by the rotary transformer can be reduced and there is no need to multiplexing the pilot signals. Therefore it is not necessary to add additional signals to the recording signals, resulting in improved data error rate during reproduction. Also because the circuits other than the calculators can be used in common, the circuit scale can be reduced making it possible to reduce the chip area when integrating the circuits into an IC.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A data conversion device, comprising:
means for generating a $(k+1)$-bit data string by adding a control bit of 0 or 1 to an applied data string of k bits, and generating $2^n$ types of I-NRZI modulated data strings having a length of $((k+1) \times n$ bits) equal to one period of pilot signals;
means for performing spectrum analysis on each of the $2^n$ types of I-NRZI modulated data strings of $(k+1) \times n + m1$ bits; and
means for comparing the frequency spectra of the pilot signals by a result of the spectrum analysis of the $2^n$ types of I-NRZI modulated data strings, and outputting one of the $2^n$ types of I-NRZI data strings based on the comparison.

2. The data conversion device of claim 1, further comprising:
means for adding an m1-bit known data string having a frequency spectra of the pilot signals to each of the $2^n$ types of
wherein said means for performing spectrum analysis performs a short time spectrum analysis technique by calculating known data strings having the frequency spectrum of the pilot signals of m1-bit length in advance to generate a coefficient for a real term and an imaginary term and applying the coefficients to the the $2^n$ types of I-NRZI modulated data strings having a length of one period of the pilot signals.

3. A data conversion device comprising:
means for generating a $(k+1)$-bit data string by adding a control bit of 0 or 1 to an applied data string of k bits, and generating $2^{(n/y)}$ types of I-NRZI modulated data strings (Y is an integer $\geq 1$) having a length of $((k+1) \times (n/y)$ bits) equal to 1/y period of pilot signals;
means for adding one type of the y types of m2-bit known data strings to each of the $2^{(n/y)}$ types of I-NRZI modulated data strings;
means for performing spectrum analysis on each of $2^{(n/y)}$ types of I-NRZI modulated data strings of $(k+1) \times (n/y) + m2$ bits; and
means for comparing the frequency spectra of the pilot signals by a result of spectrum analysis of the $2^{(n/y)}$ types of I-NRZI modulated data strings, and outputting one of the $2^{(n/y)}$ types of I-NRZI modulated data strings based on the comparison.

4. The data conversion device of claim 3, further comprising:
means for generating y types of m2-bit known data strings having frequency spectra of the pilot signals and phases different by 360/y degrees from each other;
wherein said means for performing spectrum analysis performs a short time spectrum analysis technique, and includes
means for calculating in advance the y types of m2-bit known data strings having the frequency spectra of the pilot signals and having phases differing by 360/y degrees and holding y types of coefficients to compensate the phases,
means for adding the y types of coefficients to a result of adding the pilot signal to the $2^{(n/y)}$ types of I-NRZI modulated data string to perform spectrum analysis, and
means for switching the y types of coefficients successively at every 1/y period of the pilot signals.

5. The data conversion device of claim 3, wherein said means for performing spectrum analysis performs a short time spectrum analysis technique and has an odd number of taps, and wherein absolute values of a real term h(nT-rT) cos (ωrT) and an imaginary term h (nT-rT) sin (ωrT) of said means for performing spectrum analysis are bilaterally symmetrical when viewed from a central tap, and wherein a number of bits in the $2^{(n/y)}$ types of I-NRZI modulated data string within one period of the pilot signals generated from the (k+1)-bit data string is an odd number, and, when adding the y types of m2-bit known data strings having the frequency spectrum of the pilot signals to the $2^{(n/y)}$ types of I-NRZI modulated data string, a central bit of each of the $2^{(n/y)}$ types of I-NRZI modulated data strings overlaps the central tap of said means for performing spectrum analysis, and complements of laterally symmetrical real terms and imaginary terms are controlled and used in common when calculating a short time spectrum analysis of each of the $2^{(n/y)}$ types of I-NRZI modulated data strings.

6. A recording/reproduction apparatus comprising:
means for adding a control bit to an n-bit data string to obtain an (n+1)-bit data string;
means for applying interleaved NRZI modulation (I-NRZI modulation) to the (n+1)-bit data string;
means for storing an (n+1)-bit data string (data string 0) which is I-NRZI modulated with a control bit of 0 added thereto and an (n+1)-bit data string (data string 1) which is (I-NRZI modulated with a control bit of 1 added thereto;
means for calculating a Codeword Digital Sum (CDS) of the n+1)-bit data string (data string 0) and the (n+1)-bit data string (data string 1);
means for comparing a known CDS with particular frequency components enhanced by changing the known CDS periodically and each value of the calculated CDS, to obtain a data string nearer in value to the known CDS; and
means for recording either the (n+1)-bit data string (data string 0) or the (n+1)-bit data string (data string 1) depending on the comparison.

7. A recording/reproduction apparatus comprising:
means for adding a control bit to an n-bit data string to obtain an (n+1)-bit data string;
means for applying I-NRZI modulated to the (n+1)-bit data string;
means for storing an (n+1)-bit data string (data string 0) and an (n+1)-bit data string (data string 1);
means for dividing the (n+1)-bit data string (data string 0) and the (n+1)-bit data string (data string 1) into m-bit data strings;
means for calculating a CDS for each of the m-bit data strings;
a short time spectrum analyzer (STSA) with k taps (where k is a common multiple of L1/m and L2/m for analyzing spectra of fch/L1 and fch/L2 (where fch=bit rate) of the (n+1)-bit data string (data string 0) and the (n+1)-bit data string (data string 1);
means for comparing results of analyzing the (n+1)-bit data string (data string 0) and the (n+1)-bit data string (data string 1) and selecting the one with smaller frequencies of both fch/L1 and fch/L2; and
means for recording either the (n+1)-bit data string (data string 0) or the (n+1)-bit data string (data string 1), depending on the comparison.

8. The recording/reproduction apparatus of claim 7, wherein said short time spectrum analyzer (STSA) includes mxk-taps and the mxk-taps are divided into m portions to obtain k-tap STSAs which perform spectrum analysis of fch/L1 and fch/L2 for the (n+1)-bit data string (data string 0) and the (n+1)-bit data string (data string 1), wherein a coefficient of each tap of each k-tap STSA is determined by calculating, at each of the k taps, a representative known digital data of all CDS which is the m-bit digital data corresponding to one of the k taps obtained by dividing the mxk-tap STSA into m portions, and performs spectrum analysis by selecting coefficients so that (n+1)/m values of CDS of each of the (n+1)-bit data string (data string 0) and the (n+1)-bit data string (data string 1) which are input and the value of CDS of the known digital data are identical.

9. A recording/reproduction apparatus comprising:
means for adding a control to an n-bit data string and collecting k (k is an integer>0) sets of inputs to generate $2^k$ types of k(n+1)-bit data;
means for applying I-NRZI modulation to the $2^k$ types of k(n+1)-bit data which have been generated;
means for calculating a CDS for every m bits (k(n+1)/re=integer) of I-NRZI modulated data;
calculating means for calculating a sum of absolute values of a difference between a known CDS which includes pilot signal components and the calculated CDSs; and
outputting means for outputting the I-NRIZI modulated data with a smallest sum.

10. The recording/reproduction apparatus of claim 9, further comprising
means for selecting j (where j<$2^k$) sets of the I-NRZI modulated data having the j smallest sums;
means for obtaining frequency spectra for the j sets of I-NRZI modulated data; and
means for outputting one of the j sets of data having a smallest spectrum in a vicinity of a pilot frequency.

11. The recording/reproducing apparatus of claim 9, further comprising:
means for selecting j (where j<$2^k$) sets of the I-NRZI modulated data having the j smallest sums;
means for calculating a Digital Sum Variation (DSV) of previous recording signals; and
means for outputting one of the j sets of the I-NRZI modulated data having a sum of the calculated DSV and its CDS nearest to zero.

12. A recording/reproduction apparatus comprising:
means for adding a control bit to an n-bit data string and collecting k sets of inputs to generate $2^k$ types of k(n+1)-bit data;
mean for applying I-NRZI modulation to the $2^k$ types of k(n+1)-bit data which have been generated;
means for calculating a CDS for every m bits of I-NRZI modulated data;
calculating means for calculating a sum of the absolute values of each of the calculated CDS for every m bits of the I-NRZI modulated data; and
outputting means for outputting the m bits of the I-NRZI modulated data with the smallest sum.

13. The recording/reproduction apparatus of claim 12, further comprising:
means for selecting j (where j<$2^k$) sets of the I-NRZI modulated data having the j smallest sums;
means for obtaining frequency spectra for the j sets of data; and means for outputting the j sets of data having a smallest spectrum in a vicinity of a pilot frequency.

14. The recording/reproduction apparatus of claim 12, further comprising:
   means for selecting j (where $j < 2^k$) sets of the I-NRZI modulated data having the j smallest sums;
   means for calculating a DSV of previous recording signals; and
   mean for outputting one of the j sets of the I-NRZI modulated data having a sum of the calculated DSV and its CDS nearest to zero.

* * * * *